(12) United States Patent
Hale et al.

(10) Patent No.: US 12,088,081 B2
(45) Date of Patent: Sep. 10, 2024

(54) SYSTEM, DEVICE AND METHOD FOR CONFIGURING CIRCUIT PROTECTION DEVICE(S)

(71) Applicant: Basis NZ Limited, Auckland (NZ)

(72) Inventors: Brendon David Hale, Christchurch (NZ); Roel Adrianus Christianus Maria Van Den Boom, Riwaka (NZ); James Michael Allen, Auckland (NZ); Vincent Jean Seong Budelmann, Auckland (NZ); Richard Mark Andrew O'Brien, Matakana (NZ); Paul William Monigatti, Christchurch (NZ)

(73) Assignee: Basis NZ Limited, Auckland (NZ)

( * ) Notice: Subject to any disclaimer, the term of this patent is extended or adjusted under 35 U.S.C. 154(b) by 0 days.

(21) Appl. No.: 18/394,345

(22) Filed: Dec. 22, 2023

(65) Prior Publication Data
US 2024/0213758 A1 Jun. 27, 2024

(30) Foreign Application Priority Data

Dec. 22, 2022 (AU) ............... 2022903989
May 5, 2023 (AU) ............... 2023901358

(51) Int. Cl.
*H02H 3/00* (2006.01)
(52) U.S. Cl.
CPC .................. *H02H 3/006* (2013.01)
(58) Field of Classification Search
None
See application file for complete search history.

(56) References Cited

U.S. PATENT DOCUMENTS

| 5,825,643 A | 10/1998 | Dvorak et al. |
| 11,070,052 B2* | 7/2021 | Qi .................. H02H 1/0061 |
| 11,228,912 B2 | 1/2022 | Freeman et al. |

(Continued)

FOREIGN PATENT DOCUMENTS

| EP | 4002417 A1 | 5/2022 |
| JP | 2015507466 A | 3/2015 |

(Continued)

OTHER PUBLICATIONS

International Search Report issued in connection with PCT Patent Application No. PCT/IB2023/063150, Apr. 5, 2024.

(Continued)

*Primary Examiner* — Stephen W Jackson
(74) *Attorney, Agent, or Firm* — Kolitch Romano Dascenzo Gates LLC

(57) ABSTRACT

Methods for configuring operation of at least one circuit protection device of a power distribution panel comprise receiving configuration instructions having associated therewith configuration data for each circuit protection device; based on the receiving the configuration instructions, configuring one or more operational functions of each circuit protection device; receiving or detecting an indication of a user-verification of the configuration data for one or more of the at least one circuit protection device; and based on the receiving or detecting the indication, configuring the respective circuit protection devices based on the corresponding configuration data.

30 Claims, 17 Drawing Sheets

(56) References Cited

U.S. PATENT DOCUMENTS

| | | | |
|---|---|---|---|
| 11,297,506 B2 | 4/2022 | Kevelos et al. | |
| 11,818,582 B2 | 11/2023 | Kevelos et al. | |
| 2010/0053850 A1* | 3/2010 | Coffey | H02J 1/08 |
| | | | 361/643 |
| 2012/0176719 A1* | 7/2012 | Carlino | H01H 71/123 |
| | | | 361/170 |
| 2015/0116877 A1* | 4/2015 | Singh | H02H 7/262 |
| | | | 361/68 |
| 2015/0207301 A1 | 7/2015 | Franks et al. | |
| 2018/0145497 A1 | 5/2018 | Jakupi | |
| 2018/0175605 A1 | 6/2018 | Qi et al. | |
| 2021/0067924 A1* | 3/2021 | Begley | H04L 67/146 |
| 2022/0224106 A1* | 7/2022 | DeLapa | G06F 9/451 |

FOREIGN PATENT DOCUMENTS

| | | |
|---|---|---|
| KR | 10-1919860 B1 | 11/2018 |
| KR | 10-2020-0116632 A | 10/2020 |
| WO | WO1993012566 A1 | 6/1993 |
| WO | WO2022018704 A1 | 1/2022 |

OTHER PUBLICATIONS

Written Opinion issued in connection with PCT Patent Application No. PCT/IB2023/063150, Apr. 5, 2024.

* cited by examiner

Computer-readable medium
700

Configuration instructions executable by processing device(s)
710

FIG. 14

SYSTEM, DEVICE AND METHOD FOR CONFIGURING CIRCUIT PROTECTION DEVICE(S)

RELATED APPLICATIONS

The present application claims priority under 35 U.S.C. § 119 to Australia Patent Application No. 2022903989, which was filed on Dec. 22, 2022, and to Australia Patent Application No. 2023901358, which was filed on May 5, 2023. The complete disclosures of these related applications and any patents issued therefrom are hereby incorporated by reference.

FIELD

The present disclosure relates to configurable circuit protection device(s) and power distribution systems, and to methods for operating or configuring the same.

BACKGROUND

A power distribution panel is a device that receives electrical power from one or more power sources, such as from a mains grid or a renewable energy power storage device and distributes the electrical power from such source(s) to multiple sub-circuits or other loads connected to the panel. A power distribution panel typically includes multiple circuit protection devices, each being connected to an associated sub-circuit or load for controlling the flow of electricity and power delivery to that sub-circuit/load. A circuit breaker is an example of such a circuit protection device. Circuit breakers provide protection in electrical systems by disconnecting a sub-circuit/load from a power supply or source based on certain fault conditions, e.g., residual current/ground fault, arc fault, and/or overcurrent fault conditions. In general, circuit breakers monitor characteristics of the electrical power supplied to the connected sub-circuits and function to interrupt, open, 'trip' or 'break' the connection between the power supply and a sub-circuit when pre-defined fault conditions are detected. Interruption is generally achieved by automatically opening a switch to disconnect the sub-circuit from the power supply.

Conventional circuit breakers are manufactured to perform protective functions, but they typically cannot be reconfigured post manufacture or in the field to perform additional or alternative functions. In the event that a circuit breaker is to be updated due to a change in load conditions in an associated sub-circuit, for instance, the circuit breaker would need to be replaced with another having the required new functionality. For example, a 16A breaker cannot be upgraded to a 32A breaker without replacing the actual breaker hardware controlling the sub-circuit.

PCT patent application publication no. WO2022/018704 (herein referred to as WO2022/018704) discloses embodiments of a smart power distribution panel comprising configurable or programmable circuit protection devices. These devices comprise standardised hardware that can be programmed and reprogrammed to assign certain protective, monitoring, or control functions to the device including, for instance: overcurrent protection, residual current/ground fault protection and/or arc fault protection. In this manner, a standardised power distribution panel can be installed in a home or other environment, and individual circuit protection devices of the panel may be configured/programmed to perform the relevant functions for an associated sub-circuit in situ. Furthermore, these devices may be reconfigured/reprogrammed post manufacture and in the field to update the functionality based on new requirements or changing load conditions of an associated or new sub-circuit, for instance.

Such configurable circuit protection devices and/or associated power distribution panels may comprise remote communication capability such that the functionality of the devices can be remotely configured and reconfigured. This capability can greatly reduce the cost, complexity and/or time-in-field when installing and/or updating the power distribution panel and associated circuit protection devices.

Notwithstanding these advantages, remotely configuring/reconfiguring a circuit protection device comes with its own challenges, including security and safety. For instance, an authorised user may inadvertently apply the wrong configuration settings to a circuit protection device. Another potential risk involves unauthorised access and update of the configuration settings by remote hackers through the device's communication interface. In the absence of robust security measures, the device's configuration and its intended functionality can be seriously compromised in view of these risks. Another potential challenge is ensuring a safe transition between two different configuration settings, which does not compromise the intended functionality of the circuit protection device during the transition period. These challenges could pose potential risks and hazards to a use or system implementing such devices.

Accordingly, there is a need for improved or alternative methods, systems, and devices for configuring or reconfiguring circuit protection devices and power distribution panels.

SUMMARY

Methods, systems, and devices for configuring operation circuit protection devices and of power distribution panels are disclosed. Methods for configuring operation of at least one circuit protection device of a power distribution panel comprise receiving configuration instructions having associated therewith configuration data for each circuit protection device; based on the receiving the configuration instructions, configuring one or more operational functions of each circuit protection device; receiving or detecting an indication of a user-verification of the configuration data for one or more of the at least one circuit protection device; and based on the receiving or detecting the indication, configuring the respective circuit protection devices based on the corresponding configuration data.

BRIEF DESCRIPTION OF THE DRAWINGS

Preferred embodiments of the present disclosure will be described by way of example only and with reference to the drawings, in which:

FIG. 14 is a block diagram illustrating an exemplary embodiment of a storage medium of the present disclosure.

DESCRIPTION

Figure 1:
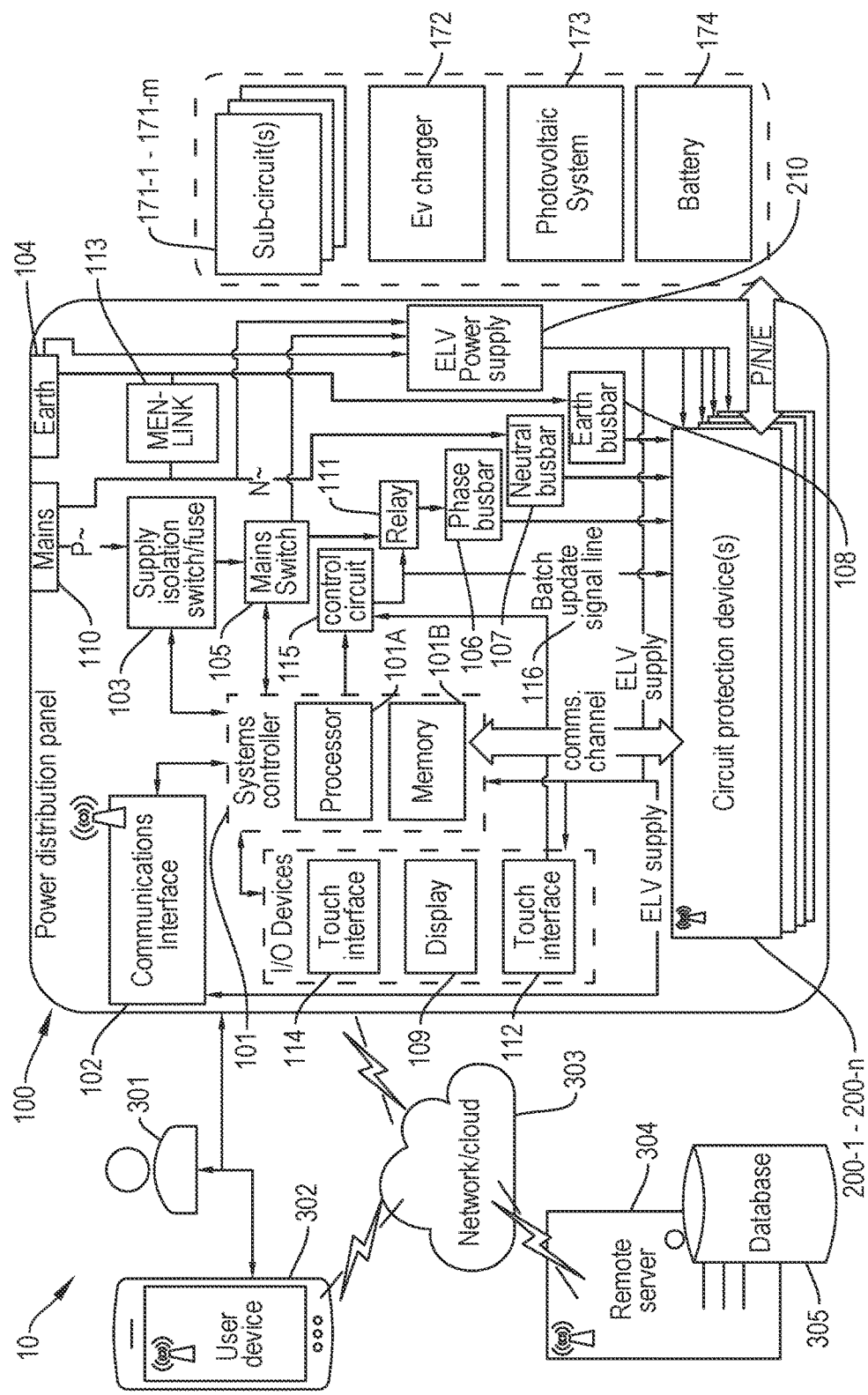
FIG. 1 is a block diagram illustrating a power distribution system of the present disclosure in accordance with an exemplary embodiment.

In this specification where reference has been made to patent specifications, other external documents, or other sources of information, this is generally for the purpose of providing a context for discussing the features of the present disclosure. Unless specifically stated otherwise, reference to such external documents is not to be construed as an admission that such documents, or such sources of information, in any jurisdiction, are prior art, or form part of the common general knowledge in the art.

The term "comprising" as used in this specification and claims means "consisting at least in part of." When interpreting each statement in this specification and claims that includes the term "comprising," features other than that or those prefaced by the term may also be present. Related terms such as "comprise" and "comprises" are to be interpreted in the same manner.

The phrase "electrically connected," as used in this specification and claims in relation to two components or devices of an electrical system, is intended to mean electrically coupled to allow for the transfer of electrical current therebetween. Unless stated otherwise, the transfer of such current may be direct or indirect via one or more other intermediary electrical components or devices.

The term "remote" as used in this specification and claims is intended to mean external to the enclosure of the power distribution panel 100, regardless of the means of communication which may be wired or wireless.

The phrase "physical touch interface" as used in this specification and claims is intended to mean a user interface device or an interface component of a device that necessitates direct physical contact with the interface by a user to facilitate input or interaction. This interface relies on tangible elements, such as buttons, switches, levers, or other tactile components, which are manipulated or engaged through physical touch to convey commands or information from a user. Examples of physical touch interfaces include, mechanical buttons, levers, and switches that require physical pressure or manipulation to activate or toggle, capacitive touch sensors commonly associated with touchscreen devices or systems, pressure sensitive surfaces that respond to various degrees of pressure, and toggle or rocker switches that can be toggled or rocked to different positions to convey distinct commands. The physical touch interface may be configured to convey commands or information by transducing the physical touch into an electronic signal, or by opening and closing an electrical current flow path in an electronic circuit. The phrase "physical touch interface" may be used interchangeably in this specification to refer to a physical touch interface device comprising a touch interface component or to the physical touch interface component of an interface device.

The phrase "operatively coupled" as used in this specification and claims is intended to mean a connection or relationship between two or more components, devices, or systems that allows them to work together and interact in a specific manner to achieve a desired function. In an electrical circuit it signifies a functional coupling where the components, devices, or systems are electrically or functionally connected to enable the exchange of signals, data, or energy. The connection between the two or more components, devices, or systems need not be direct for there to be an operative coupling between them.

It is intended that reference to a range of numbers disclosed herein (for example, 1 to 10) also incorporates reference to all rational numbers within that range (for example, 1, 1.1, 2, 3, 3.9, 4, 5, 6, 6.5, 7, 8, 9 and 10) and also any range of rational numbers within that range (for example, 2 to 8, 1.5 to 5.5 and 3.1 to 4.7) and, therefore, all sub-ranges of all ranges expressly disclosed herein are hereby expressly disclosed. These are only examples of what is specifically intended and all possible combinations of numerical values between the lowest value and the highest value enumerated are to be considered to be expressly stated in this application in a similar manner.

As used herein the term "and/or" means "and" or "or," or both.

As used herein "(s)" following a noun means the plural and/or singular forms of the noun.

This present disclosure may also be said broadly to consist in the parts, elements and features referred to or indicated in the specification of the application, individually or collectively, and any or all combinations of any two or more said parts, elements or features, and where specific integers are mentioned herein which have known equivalents in the art to which this present disclosure relates, such known equivalents are deemed to be incorporated herein as if individually set forth.

The present disclosure consists in the foregoing and also envisages constructions of which the following gives examples only.

In the following description, specific details are given to provide a thorough understanding of the embodiments. However, it will be understood by one of ordinary skill in the art that the embodiments may be practiced without these specific details. For example, software modules, functions, circuits, etc., may be shown in block diagrams in order not to obscure the embodiments in unnecessary detail. In other instances, well-known modules, structures, and techniques may not be shown in detail in order not to obscure the embodiments.

Also, it is noted that the embodiments may be described as a process that is depicted as a flowchart, a flow diagram, a structure diagram, or a block diagram. Although a flowchart may describe the operations as a sequential process, many of the operations can be performed in parallel or concurrently, or the order of operations may be rearranged, unless explicitly stated or it is implicit from the description that certain operations follow or are based on others. A process is terminated when its operations are completed. A process may correspond to a method, a function, a procedure, a subroutine, a subprogram, etc., in a computer program. A computer program may be firmware embedded in a hardware device or another software program that can be temporarily stored and run on a computing device. When a process corresponds to a function, its termination corresponds to a return of the function to the calling function or a main function.

Aspects of the systems and methods described below may be operable on any type of general-purpose computer system or computing device, including, but not limited to, a desktop, laptop, notebook, tablet or mobile device. The term "mobile device" includes, but is not limited to, a wireless device, a mobile phone, a mobile communication device, a user communication device, personal digital assistant, mobile hand-held computer, a laptop computer, an electronic book reader and reading devices capable of reading electronic contents and/or other types of mobile devices typically carried by individuals and/or having some form of communication capabilities (e.g., wireless, infrared, short-range radio, etc.). Other aspects of the systems and methods described below may be operable on a dedicated computing device such as a power distribution system, and/or a circuit protection device.

Circuit protection devices and power distribution systems or panels incorporating circuit protection devices are described herein. Methods for operating or configuring such circuit protection devices and power distribution systems or panels are also described, including computer implemented methods.

Embodiments of circuit protection devices described herein comprise circuit protection devices operable to connect between an electrical power source and an electrical load, and to control and optionally monitor the delivery of electrical power from the power source to the load. Power control functionality can include fault condition detection and fault protection functionality, for instance. It can additionally or alternatively include non-protection functions such as load control, remote load control, automatic control based on input such as energy pricing and the like. The power control and/or monitoring functionality of the circuit protection device is updatable or configurable, in field. Accordingly, the circuit protection devices may be updated based on a change in load conditions, the historical characteristics of the load and the like, after manufacture and initial installation without physically replacing the circuit protection device with another for a particular load. For example, the circuit protection device can perform fault monitoring and safety functions, or non-protective functions, and one or more of these functions are updatable or configurable, in-field. This may comprise updating or configuring the firmware of the circuit protection device, including updating or configuring configuration data stored in a non-volatile memory location of the device. This functionality facilitates the standardisation of circuit protection device hardware for improving mass manufacturing capabilities. Other advantages are also offered beyond this including improved maintenance efficiency and the ability to address specific application needs. Ultimately, the benefits contribute to an overall optimisation of power distribution panels incorporating one or more of these circuit protection device(s).

The circuit protection device embodiments described herein comprise a controller having an electronic storage medium or media for storing instructions associated with a configuration process for the circuit protection device, and one or more processors configured to execute these instructions. The circuit protection device embodiments further comprise a communication interface for enabling the receipt of configuration instruction(s) from a separate and/or remote device. The remote device may be a mobile user device, or it may be a separate systems controller, such as the central controller of an associated power distribution panel or system within which the circuit protection device is mounted and installed. The communication interface preferably comprises a wireless interface (e.g., for communicating with a remote mobile user device), but may also or alternatively comprise a wired interface (e.g., for communicating with a central controller of the power distribution panel).

The circuit protection device embodiments preferably also comprise one or more user interface devices, separate to the abovementioned communication interface, for enabling a user, located spatially in the presence of the device, to interact with the device during an update or configuration process. User involvement in the configuration process may improve safety and reduce the potential for cyber-attacks. For example, a user interface device preferably comprises at least one input device comprising a physical touch interface mounted on a housing of the circuit protection device, for receiving a physical input from a user. Such a physical input may be used by a user during a configuration process to confirm the intention to configure a device, and/or to simultaneously verify a configuration update and the user's spatial presence in the vicinity of the device during verification. Alternatively, geofencing techniques could be utilised in associated with a user device 302 to indicate the user's spatial location during verification. Necessitating a physical presence during one or more stages of the configuration process, can enhance safety and security against potential remote hacking of the device's configuration settings. Another user interface device of the circuit protection device may be an output device, such as an electronic display, for outputting data or information visible to a user to assist the user with reviewing the configuration data associated with an update prior to verification, for instance.

Embodiments of power distribution systems or panels described herein incorporate one or more such updatable or configurable circuit protection devices. The power distribution systems or panels comprise a communication interface for enabling the receipt of configuration instruction(s) for one or more of the circuit protection devices of the system or panel, from a separate and/or remote device, such as a mobile user device, for performing a single or batch update of one or multiple circuit protection device(s). The communication interface preferably comprises a wireless interface but may additionally or alternatively comprise a wired interface. The power distribution systems or panels described herein also comprise a controller having an electronic storage medium or media for storing instructions associated with a configuration process for one or multiple circuit protection device(s) of the system or panel, and one or more processors configured to execute these instructions.

The power distribution systems or panels also comprise one or more user interface devices, separate to the interface for communicating with remote devices, for enabling a user located spatially in the presence of the device, to interact with the system or panel during an update or configuration process, particularly a batch update process for multiple devices. Although, embodiments described herein also enable the update of a single circuit protection device using the panel interface(s). User involvement in the configuration process may improve safety and reduce the potential for cyber-attacks. A user interface device of the power distribution system or panel may comprise at least one user-input device comprising a physical touch interface mounted on a housing of the panel (separately from the circuit protection device interface(s) mentioned above) for receiving a physical input from a user. Such a physical input may be used by a user during a configuration process to confirm a user's intention to configure one or multiple circuit protection device(s), and/or to simultaneously verify a configuration update for one or multiple circuit protection device(s) and the user's spatial presence in the vicinity of the device during verification. Alternatively, geofencing techniques could alternatively be used to indicate a user's spatial presence in some embodiments. As mentioned above, necessitating a physical presence during a configuration process, can enhance safety and security against potential remote hacking of configuration settings for one or multiple device(s). The power distribution panel may optionally further comprise at least one output device, such as an electronic display for facilitating in the verification of a configuration update for one or multiple circuit protection devices.

Embodiments of methods and processes for configuring a circuit protection device or multiple circuit protection devices in a power distribution system or panel, or to configure a power distribution system or panel, are also described herein. Such methods and processes are implemented in computing device(s) associated with the circuit protection device(s) and/or power distribution system or panel. They may also be implemented in a computer-readable medium. The methods or processes described herein preferably necessitate the interaction of a user that is spatially located at the circuit protection device or power distribution system or panel during the configuration process, for example via the user interface device(s) of the circuit protection device or of the power distribution system or panel as mentioned above. The interaction may include the receipt of a physical touch input to confirm a user's intention to configure one or multiple device(s), and/or to verify the configuration data for one or more circuit protection device(s) as well as the user's physical presence during configuration process, before committing the configuration data to the device(s) memory and/or before operating the device(s) based on the new configuration data. Necessitating a user's physical presence is embedded in the computer implemented method or process to enhance safety and security and reduce risks associated with a configuration update procedure. Methods for configuring a single circuit protection device are disclosed, as well as methods for configuring power distribution panels comprising multiple circuit protection devices.

The circuit protection device embodiments described herein, and the power distribution panel or system embodiments described herein enable the configuration of circuit protection devices individually, as well as batch configurations of multiple circuit protection devices simultaneously, in accordance with the computer-implemented method embodiments disclosed herein.

Referring to FIG. 1, an exemplary embodiment of a power distribution system 10 (also known as an electrical distribution system) of the present disclosure is shown comprising a power distribution panel 100 configured to electrically couple, via a primary power inlet 110, a primary source of electrical power, such as a utility grid mains power supply. The power distribution panel 100 is further configured to electrically couple any number 'm' (e.g., 1, 2, 3, or 4 etc.) of sub-circuits 171-1-171-*m* to distribute power thereto. The sub-circuits 171-1-171-*m* may comprise the electrical sub-circuits of a building or dwelling, for instance. In this specification, unless stated otherwise, the term "sub-circuit" refers to a subset of a circuit, to one of a group of multiple circuits, or to a single circuit, and is not intended to be limited to any one of these interpretations. The power distribution panel 100 may be further configured to electrically couple other loads, such as an electric vehicle charger 172 to distribute power thereto. Although only one additional load 172 is shown in FIG. 1, it will be appreciated that the power distribution panel may be configured to electrically couple any number of one or more additional loads.

The power distribution panel 100 further comprises a housing (not shown) and a circuit protection device(s) 200 mounted and installed within the housing, for each sub-circuit 171 or load 172, to control the supply of electrical power to the associated sub-circuit 171 or load 172. There may be any number 'n' (e.g., 1, 2, 3, or 4 etc.) of circuit protection devices 200-1-200-*n* installed in the power distribution panel 100, but preferably 'n' is equal to or greater than the collective sum of sub-circuits 171-1-171-*m* and loads 172 electrically coupled (or to be electrically coupled) to the power distribution panel 100. It is preferred that the power distribution panel 100 comprises multiple circuit protection devices 200-1-200-*n*, such as more than 6, more than 10, or more than 14 circuit protection device 200-1-200-*n*. It will be appreciated that these numbers are only exemplary, and the present disclosure is not intended to be limited to any particular number of circuit protection devices installed within the power distribution panel 100.

Each one of circuit protection device(s) 200-1-200-*n* comprises circuitry that is configurable and operable to control the flow of electrical power to the associated connected sub-circuit 171-1-171-*m*, 172, or the flow of electrical power from the associated connected circuit/system 173, 174. The control functionality preferably includes interruption of the flow of current to/from the connected sub-circuit or load when certain conditions are met, and the reinstatement of the flow of current when it is safe to do so. Such conditions for interrupting current flow may comprise pre-configured fault conditions associated with the connected sub-circuit or load. Each circuit protection device 200-1-200-*n* is further configurable and operable to monitor the flow of electrical power to/from the connected sub-circuit, for instance to determine an indication of a fault condition. For instance, each circuit protection device(s) 200-1-200-*n* is configurable and operable to: monitor one or more electrical parameters associated with the connected sub-circuit or load (such as current(s) and/or voltage(s)), and/or analysing the electrical parameters to determine one or more operational conditions, such as an overcurrent, an arc fault or an excess residual current/ground fault condition. Other functions of each circuit protection device 200-1-200-*n* may include: ripple control functionality for metering control, dynamic load balancing and electricity price-based controls and the like. The circuit protection device(s) 200-1-200-*n* may be configurable to further include one or more of these functions in some embodiments, and/or parameters relating to the one or more function(s) may be configurable. Exemplary circuit protection devices configured to perform such functions are described in PCT patent application publication no. WO2022/018704, the contents of which are hereby incorporated by reference. The examples of functionality provided herein are not intended to be exhaustive, and other functions may be implemented in the circuit protection device(s) 200-1-200-*n* as would be apparent to the skilled person without departing from the scope of the present disclosure.

The power distribution panel 100 may be further configured to electrically couple other secondary or auxiliary power source(s) such as a rechargeable electrical power storage device 174 that may be operable to store energy from a photovoltaic power or other renewable energy system 173. One or more of the circuit protection device(s) 200-1-200-*n* may be configured to electrically couple the secondary or auxiliary power source(s) to control the distribution of power from these sources to one or more associated circuits 171-1-171-*m* or loads 172-174 connected to the panel 100, based on the functionality described above.

The power distribution panel 100 further comprises a central controller 101 having one or more processing components (herein: processor(s) 101A) and an electronic, computer readable storage medium or media (herein: electronic storage 101B) associated therewith. The controller 101 is responsible for receiving input, processing information, and generating output to control the behaviour or operation of the panel 100 and systems with which it is associated. It may be implemented using any combination of electronic circuits, processors, electronic storage, and/or programmable logic. The electronic storage 101B may store data comprising instructions executable by the processor(s) 101A to enable the controller 101 to perform one or more functions, when power is supplied to the controller. Such functions may include, for instance, control functions for controlling operation of one or more circuit protection devices 200-1-200-*n*, transmit or receive functions for transmitting or receiving signals containing information to or from one or more circuit protection devices 200-1-200-*n* and/or to or from one or more remote devices, and/or analysis functions for analysing data received from one or more other devices. The electronic storage may comprise a single medium or multiple media which may or may not be physically closely associated with one another. Similarly, the processor(s) 101A may comprise a single processor, or multiple processor(s) 101A which may or may not be physically closely associated with one another. Collectively, the processor(s) 101A and the storage medium or media 101B are configured or configurable, and operable, to perform the function(s) of the controller 101 described herein. In any of the embodiments described herein, the controller 101 may cooperatively operate with one or more other digital and/or analogue circuits of the power distribution panel 100 to perform one or more of the functions described in relation to the controller 101.

The electronic storage 101B may comprise a non-volatile or non-transitory storage medium or media for storing instructions or other data that is intended to remain accessible by the processor(s) 101A when the controller 101 is deactivated and then reactivated again (e.g., when power to the panel 100 is disconnected and then reinstated). This may include firmware instructions and data loaded into memory during manufacture, for instance. The electronic storage may further comprise a volatile or transitory storage medium or media for temporary storage of data while the controller 101 is activated. This data is intended to be deleted from the temporary storage before or when the controller 101 is deactivated, e.g., when electrical power to panel 100 is disconnected. This may include configuration data received from or transmitted to a remote entity, in-field, for instance.

The power distribution panel 100 further comprises a communication interface 102 configured to communicatively couple the controller 101 to one or more remote computing device(s), such as: user computing device(s) 302, remote network(s) 303, remote server(s) 304, remote database(s) 305 and the like. The controller 101 may communicatively couple one or more remote device(s) 302, 304, 405 via a communications network, such as a cloud network 303 of system 10. The phrase "remote device" is intended to mean a device that is remote to the power distribution panel 100 and in particular not normally housed within or normally physically coupled to the power distribution panel 100 during its standard modes of operation (excluding a configuration update mode, for instance). Accordingly, this excludes the circuit protection device(s) 200-1-200-*n* which are generally housed within the power distribution panel 100. The remote device need not be located spatially distal to the power distribution panel 100 to be considered remote from the panel in this context.

The communications interface 102 is further configured to enable the controller 101 to communicatively couple, one or more other device(s) of the power distribution panel 100, such as one or more of the circuit protection device(s) 200-1-200-*n*.

The communications interface 102 may comprise a wireless communications interface comprising wireless technology configured to communicate with remote computing device(s) (e.g., 302-305) and/or other panel device(s) (e.g., 200-1-200-*n*) via a wireless communication channel (e.g., a short-range wireless/near field wireless technology, Bluetooth®, Wi-Fi, ZigBee®, etc.). The wireless communication components of the communication interface 102 may include radio transmitting and receiving circuitry, an antenna, and a processor for instance, configured to communicate using a wireless transmission scheme, such as, for example, BLE. The wireless communication interface 102 may be operable to communicate over a number of wireless frequencies or schemes. As such, the processor, radio, and antenna of the communications interface 102 could be configured to communicate over multiple wireless communication technologies, such as, for example, BLE and Wi-Fi.

The communications interface 102 may alternatively or in addition comprise an interface for wired communication with one or more remote computing device(s) (e.g., 302-305), and/or with other device(s), e.g., 200-1-200-*n*, of the power distribution panel 100. The wired communications interface may comprise any wired communication technology (e.g., Ethernet, CANbus, RS232, USB, or the like).

As mentioned, the wired and/or wireless communication module(s) of interface 102 is(are) preferably also operable to communicatively couple and exchange data with a corresponding communications interface/module associated with one or more of the circuit protection device(s) 200-1-200-*n*. Accordingly, one or more of the circuit protection device(s) 200-1-200-*n* are preferably communication enabled to communicatively couple the central controller 101 of the power distribution panel 100. In some embodiments, one or more other circuit protection device(s) 200-1-200-n of the power distribution panel 100 may not be communication enabled.

The power distribution panel 100 further comprises one or more input/output (I/O) interface devices for enabling a human user, such as an installer, operator or other end user, to interact with and optionally control one or more features of functions of the power distribution panel 100. The I/O user interface devices preferably comprise at least one output user-interface 109 having one or more electrically enabled indicia for providing a visible output interpretable by a human user viewing the indicia. In a preferred embodiment, the output user-interface 109 comprises an electronic visual display interface or device for outputting information to the user.

The I/O interface devices of the power distribution panel 100 preferably comprise an input device comprising physical touch interface 114, such as an electronic button or switch, or a touch-sensitive input device. The user input device 114 enables a user to provide a physical touch input, and transduces the touch input into electronic control signals receivable by one or more devices of the panel 100, such as the controller 101. The IO devices 109, 114 are preferably communicatively coupled to the central controller 101.

A primary power source connection module of panel 100, such as mains input connection module, electrically couples the power distribution panel 100 to a utility grid or other mains power source. A mains isolation module 103 may electrically couple the phase and neutral lines of the mains connection module. The active or phase line or flow path may be further electrically coupled to a flow interrupting device 105, which may be a switch. The flow interrupting device 105 is preferably manually operable by a user via a physical touch interface, such as the toggle of the switch to enable a user to connect or disconnect the main power source from the circuit protection device(s) 200-1-200-n and associated sub-circuits. A phase busbar 106 electrically couples the phase input of mains connection module to a phase input of one or multiple circuit protection device(s) 2001-200-n, via the isolation module 103 and the mains flow interrupting device 105.

A neutral busbar 107 electrically couples a neutral input of the mains connection module to a neutral input of one or multiple circuit protection device(s) 200-1-200-n, via mains isolation module 103. An earth busbar 108 grounds one or multiple circuit protection device(s) 200-1-200-n by electrically connecting to an earth stake via the earth input 104 of the panel 100. In some embodiments, the panel 100 may further comprise a multiple earth neutral (MEN) link or connection 113 that electrically connects the neutral and earth lines/busbars 107 and 108. The MEN-link 113 may be accessible by an operator, and removable or replaceable.

A second current flow interrupting device 111 electrically couples between the phase power input connection of one or multiple circuit protection device(s) 200-1-200-n, and the primary power input 110, preferably downstream of the mains flow interrupting device 105. The current flow interrupting device 111 may optionally be configured to control aspects of power delivery to the one or more circuit protection device(s) 200-1-200-n including delaying the delivery of power at initial power up. This may primarily assist in the allowing circuits within the panel 100 to power up before operating the panel in a standard mode of operation. Secondarily, the power up delay may facilitate in preventing power surges and reduce inrush currents flowing into the system. Alternatively, the current flow interrupting device 111 does not delay power delivery to the system during initial power up.

The power distribution panel 100 may further comprise a smart meter system (not shown) connected at an input side of the panel 100 for performing other functions as described in PCT patent application publication no. WO2022/018704, for instance. Such other modules and circuitry are not described in detail or included in the drawings for the sake of brevity but are hereby incorporated by reference.

Each of the circuit protection device(s) 200-1-200-n comprise primary power input connections 211 (shown in FIG. 2) for electrically coupling to at least phase and neutral power distribution lines of the panel 100, and preferably also an earth line of the panel 100. The power input connections of each circuit protection device 200-1-200-n may be electrically coupled to a phase busbar 106, a neutral busbar 107 and preferably an earth busbar 108, upon installation, for instance. A plurality of the circuit protection device(s) 200-1-200-n may be electrically coupled to common phase, neutral and earth busbars 106-108. The phase busbar 106 and the neutral busbar 107 are preferably electrically coupled to the primary source power input 110. The phase busbar 106 is electrically coupled to the input 110 via the flow interrupting device 105.

As mentioned, the flow interrupting device 105 is preferably a user-operable current flow interrupting device 105 comprising a physical touch interface (not shown separate to device 105) mechanically operable by a human user (such as user 301) to alter an operative state of the device 105 and in particular, the operative state of an electrical current flow path through the device 105. In this exemplary embodiment, the flow interrupting device 105 is operable to alter a state of an electrical current flow path of an active or phase line between the primary power source input 110, and a phase busbar 106 electrically connecting the active/phase line of a power source input 110 to one, or preferably multiple, circuit protection device(s) 200-1-200-n. In a preferred embodiment, the device 105 is an electrical switch having an actuator that is mechanically moveable by a user (e.g., 301) between a first position and a second position, corresponding to open and closed operative states of the flow interrupting device 105 and open and closed states of the corresponding electrical current flow path. In this specification the term "open state," in reference to a current flow interrupting device or an electrical current flow path, is intended to mean an interrupted state where current flow through the current flow interrupting device or the electrical current flow path is substantially inhibited. Conversely, the term "closed state," in reference to a current flow interrupting device or an electrical current flow path, is intended to mean an uninterrupted state where the flow of current through the current flow interrupting device or the electrical current flow path is substantially permitted.

The second current flow interrupting device 111 of the power distribution panel 100 is electrically coupled to an electrical current flow path configured to deliver electrical power to one or more sub-circuits or other loads 171-1-171-m, 172, associated with one or more of the circuit protection device(s) 200-1-200-n. The second current flow interrupting device 111 of the panel is also operable in one of two operative states including an open state and a closed state and is preferably configured to receive electronic control signals to trigger or control an operative state of the device. The current flow interrupting device 111 electrically couples a phase line of an electrical current flow path of the panel 100 configured to deliver power from the primary power input 110 to the one or more circuit protection device(s) 2001-200-*n*. In some configuration, the current flow interrupting device 111 could be electrically connected between one or more auxiliary power source connections (e.g., connections with PV system 173 and/or connections with battery system 174) and the power input side of the one or more circuit protection device(s) 200-1-200-*n*.

The current flow interrupting device 111 may be, for example, an electrical relay 111. The relay 111 may be a power up delay relay configured to delay the delivery of electrical current intended to power a sub-circuit or load 171-1-171-*m*, 172 during a stabilisation stage of the corresponding circuit protection device(s) 200-1-200-*n*. The power up delay relay 111 may be controllable to switch between the open state to the closed state after a stabilisation period has elapsed. The stabilisation period may be associated with a timing function configured to trigger an alteration of the state of the relay 111 after the stabilisation period has elapsed. The timer function may be implemented using analogue circuitry, e.g., an RC circuit of the relay 111, or it may be implemented using digital circuitry, e.g., by controller 101 which may control relay 111 to change state once it determines an elapsed time corresponding to the stabilisation period has elapsed. The timer may be configured to initiate the stabilisation delay period upon initiation of a flow of current from the primary power input 110 into the relay 111 and is triggered into the closed state after the stabilisation delay period has elapsed. The electrical relay 111 could be implemented as an electromechanical relay or a solid-state relay device.

The current flow interrupting device 111 is preferably also manually operable, via an associated physical touch interface of the panel 100 so that a user can also toggle the state of the device via the interface. User input device 112 comprises a physical touch interface and is preferably operatively coupled to or operatively associated with the current flow interrupting device 111 for enabling a user to trigger or alter the operative state of the device 111, e.g., toggle between an open state or a closed state via the touch interface. The physical touch interface may comprise a switch, button or other tactile interface for a user to interact with the device 112. The user input device 112 generates a control signal upon receiving a physical input from a user via the interface. In one implementation, the controller 101 is coupled to an output of the user input device 112, such that the controller 101 drives the second current flow interrupting device 111 to change its operative state based on the control signal output from the user input device 112. In yet another implementation, an output of the user input device 112 is directly coupled to an input of the second flow interrupting device 111 such that the operative state of the second flow interrupting device 111 is directly driven by the control signal(s) output from the user input device 112.

In a preferred implementation, control of the second current flow interrupting device 111 via the user input device 112 is conditional and dependent on the controller 101. In this case, the controller 101 enables the opening of the second current flow interrupting device 111 via the user input device 112 only when the panel 100 is in a "configuration state" of operation. In all other situations, such as during standard operation, the functionality of the user input device 112 in terms of opening the second current flow interrupting device 111 may be disabled by the controller 101.

The controller 101 may be configured to set and control a configuration-related indicator associated with the panel 100, and/or associated with the user input device 112. The configuration-related indicator indicates at least a configuration-related status (i.e., an "active configuration" status) of the panel 100, and/or at least a configuration-related function (i.e., "configure circuit protection device(s)" function) of the user input device 112. The configuration-related indicator may be a memory register or flag, for instance, within the memory 101B, although it will be appreciated that the location of the memory register or flag could be in a different electronic storage medium of the system, which is also accessible by the controller 101. The value of the configuration-related indicator may be controllable by the controller 101 and determines or influences the operative function of the user input device 112 within the panel system 100. For example, in the case that the configuration-related indicator comprising a flag, the value may be binary (i.e., a high value or a low value), where one value (e.g., the high value) indicates an enabled configuration-related status or configuration-enabled function of the panel 100 or of the user input device 112, respectively. The other value (e.g., the low value) may indicate a disabled configuration related status or configuration-related function, or alternatively it may indicate another standard operative status and/or standard function of the panel 100 and/or of the user input device 112, respectively. For example, a standard function of the user input device 112 may be a wireless connectivity related function during a standard mode of operation of the panel 100. It will be appreciated, that the indicator may be a memory register capable of representing more than two statuses of the panel 100, or more than two functions relating to the user input device 112 and the present disclosure is not limited to the examples presented herein.

The controller 101 may comprise instructions stored in memory 101B for setting the value of the configuration-related indicator based on the value of another indicator, or in response to a detected event. A detected event may include the receipt of configuration-related instruction(s) from another device of the panel 100 or of the system 10 (e.g., one of the device(s) 200-1-200-*n*, or a remote user device 302), or the detection of cached configuration data in one or more device(s) 200-1-200-*n* of the panel 100. Receipt of configuration instruction(s) and the caching of configuration data are described in more detail in relation to the configuration methods of the present disclosure, such as anyone of methods 310, 350, 400, 500, 550, 560, 600 and 650.

The panel 100 further comprises control circuitry 115 configured to enable the opening of the second current flow interrupting device 111 based on an output of the user input device 112 and the value of the configuration-related indicator. The control circuitry 115 is preferably configured to drive the second current flow interrupting device 111 to open when a signal is received indicative of a physical user input via the user input device 112 and when the value of the configuration-related indicator represents a configuration-related status of the panel 100 and/or a configuration-related function of the user input device 112. The control circuitry is preferably further configured to maintain an open state of operation of the current flow interrupting device 111 via a latching circuit, until a predetermined condition is met, or a separate command is met to alter the state of the device 111. Alternatively, the physical touch interface associated with the user interface device 112 may comprise a latching mechanism or circuit to maintain the device 111 in the open state, until the predetermined condition is met, or the separate command is received. The latching mechanism or circuit is preferably electronic. The predetermined condition may comprise the receipt of data or a signal by controller 101 indicating user-verification of new configuration data loaded into the device 200, as explained in more detail relation to any one of the configuration method embodiments 310, 350, 500, 550, 560, 600, 650 of the present disclosure.

The control circuitry 115 may comprise a gate circuit 115 configured to perform an AND operation on multiple input signals, and output a signal indicative of the result of the AND operation. For example, an output of the controller 101 indicative of the value of the configuration-related indicator may be operatively connected to an input of the gate circuit 115. The output of the user input device 112 may be connected to the other input of the gate circuit 115. An output of the gate circuit 115 may be operatively coupled to an input of the current flow interrupting device 111 to drive the current flow interrupting device 111 into the open state when both the user input device 112 output indicates a user-activated input via the physical touch interface, and the value of the configuration-related indicator indicates an enabled or active configuration-related status or function as described above. It will be appreciated that the control circuitry 115 can be implemented using any other logic circuitry known in the art, such as multi-stage logic configurations. Furthermore, although the control circuitry 115 is preferably implemented in digital circuitry, it will be appreciated that it may alternatively or additionally be implemented in analogue circuitry. The output of the control circuitry 115 may be operatively coupled to one or more or electrical current flow paths or lines 116 of the panel, which are operatively coupled to the installed circuit protection device(s) 200-1-200-n. The controller 201 of each circuit protection device 200-1-200-n may be configured to receive a signal indicative of the current/voltage level of the associated current flow path or line 116 and accordingly perform one or more actions based on the output of the control circuitry 115. The controller 201 may receive the signal by connecting the signal line 116 to an input interface of circuit protection device 200-1-200-n such as the communication interface 202 of the circuit protection device 200-1-200-n.

The circuit protection device 200 is preferably configured to receive or detect a signal transmitted through the current flow path or line 116 and accordingly perform one or more configuration related functions. The functions may be triggered when a "high-level" signal is detected or received along the flow path or line 116. The configuration related functions preferably comprise for instance, saving temporarily cached configuration data received during a configuration stage, into a non-volatile memory location of controller 201. Another function may be triggering the current flow interrupting device 209 of the circuit protection device 200 into an open state. Such functions may be used during a configuration process of one or more circuit protection device(s) 200-1-200-n as will be described in further detail below with regards to any one of the methods 300, 310, 350, 400, 500, 550, 560, 600 and 650.

Figure 2:
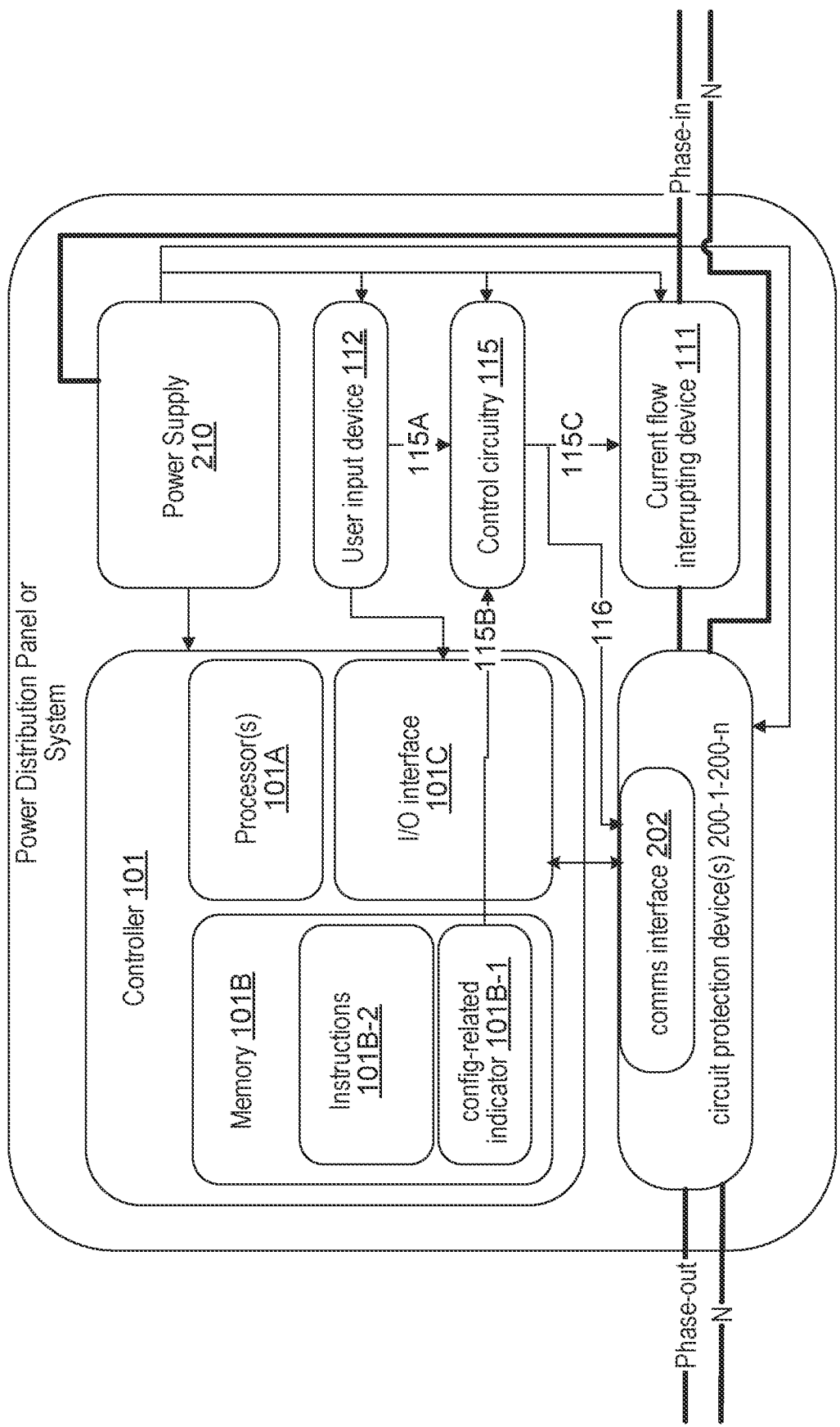
FIG. 2 is a block diagram illustrating additional features of the exemplary power distribution panel of FIG. 1.

Accordingly, and referring to FIG. 2, in the preferred embodiment the power distribution panel 100 preferably comprises one or more circuit protection device(s) 200-1-200-n, the second current flow interrupting device 111, the controller 101, the user input device 112, the configuration-related indicator 101B-1 controllable by the controller 101, and the control circuitry 115. The control circuitry 115 having inputs 115A, 115B operatively coupled to the user input device 112 and to an output of the controller 101, respectively. The output of the controller being configured to output a signal or data representative of the value of the configuration-related indicator 101B-1. An output 115C of the control circuitry 115 is operatively connected to an input of the second current flow device 111. The control circuitry 115 is configured such that the output 115C of the control circuitry 115 drives the second current flow interrupting device 111 into an open state, when the user input device 112 outputs a signal or data indicative of a physical user input via the associated physical touch interface and when the controller outputs a signal or data indicative of an enabled configuration-related status or function based on the value of the configuration-related indicator 101B-1. This combination of features provides added security against inadvertent opening of the second current flow interrupting device 111 by a user via the input 112, during normal operation when the panel 100 is not in a configuration state, for instance. Such a configuration state may be entered as per any of the methods herein described, including method 310, 350, 400, 500, 550, 560, 600 and 650.

In some embodiments, this combination of features may be implemented in a power distribution panel or power distribution system, in isolation of one or more of the other features described herein for the panel 100, the circuit protection device(s) 200-1-200-n, the second current flow interrupting device 111, the controller 101, the user input device 112, the control circuitry 115, and/or the configuration-related indicator 101B-1. Although such other features are incorporated in the preferred embodiment described herein to further enhance the functionality of the panel(s) and/or circuit protection device(s) of the present disclosure.

The controller 101 further comprises instructions 101B-2 stored in memory for setting the value of the configuration-related indicator 101B-1 based on the value of one or more indicators or the receipt or detection of one or more events as described in further detail above. The controller 101 may also be prevented from triggering the second current flow interrupting device 111 into an open state directly (i.e., without an input via input device 112) to further enhance the security of the system. In other words, the controller 101 is only operable to control opening of the current flow interrupting device 111 via the control circuitry 115. In this case, the current flow interrupting device 111 could not be tripped even if the controller 101 is maliciously accessed by a remote hacker, without an additional user input that indicates a user's physical presence at or near the panel 100. Accordingly, the combination of necessitating a physical user input (via 112) and providing a configuration-related indicator controllable by the controller 101 enhances the overall security of the system, particularly with regards to the configuration methods herein described.

The signal line 116 is preferably operatively coupled to an input interface of each circuit protection device 200-1-200-n, and the device 200-1-200-n is configured to perform one or more configuration-related function(s) in response to the signal or data received via signal line 116. For example, as explained with reference to method 300 shown in FIG. 3 below, or as explained with reference to controller 201 shown in FIG. 5, the controller 201 of each device 200-1-200-n may be configured to receive or detect data or signal(s) transmitted through signal line 116. The controller may be configured to perform one or more of the following function(s) in response to an output 115C of the control circuitry 115 indicating a user input via the device 112:

store configuration data relating to a received configuration instruction in a non-volatile memory location (e.g., 201B-4 as described below); and/or trigger a current flow interrupting device 209 of the device into an open state to enter a safe configuration state (as described in further detail below).

In some embodiments, the panel 100 does not comprise a second current flow interrupting device 111 and the output of the control circuitry 115 may still be operatively connected to one or more circuit protection device(s) 200-1-200-n of the panel to enable each device to perform the abovementioned function(s) in response to signal or data transmitted from the output 115C of the control circuitry 115 via signal line 116. In such embodiments, the panel 100 still benefits from necessitating a physical user input to initiate a configuration process of the panel 100 and/or of one or more circuit protection device(s) installed in the panel 100.

Figure 3:
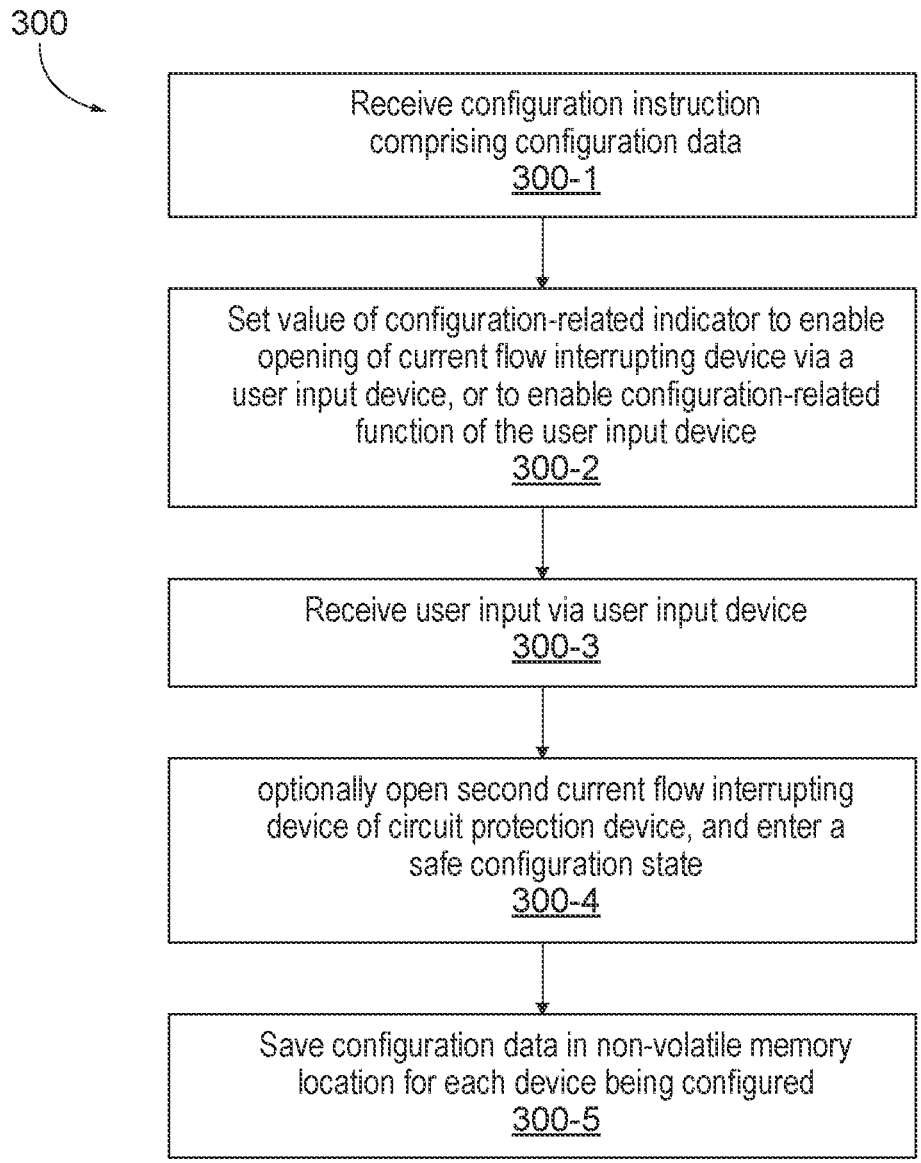
FIG. 3 is a flow diagram depicting a method for operating a power distribution panel to initiate configuration of one or more circuit protection device(s) in accordance with an exemplary embodiment of the present disclosure.

Referring to FIG. 3, an embodiment of a computer-implemented method 300 of the present disclosure, for operating a circuit protection device 200 or for operating a power distribution panel 100 of the present disclosure is shown, illustrating a process for initiating a configuration process. The method 300 facilitates safe and secure configuration by necessitating user involvement in the initiation of a configuration process as described above. At a first stage 300-1, configuration instruction(s) are received for the circuit protection device 200, or one or more of the circuit protection device(s) 200-1-200-n in the panel 100. The configuration instruction(s) are preferably transmitted from a remote or separate device, such as user device 302 and received by the controller 101 of the panel 100 (via the communications interface 102). After receiving the configuration instruction(s), at stage 300-2, the controller 101 sets the value of a configuration-related indicator to enable opening of a current flow interrupting device (e.g., 111) via a user input device (e.g., 112). Opening of the current flow interrupting device interrupts delivery of primary power to the input power side connection of the device 200, or the input power side connection of each device 200-1-200-n in the panel 100 as described herein in relation to current flow interrupting device 111. The user input device (e.g., 112) preferably comprises a physical touch interface. The value of the configuration-related indicator may be set as described above in relation to FIG. 2. The configuration-related indicator may be stored in electronic memory 101B of the controller 101 or another memory location accessible by the controller 101B as described above in relation to FIG. 2. After the configuration-related indicator is set to enable opening of the current flow interrupting device (e.g., 111), at step 300-3 the method comprises receiving a physical input via a user input device (e.g., 112), and accordingly, at step 300-4 opening the current flow interrupting device to interrupt the associated electrical current flow path based on the user input and the value of the configuration-related indicator. As mentioned above, this method 300 places the device 200, or each device 200-1-200-n in the panel 100 in an operative state that is safe for configuration by interrupting the flow of primary power to the circuit protection device 200, or device(s) 200-1-200-n. Alternatively, or in addition, at step 300-4, the method 300 signals for the device 200, or for each device 200-1-200-n to perform one or more actions to enter the safe configuration stage, such as opening of a second current flow interrupting device 209 of the device 200/200-1-200-n.

Alternatively, or in addition, the method 300 signals for the device 200, or for each device 200-1-200-n to perform one or more actions to initiate a verification stage of the configuration process, at which point the device 200 or each device 200-1-200-n may save configuration data associated with the respective configuration instruction in a non-volatile memory location of the device 200/200-1-200-n (e.g., memory location 201B-4 described further below in relation to controller 201 and with reference to FIG. 5). This step 300-5 is optional but preferred within method 300. Prior to this step 300-6 and after receiving the configuration instruction at step 300-1 the configuration data associated with the configuration instruction may be cached in a volatile memory location of the respective device 200/200-1-200-n (e.g., memory location 201B-2 described further below in relation to controller 201 and with reference to FIG. 5).

In an alternative implementation of method 300, the step 300-4 may not be implemented, particularly when a safe configuration state is not required by the circuitry of the circuit protection device 200. An example of this would be if two controllers were used to configure and operate the device. This is described in further detail below with the discussion of the phrase "safe configuration state" as used in this specification. In such an implementation, at step 300-2 the configuration-related indicator value may be set to enable a configuration-related function of the user input device 112. Accordingly, at step 300-5 following the receipt of the user input via device 112, the configuration data is saved in the non-volatile memory location based on the status/value of the configuration-related indicator value and the receipt of user input.

The method 300 may be implemented in any other embodiment of the present disclosure relating to a configuration method, for initiating the configuration method of that embodiment as will be apparent from the description. It may also be implemented in other configuration methods, for example ones that may not require a user's physical presence during a verification stage, but where security and safety is still enhanced by necessitating a physical presence during the initiation stage of this method 300. In other words, in one embodiment of a method for configuring a circuit protection device, or for configuring a power distribution panel comprising one or multiple circuit protection device(s), the method 300 may comprise permanently storing the configuration data for each respective device 200/200-1-200-n being configured at or following stage 300-5. This may be followed by operating each device 200/200-1-200-n based on the new permanently stored configuration data.

As mentioned, method 300 can independently provide benefits to devices, systems and methods not disclosed herein by necessitating a physical user input to provide added security to the configuration process at least during the configuration initiation state of the process. Although, added benefits may be obtained by implementing method 300 in the other configuration method embodiments described herein as would be apparent from the disclosure.

Referring back to FIG. 1, the power distribution panel 100 further comprises at least one low-voltage power supply circuit or system 210, herein referred to as an extra-low-voltage (ELV) power supply 210. The terms "low-voltage" and "extra-low-voltage" as used herein are not intended to place a limit on the level of voltage that may be supplied by the power supply 210. Rather, the term is intended to indicate a lower supply of power than the main primary power supply/source connected to the power distribution panel 100 for delivering power to the connected circuits/loads 171-1-171-m, 172. Accordingly, the ELV power supply can also be referred to as a secondary low-voltage supply of the panel 100 for instance. Each ELV power supply 210 comprises a voltage input and a voltage out, and is configured to convert a higher voltage input, which may be received from the mains input 110 or one or more of the auxiliary power sources 174 connected to the power distribution panel 100, into a target lower voltage output that is safe for powering low voltage devices of the system, such as controllers and other peripheral devices of the power distribution panel and/or of one or more of the circuit protection device(s) 200-1-200-n. The target output voltage may be lower than 50Vac, or 125Vdc, for instance. However, it will be appreciated these ranges are only exemplary and not intended to be limiting. In an embodiment, an ELV power supply 210 of the panel 100 is configured to output a target secondary voltage of approximately 12Vdc for panel 100 and/or one or more circuit protection device(s) 200-1-200-n.

Each ELV power supply 210 comprises any suitable electrical components required to convert a higher voltage AC or DC input supply to a lower AC or DC output voltage, as is well understood in the art. For instance, the ELV power supply 210 may comprise an isolating and step-down transformer, having a primary winding connected between the phase and neutral lines for stepping down the input voltage, rectifier(s) for converting AC voltage to DC, filter(s) for smoothing out the output voltage, and/or voltage regulator(s) for regulating the output voltage and ensuring it remains stable and within desired voltage range.

In a preferred embodiment, the voltage input of the ELV power supply 210 is electrically connected to the phase line of mains supply input 110, preferably upstream of the current flow interrupting device 111 such that the supply of electrical power to the ELV power supply 210 is unaffected by the operative state of the current flow interrupting device 111. In other words, when the current flow interrupting device 111 is triggered into an open state the voltage at the output of the ELV power supply 210 remains at the target output voltage. In this manner, during configuration of each circuit protection device 200-1-200-n, the current flow interrupting device 111 can be triggered into an open state, to disconnect the device from the primary source of higher voltage power for safety. In this state, the ELV power supply 210 continues to supply and maintain a substantially stable supply of lower voltage power to each circuit protection device 200-1-200-n, to enable the device to perform the configuration functions, described in further detail below. The ELV power supply 210 is preferably also electrically connected to the mains supply input 110 downstream of the flow interrupting device 105 such that the state of the flow interrupting device 105 controls the input voltage of the ELV power supply 210. In other words, when the flow interrupting device 105 is in a closed state, the voltage level at the output of the ELV power supply 210 is substantially at the target output voltage, and when the flow interrupting device 105 is in an open state, the output voltage is substantially at 0V.

The power distribution panel 100 comprises an ELV power supply 210 electrically connected at the output to multiple circuit protection device(s) 200-1-200-n. There may be multiple ELV power supplies 210, each connected to a distinct group of circuit protection device(s) 200-1-200-n in some cases, or a single ELV supply 210 connected to all circuit protection device(s) 200-1-200-n, as shown. In some embodiments, one or more circuit protection device(s) may comprise a dedicated ELV power supply 210, or may incorporate an ELV power supply 210 as described herein.

In the embodiment shown, the controller 101 is preferably connected to a voltage output of the ELV power supply 210. Other peripheral devices of the panel 100, such as I/O devices 109 and the communications interface 102 are also preferably connected to a voltage output of the ELV power supply 210.

Figure 4:
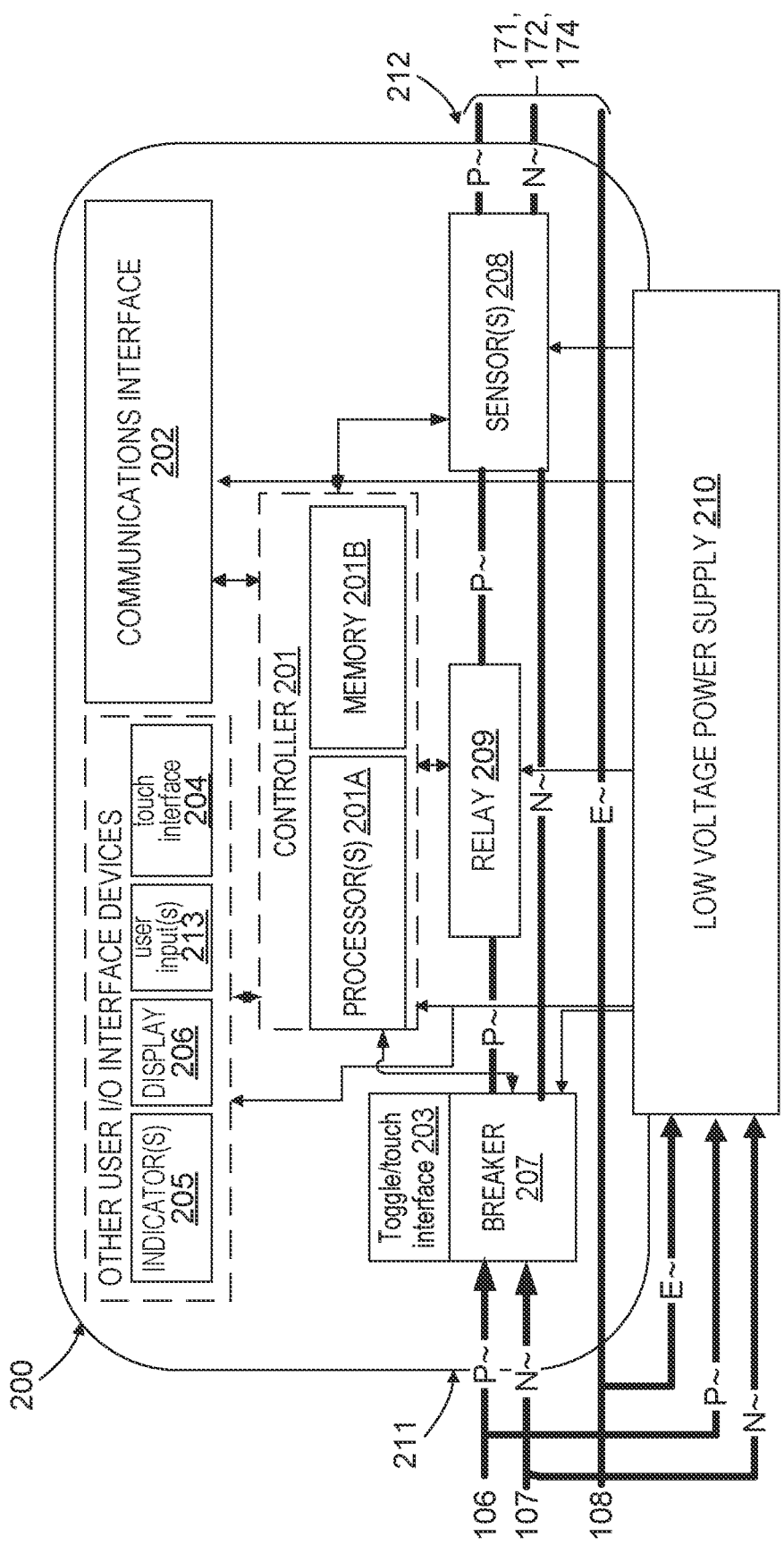
FIG. 4 is a block diagram illustrating a circuit protection device of the present disclosure in accordance with an exemplary embodiment.

Referring to FIG. 4, an exemplary embodiment of a communication-enabled, configurable circuit protection device 200 of the present disclosure is shown. The device 200 may represent any one or more of the circuit protection devices 200-1-200-n installed in the power distribution panel 100. The circuit protection device 200 comprises a primary power or voltage input connection 211 (referred to as power input connection 211 throughout the specification, but this may be alternatively be referred to as a voltage input connection 211 for any of the embodiments described herein) for electrically connecting the circuit protection device 200 to at least one source of primary electrical power or electrical voltage, and a load connection 212 for electrically connecting the circuit protection device 200 to a sub-circuit or load (e.g., 171-1-171-m, 172) to deliver a voltage to the sub-circuit or load. At the power input connection 211, the device 200 comprises multiple connections or terminals comprising at least a phase connection and a neutral connection. The phase and neutral connections are configured to electrically connect to the phase and neutral lines of a power source, e.g., via the phase busbar 106 and neutral busbar 107, respectively. At the load connection 212, the device 200 comprises multiple connections or terminals comprising a phase connection and a neutral connection for electrically coupling corresponding phase and neutral connections of a corresponding sub-circuit or load (e.g., 171, 172). In this manner, electrical current can enter the circuit protection device 200 via the phase connection at the input power side 211, exit via the phase connection at the load side 212, return to the device 200 via the neutral connection at the load side 212 and exit the device 200 at the neutral connection at the power input side 211. The device 200 further comprises an input connection for coupling to an earth/ground stake (e.g., via earth busbar 108), and an earth connection at the load side 212 for grounding the connected sub-circuit or load in situ.

The primary input connection 211 receives the generally higher voltage electrical current that operates the associated sub-circuit or load connected to the circuit protection device 200. This is distinct from any input power connections associated with the secondary low-voltage supply, intended to provide the generally lower voltage electrical power to one or more circuits or devices of the circuit protection device, such as the controller 201, communications interface 202 and other peripheral circuits or devices.

The load side connection 212 may be configured or utilised as an input such as when the circuit protection device 200 is connected to an external power source, e.g., a renewable energy system 173 or an electrical power storage device 174. The power or voltage input connection 211 may be configured or utilised as a power or voltage output connection, and the direction of electrical current flow may be reversed to the flow mentioned above when the connection 211 is configured as an input. Accordingly, the connection 211 is not intended to be limited to an input configuration or to an output configuration, but instead may be configured or utilised based on the connected load. Although it may be referred to as an input connection or input side 211 throughout this specification, it will be appreciated that the configuration of connection 211 could be reversed and the terminology "input side 211" could equally be substituted for "connection 211", "power distribution connection 211", or "power distribution side 211", in each of the embodiments described herein, to also encompass a potential output configuration of the connection 211.

The device 200 further comprises one or more sensing device(s) 208 configured to measure one or more electrical parameters such as current and/or voltage at one or more locations of an electrical current flow path between the power input side 211 and load side 212 of the device 200, and output data indicative of the measured parameter(s). In the preferred embodiment, a first current sensor 208 is coupled to the phase line or neutral line to acquire and output data indicative of the current flowing from the power input side 211 to the load side 212 of the device 200, which may be indicative of current flowing through the connected sub-circuit or load. One or more other current sensors having a different sensing range to the first current sensor may also be electrically coupled to the phase or neutral lines. The first current sensor may comprise a current sensing range that is suitable for general load monitoring, arc fault detection, or overcurrent fault detection, for instance. Whereas a second current sensor may comprise a current sensing range that is significantly higher than the first current sensor and suited for short-circuit detection. A fluxgate sensor may be magnetically coupled about the phase and neutral lines of the circuit protection device 200 to acquire and output electrical signals or data indicative of a residual current which may be flowing directly between the phase and neutral lines.

The circuit protection device 200 further comprises one or more electrical current flow interrupting devices (e.g., shunt breaker 207 or relay 209) electrically coupled to the current flow path between the power input side 211 and load side 212 of the device 200. In the embodiment shown, in situ, a first flow interrupting device 207 operatively couples the phase and neutral lines 106, 107 of the circuit protection device 200 to interrupt the delivery of power to the load side 212 when the device 207 is actuated into an open state, and to permit the delivery of power when actuated into a closed state. A second current flow interrupting device 209 may be electrically connected to the phase line 106 downstream of the first flow interrupting device and operable to control the current through the flow path between the power input side 211 and the load side 212. The second current flow interrupting device 209 can be controlled to switch between an open state in which current flow through the device is interrupted and a closed state in which current flow through the device is permitted. In some embodiments, the second current flow interrupting device 209 is located upstream of the first current flow interrupting device 207, with respect to the electrical flow path from the power input side 211 to the load side 212.

The circuit protection device 200 further comprises a controller 201 comprising one or more processing components (herein: processor(s) 201A) and associated electronic storage medium or media (herein: electronic storage 201B). The controller 201 is responsible for receiving input, processing information, and generating output to control the behaviour or operation of the device 200 or any other systems or circuits with which it is associated. It may be implemented using any combination of electronic circuits, processors, electronic storage, and/or programmable logic. The controller 201 is preferably electrically connected to an input power supply, such as an ELV power supply 210 of the power distribution panel 100. The circuit protection device 200 may comprise the power supply 210 circuitry in some embodiments. The ELV power supply 210 is preferably configured to supply an output voltage that is stable and safe for operating the electrical components 201-209 associated with the circuit protection device 200. The voltage may be appropriately conditioned in any manner known in the art to provide the supply voltage to any one or more of electrical components 201-209. The voltage provided by the power supply 210 is preferably substantially uninterrupted even when the first current flow interrupting device 207 and/or the second current flow interrupting device 209 are tripped into open states.

The electronic storage 201B of controller 201 stores instructions and other associated data to be executed by the processor(s) 201A. The electronic storage 201B may comprise a single medium or multiple media which may or may not be physically closely associated with one another. Similarly, the processor(s) 201A may comprise a single processor, or multiple processor(s) 201A which may or may not be physically closely associated with one another. Collectively, the processor(s) 201A and the storage medium or media 201B are configured or configurable, and operable, to perform the function(s) of the controller 201 described herein.

The electronic storage 201B may comprise a non-volatile or non-transitory storage medium or media for storing instructions or other data that is intended to remain accessible by the processor(s) 201A when the controller 201 is deactivated and then reactivated again (e.g., when power to the panel 100 or to the protection device 200 is disconnected and then reinstated). The electronic storage may further comprise a volatile or transitory storage medium or media for temporary storage of data while the controller 201 is activated. This data is intended to be deleted from the temporary storage before or when the controller 201 is deactivated, e.g., when power to the circuit protection device 200 is disconnected.

In the embodiment shown of power distribution panel 100, each circuit protection device 200-1-200-*n* comprises a dedicated controller 201. In some embodiments, a plurality of the circuit protection devices 200-1-200-*n* may be electrically coupled to a common module controller configured to monitor and/or control operation of the multiple circuit protection devices 200-1-200-*n*. Accordingly, a controller 201 may be configured to perform the functions described herein, for multiple circuit protection devices 200-1-200-*n* in some embodiments. Accordingly, although the functions performed by controller 201 will be described in relation to circuit protection device 200, it will be appreciated that in some embodiments, the controller may also perform the same or similar functions 201 for other circuit protection devices 200-1-200-*n* of panel 100.

The circuit protection device 200 is pre-configured with hardware to perform at least one, but preferably multiple sub-circuit monitoring, detection and/or protection function(s). The functions are configurable in software such that the function(s) of the device can be configured and then reconfigured, in-field, using the same hardware. The functions may be pre-configured in software during manufacture or initial installation of a power distribution panel, and then subsequently reconfigurable after operation of the power distribution panel. In a power distribution panel 100, multiple installed circuit protection devices 200-1-200-*n* may be configured to perform the same function(s) during operation, and/or multiple installed circuit protection devices 200-1-200-*n* may be configured to perform varying function(s) during operation.

The configurable function(s) preferably comprise(s) fault detection function(s) and/or circuit protection functions. For instance, a fault detection function may analyse received sensor data from one or more sensing device(s) 208 and accordingly determine if a fault condition exists based on the received data. The fault condition is preferably based on a configured threshold condition or criteria associated with one or more operational parameter(s), e.g., current and/or voltage. The circuit protection device 200 further configured to perform circuit protection or safety function(s) by controlling one or more current flow interrupting device(s) (e.g., 207 or 209) to disconnect the power input side from the load side when a configured condition, such as a fault condition, is determined or detected. As used herein, the term "fault" could include any of a variety of conditions for which it may be desirable/necessary for the circuit protection device to disconnect the power input connection from the load connection. For example, "fault" may be a fault within the circuit protection device itself, a fault on the load side, a fault on the power input side, or the like. A "fault" may be a residual current/ground fault, an arc fault, an overcurrent fault, or the like.

The configurable fault detection and/or the circuit protection function(s) may be executable by the circuit protection device 200 during operation, based on configuration data stored in memory (e.g., memory 201B) and accessible by controller 201. The controller 201 may execute the function(s) based on the configuration data, or alternatively may operate one or more other devices or circuits of the circuit protection device to perform the function(s) based on the configuration data. The other devices or circuits include, for instance, the first current flow interrupting 207, the second current flow interrupting device 209 and/or other digital or analogue circuitry of the device 200. In either implementation, the controller 201 is operable to access instructions stored in memory (e.g., memory 201B), for performing the one or more function(s), and execute the function(s) (e.g., via processor(s) 201A) based on the configuration data.

In some embodiments, the configuration data may comprise the instructions for performing one or more of the configurable function(s). Alternatively, or in addition, the instruction(s) for performing one or more of the function(s) are pre-stored in memory (e.g., pre-stored in memory 201B) and the configuration data indicates which of the function(s) are operable by the controller 201, and/or configures operative parameters associated with the function(s).

Instruction(s) for performing one or more fault detection function(s) preferably comprise for instance, one or more of: overcurrent detection instructions, arc fault detection instructions, and/or residual current fault detection functions. Operating parameter(s) associated with these function(s) might comprise, for instance, one or more threshold conditions or criteria relating to one or more operating parameter(s) for identifying or detecting the fault condition. The operating parameter(s) associated with a particular fault condition may comprise any combination of electrical characteristics, including for example: current amplitude, a frequency of the current, a duration of an overcurrent condition, an indication of a thermal energy associated with an electrical event (such as a product or the square of the current and time ($i^2t$)), a temperature of the device, etc. Other parameters may be implemented for detecting a fault condition as would be apparent to those skilled in the art. The data may be acquired or received from one or more sensing device(s) 208 associated with the circuit protection device 200.

For illustrative purposes only, the fault detection function(s) may, for instance, comprise instructions to determine an overcurrent fault condition by: 1) receiving data indicative of current amplitude (e.g., from a sensor 208), and 2) determining if a maximum or average current between the power input side 211 and load side 212 exceeds a threshold value. In step 1) the current amplitude over time may be received, and in step 2) a time integration of the current over a time period may be determined before comparing to the threshold value. The threshold value may be determined from the configuration data. The threshold may be a maximum current of 16 amperes (A) for one or more circuit protection device(s) 200-1-200-n installed in panel 100, and 32A for one or more other circuit protection device(s) 200-1-200-n installed in panel 100, depending on the load requirements of the associated sub-circuit, for instance. Other thresholds for overcurrent fault detection may be used and the present disclosure is not intended to be limited to these examples. The fault condition function(s) may alternatively or additionally comprise instructions for detecting an arc fault and/or for detecting a ground fault or residual current fault. The configuration data may indicate which of the fault detection function(s) are enabled for a circuit protection device, such that in a power distribution panel 100 one or more circuit protection device(s) 200-1-200-n may be configured and operable based on the associated configuration data to perform a first combination of one or more of: overcurrent fault detection, ground fault detection and/or residual current detection, and one or more other circuit protection device(s) 200-1-200-n may be configured and operable based on the associated configuration data to perform a second combination (differing from the first combination) of one or more of: overcurrent fault detection, ground fault detection and/or residual current detection.

The operative function(s) of the circuit protection device 200 preferably also comprise instructions for controlling a flow of current between the power input side 211 and the load side 212 of the circuit protection device 200 based on one or more detected fault condition(s). Controlling the flow of current may comprise interrupting the flow of current to protect the connected sub-circuit in the event of a detected fault condition. The controller 201 may be operable to perform the circuit protection function(s) based on the configuration data, for instance by sending a trip control signal to one or more current flow interrupting devices (e.g., 207 or 209, or 105), when one or more configured fault condition(s) are detected. In some implementation(s), the configuration data may comprise the instructions relating to the fault protection function(s). In other embodiments, the configuration data indicates which of the fault protection function(s) are operable by the circuit protection device 200.

The configuration data for executing the abovementioned operative function(s) is stored in memory accessible by controller 201 (either directly or indirectly). This may be electronic storage 201B of controller 201 for one or more circuit protection device(s) 200-1-200-n installed in the panel 100, or alternatively it may be an electronic storage that is external to the circuit protection device 200, such as electronic storage 101B of the central controller 101 of panel 100. The configuration data is committed to memory such that it resides in a more permanent storage, such as a non-volatile memory location and/or by affirming the permanent status of the data. Once committed to memory, the configuration data remains accessible for device operation even after power cycles or resets. The configuration data associated with a circuit protection device 200 and stored in memory may be configured, and reconfigured or updated, by controller 101 of the panel 100 and/or controller 201 of the circuit protection device 200, as will be explained in further detail below. Accordingly, the phrase "permanent storage" in this context does not imply immutability; rather, it signifies that the configuration data is stored in a manner that is maintained during standard operation cycles of the device 200, with the understanding that the configuration data may be replaced or modified in response to updated or newly verified configuration data as explained in further detail below.

As mentioned, the circuit protection device 200 comprises an electrical current flow interrupting device 207 and an electrical current flow interrupting device 209, both electrically coupled to the current flow path between the power input side 211 and load side 212 of the device 200. At least one of the first or second devices 207, 209, but preferably both, are electrically coupled to an electrical current flow path configured to deliver electrical power to a load associated with the circuit protection device 200. Each device 207, 209 is operable in one of two operative states: an open state in which the flow of current through the associated electrical current flow path is inhibited, and a closed state in which the flow of current through the associated electrical current flow path is permitted. The devices 207 and 209 of the circuit protection device 200 are preferably connected in series along the electrical current flow path. In some embodiments, the circuit protection device 200 may only comprise the device 207 and the device 209 is optional.

In the embodiment shown, in situ, the first current flow interrupting device 207 operatively couples the phase and neutral lines 106, 107 of the circuit protection device 200 to interrupt the delivery of power to the load side 212 when actuated into an open state. In some embodiments, it may only couple the phase line 106. The first current flow interrupting device 207 may be an electromagnetic circuit-breaker or a solid-state circuit-breaker, for instance, operative between a first open state and a second closed state to electrically interrupt and permit the flow of current through the circuit protection device 200, respectively. In particular, in an open state, the first current flow interrupting device 207 interrupts the flow of current between the power input side 211 and the load side 212 along both the phase and neutral lines. In a closed state, the first current flow interrupting device 207 permits the flow of current between the power input side 211 and the load side 212. The circuit breaker 207 is preferably a shunt breaker that is remotely operable to trigger into the open state. A user input, via the physical touch interface 203 is provided to trigger the breaker 207 back into the closed state. This may be the only method for triggering the breaker back into the closed state, for safety. Although in some implementations, the breaker 207 may be triggerable into the closed state by an external control signal, such as one received from the controller 201.

In some embodiments, the breaker 207 may comprise one or more of the sensor(s) 208 and associated circuitry for performing one or more functions. Such function(s) may include any one or more of: determining a current state of the breaker 207 (open or closed) based on data indicative of sensor output(s), determining a current state of a power supply, such as the ELV supply and/or the primary supply based on the sensor output(s), and/or one or more of the fault detection and/or circuit protection function(s) mentioned above. The breaker 207 may be operable to perform the fault detection and circuit protection function(s) based on the configuration data accessible by controller 201. Alternatively, the controller 201 is configured or configurable, and operable, to perform the one or more operative function(s) based on the configuration data, including triggering the first current flow interrupting device 207 into the open state when a preconfigured fault condition is received or detected. The controller 201 sends a control signal to the first current flow interrupting device 207 to trigger the device into the open state. The controller 201 is preferably also operable to trigger the first current flow interrupting device 207 into the open state when other preconfigured conditions are met, such as when data is received by the controller 201 indicative of a request or instruction to configure or update the configuration of the device 200. A request or instruction to configure or update the configuration of the device 200 may be received from a device external to the circuit protection device 200, such as the central controller 101 of panel 100, or a device remote to the power distribution panel 100 that is communicatively coupled to the controller 201. In an open state of the first current flow interrupting device 207, the controller 201 preferably remains operable to perform one or more functions, such as read and/or write data in memory 201B to configure or update a configuration of the device 200, and/or receive or transmit data from or to an external device such as controller 101 or a communicatively coupled remote device (e.g., 302-305) via the ELV power supply 210.

In a closed state, the first current flow interrupting device 207 permits the flow of current between the power input side 211 and the load side 212. As mentioned above, in some embodiments, the controller 201 may be operable to trigger the first current flow interrupting device 207 into the closed state when a predetermined condition is met (e.g., a user input 203). In some embodiments, the controller 201 may be operable to trigger the first current flow interrupting device 207 into the closed state when a reset control signal is received by the controller 201, or when a preconfigured reset condition is determined by the controller 201 (e.g., based on data received from the sensor(s) 208 or based on data received from an external device such a remote control signal). As mentioned, in some embodiments, the first current flow interrupting device 207 may only be triggerable into the closed state directly via a user input via a physical touch interface 203 for safety.

The first current flow interrupting device 207 may comprise the user input device 203 or it may be operatively coupled to the user input device 203. The user input device 203 comprises a physical touch interface to enable a user to physically interact with the device 203 and switch between open and closed states of the flow interrupting device 207 (and/or vice versa). In the preferred embodiment, the current flow interrupting device is a mechanical or electromagnetic switch and the user input 203 comprises a mechanical actuation mechanism for enabling a user to interact with and directly actuate or toggle the change in state of the current flow interrupting device 207. In such an implementation, the first current flow interrupting device 207 may be an electromagnetic shunt breaker for instance. In some embodiments, the input device 203 may generate and send an electronic control signal to the controller 201, which in turn triggers the first current flow interrupting device 207 to switch states. In such an implementation the first current flow interrupting device may be a solid-state circuit-breaker, for instance. Other implementations of a current flow interrupting device suitable for opening an electrical current flow path in response to fault conditions are disclosed in WO2022/018704, the details of which are hereby incorporated by reference.

The first current flow interrupting device 207 is preferably electrically coupled to the power input side 211 upstream of the sensors 208 and the second current flow interrupting device 209, with respect to the electrical flow path from the power input side 211 to the load side 212. As mentioned above, in some implementations current flow interrupting device 207 may comprise one or more of the sensor(s) 208, such as voltage sensors.

The physical touch interface device 203 enables a user to physically interact with and alter the operative state of the first current flow interrupting device 207. In this manner, a user 301 can trigger the first current flow interrupting device 207 into the closed state, for instance, after it has been triggered into an open state as a result of a fault condition, when it is deemed safe to do so.

The circuit protection device 200 further comprises a second current flow interrupting device 209. The second flow interrupting device preferably comprises a relay 209 electrically connected to the phase line only of the circuit protection device 200 downstream of the first current flow interrupting device 207, for enabling load control and/or load shedding functionality. Implementations of a relay for load control and management functionality are disclosed in WO2022/018704, the details of which are hereby incorporated by reference. The relay 209 may comprise a relatively smaller width air gap (between the relay contacts) in an open state of the relay, compared to the air gap width (between the contacts) of the first current flow interrupting device 207 when in an open state. Accordingly, the relay 209 may only be used for certain load control and/or load shedding functionality and may not be suitable for circuit protection function(s) requiring a larger air gap in the open state. On the other hand, the first current flow interrupting device 207 preferably comprises a sufficiently wide air gap (between the contacts) in the open state for performing circuit protection function(s) relating to high current faults, such as overcurrent faults, arc faults and/or residual current faults. In other implementations, a single current flow interrupting device 207 may be used, such as a solid state relay, operative to perform the safety and protective function(s), as well as non-protective load control functions described herein, and no other current flow interrupting device(s) (e.g., 209) are incorporated in the device for this purpose.

The controller 201 is configured or is configurable, and operable, to trigger the second current flow interrupting device 209 into the open state based on detection or receipt of a preconfigured trigger condition by the controller 201, by sending a control signal to the second flow interrupting device 209. The preconfigured condition comprises the receipt of data or signal(s) indicative of a request or instruction to configure or update the configuration of the device 200. A request or instruction to configure or update the configuration of the device 200 may be receivable from a device external to the circuit protection device 200, such as the central controller 101 of panel 100, or a device remote to the power distribution panel 100 and communicatively coupled to the controller 201. Alternatively, or additionally, the preconfigured condition comprises the receipt of data or signal(s) indicative of an open state of current flow interrupting device 111, when device 200 is installed in panel 100. A signal indicative of an open state may be a high-level signal on current flow path or line 116 of the panel 100 as previously described, for instance. In an open state of second flow interrupting device 209, the controller 201 preferably remains operable (due to the ELV power supply 210) to perform one or more functions, such as read and/or write data in memory 201B to configure or update a configuration of the device 200, and/or receive or transmit data form or to an external device such as controller 101 or a communicatively coupled remote device (e.g., 302-305).

In a closed state, the second flow interrupting device 209 permits the flow of current between the power input side 211 and the load side 212. The controller 101 is operable to trigger the second flow interrupting device 209 into the closed state based on a reset control signal received by the controller 201, or based on detection of a preconfigured reset condition by the controller 201 (e.g., based on data received from the sensor(s) 208 or based on data received from an external device such as a remote control signal). The second flow interrupting device 209 is preferably electrically coupled to the power input side 211 downstream of the first current flow interrupting device 207, with respect to an electrical current flow path from the power input side 211 to the load side 212. The circuit protection device 200 further comprises a second physical touch interface device 204 that is operatively coupled to or operatively associated with the second flow interrupting device 209 to enable a user to toggle the second flow interrupting device 209 between the closed and open states.

The physical touch interface device 204 comprises an interface for receiving a physical input from the user, which may be in the form of a switch, button or other touch-sensitive interface. The physical touch interface device 204 preferably generates a control signal upon receiving an input from a user via the interface. In some embodiments, the control signal is sent directly to the second flow interrupting device 209 for triggering or altering an operative state of the device 209. In other embodiments, the control signal is sent to the controller 201 for indicating the user's intention to toggle or alter an operative state of the device 209. For instance, the controller 201 may be operatively coupled to the physical touch interface device 204 to identify an operative state of the physical touch interface 204 (e.g., pressed) and accordingly control the second current flow interrupting device 209 to open or close the second current flow interrupting device 209 based at least on the operative state. The controller 201 may be configured to toggle a state of the second current flow interrupting device 209 based on receipt of a control signal indicative of a detected operative state of physical touch interface device 204 (e.g., pressed state). The controller 201 may only operate the device 209 based on the control signal when one or more other conditions are identified.

In some embodiments, the physical touch interface device 204 may comprise a mechanical actuation mechanism for mechanically altering a state of the second flow interrupting device 209. The physical touch interface device 204 may be physically coupled to the second current flow interrupting device 209 to enable a user to switch the state of the second current flow interrupting device 209 via physical interaction.

In the preferred embodiment, the controller 201 is operable to switch the second current flow interrupting device 209 from a closed to an open state upon receipt of a control signal indicative of an actuated or activated state of the physical touch interface 204 (e.g., a pressed state), when the second current flow interrupting device 209 is in the closed state. In the preferred embodiment, the controller 201 is operable to switch the second current flow interrupting device 209 from an open state to a closed state upon receipt of a control signal indicative of an actuated or activated state of the physical touch interface 204, when the second current flow interrupting device 209 is in the open state.

In some embodiments, the second current flow interrupting device 209 may be electrically connected to both the phase line and the neutral line of the circuit protection device 200. In the preferred embodiment, the second current flow interrupting device 209 is operated to trigger it into the open state upon or after a fault condition is detected. This may be in response to detection/identification of a fault condition and/or triggering of the first current flow interrupting device 207 into the open position (as a result of a fault condition). In such embodiments, the first current flow interrupting device 207 may be a solid-state device and the second current flow interrupting device 209 may be a relay connected in series to the device 207. A common actuator may be operable via a physical touch interface (e.g., a button) to trigger the devices 207 and 209 into closed and/or open states. The actuator may send a control signal to one or both devices to trigger a state of the device upon actuation by a user.

The circuit protection device 200 further comprises a communications interface 202 or is associated with a communication interface 202 that is common to multiple control devices 200. The communications interface 202 communicatively couples the communications interface 102 to exchange data between the controller 101 and the circuit protection device controller 201. In some embodiments, one or more of the communication enabled circuit protection device(s) 200-1-200-n may be further configured to communicate to remote devices, such as user device 302, remote server 304, remote database 305, and/or network 303, via the associated communications interface 201.

The communications interface 202 may comprise a wireless communications interface comprising wireless technology configured to communicate with remote computing device(s) (e.g., 302-305) and/or other panel device(s) (e.g., controller 101) via a wireless communication channel (e.g., a short-range wireless/near field wireless technology, Bluetooth®, Wi-Fi, ZigBee®, etc.). The wireless communication components of the communication interface 202 may include radio transmitting and receiving circuitry, an antenna, and a processor for instance, configured to communicate using a wireless transmission scheme, such as, for example, BLE. The wireless communication interface 202 may be operable to communicate over a number of wireless frequencies or schemes. As such, the processor, radio and antenna of the communications interface 202 could be configured to communicate over multiple wireless communication technologies, such as, for example, BLE and Wi-Fi.

The communications interface 202 may alternatively or in addition comprise an interface for wired communication with one or more remote computing device(s) (e.g., 302-305), and/or with other device(s), e.g., controller 101, of the power distribution panel 100. The wired communications interface may comprise any wired communication technology (e.g., Ethernet, CANbus, RS232, USB, or the like). The communication between interfaces 102 and 202 may comprise a serial communication bus in some exemplary embodiments.

The circuit protection device 200 further comprises one or more visual or audio output devices, such as indicator(s) 205. Each indicator may be any suitable type of indicator such as a visual or audible indicator including but not limited to, an illumination means, such as a light emitting diode (LED), or an electroacoustic transducer, such as piezoelectric buzzer. In a preferred embodiment, the indicator 205 comprises at least one light emitting diode (LED). The LED 205 may be operated to illuminate to a predefined colour, illumination pattern, and/or illumination frequency, by controller 201 during operation, to indicate a mode of operation and/or a fault condition, for instance.

The circuit protection device 200 further comprises an electronic display 206. The electronic display is preferably a low power display. The electronic display 206 preferably comprises an interface configured to display alphanumeric characters and/or symbols to output at least an indication of a configuration of the device 200 to the user. The electronic display preferably comprises a low-power bistable display, such as an electronic ink (e-ink) display. The controller 201 is configured to operate the display 206 to output information indicative of an existing configuration, or of a proposed configuration update depending on a mode of operation of the controller 201/device 200.

The circuit protection device 200 may further comprise one or more other user input device(s) which may comprise a physical touch interface device 213, such as electronic switches, buttons, touchscreen displays and the like for receiving a physical input from a user to operate the device 200. The physical touch interface device(s) 213 may be coupled to the controller 201 to send signals to the controller indicative of user activation or a user input and accordingly the controller 201 may perform one or more functions based on prestored instructions. For instance, the physical touch interface device(s) 213 may comprise a touch interface in the form of a button which may be associated with a test function of the device 200. Upon user activation of the device 213, the controller 201 may initiate one or more test functions to test the operation and integrity of the circuit interruption device(s) 207 or 209, for instance. The physical touch interface device 213 may be associated with multiple functions executable by the controller 201, such as test functionality and configurability based on the sensed physical input. For instance, a short-duration press of the touch interface may activate a test function, whereas a long-duration press may activate a configurability-based function, such as confirming a proposed configuration of the circuit protection device 200.

The circuit protection device 200 further comprises a housing (not shown) for accommodating the various components of device 200, e.g., as shown in FIG. 2 between the input side 211 and output side 212. The housing is preferably configured to couple a complementary recess, cradle or other connection in a housing (not shown) of the panel 100. The indicator 205, display 206, input(s) 213, and any user input devices 203, 204, 213 are preferably located on an external side of the housing for accessibility or visibility by a user 301. Upon physical connection between the circuit protection device 200 and the complementary recess or cradle in panel 100, an electrical connection may be established between the power, neutral and earth busbars 106-108 of panel 100 and the corresponding power, neutral and earth inputs at power input side 211 of the device 200. In turn this may establish an electrical connection between the power input side and the load terminations at load side 212.

In the preferred embodiment, the circuit protection device 200 is configured such that at least one of the configurable function(s) of the circuit protection device 200 can be configured or updated post manufacture, and preferably in field, e.g., after connecting the device 200 with an associated load or other circuit 171-174 at the load side 212 and an associated power supply and the power input side 211, and even after activating it to perform the configured function(s). Configurable functions include, for instance circuit monitoring, fault detection and/or circuit protection functions. Circuit monitoring comprises monitoring one or more electrical parameters such as current flowing through an electrical current flow path of the circuit protection device 200 (e.g., via sensor(s) 208), and optionally analysing the monitored parameters for providing circuit intelligence, which may be transmitted to a remote device via communications interface 202. Fault detection functions comprise, for instance, overcurrent fault detection, arc fault detection, or residual current detection. These functions are performed by the circuit protection device 200 based on data received or determined from sensor(s) 208 which monitor current and/or other electrical parameters associated with the connected load/circuit. Fault detection functions have associated therewith parameter thresholds or criteria based on which faults are detected (such as a minimum current threshold for overcurrent fault detection), as previously described. Circuit protection functions include instructions for responding to a detected fault, such as opening the load control relay 209 upon detection of an overcurrent, arc fault, or residual current fault.

Configuration data is committed to permanent storage following a configuration process, and preferably a non-volatile memory location accessible by the processor(s) 201A of the controller 201 (e.g., non-volatile memory location in storage 201B). The configuration data may comprise data indicative of any combination of one or more of: an indication of an active state of the function (i.e., active or inactive), instructions for performing the functions executable by the controller 201 and/or one or more parameter thresholds and criteria associated with those functions (as described in further detail in other sections of this specification). The configurable circuit protection device 200 comprises instructions stored in memory associated with the controller 201 (e.g., memory 201B) for enabling the above-mentioned configuration data to be altered or replaced with new configuration data, by a remote device, in-field.

Figure 5:
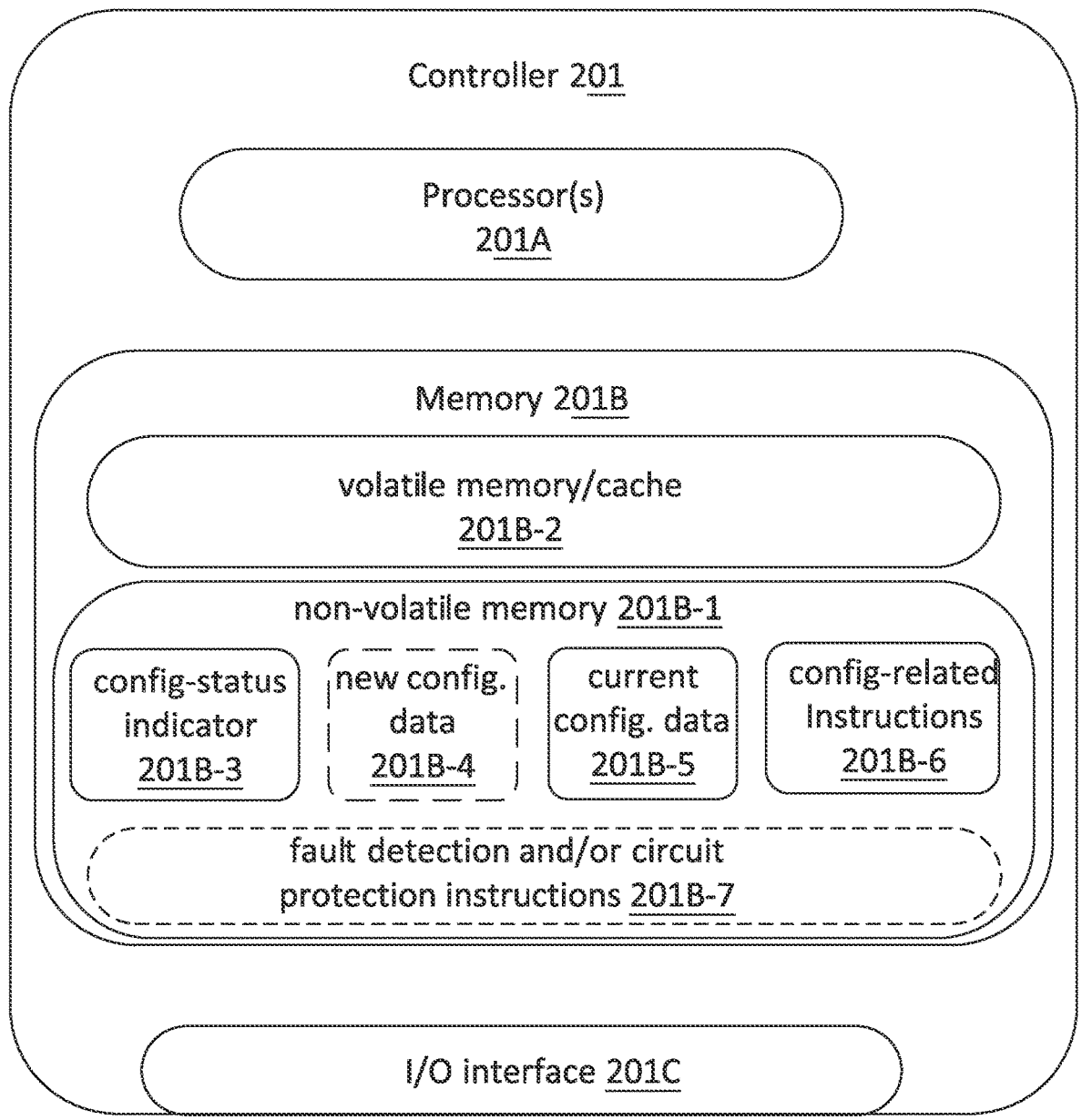
FIG. 5 is a block diagram illustrating an exemplary embodiment of a controller of a circuit protection device.

Referring to FIG. 5, an embodiment of the controller 201 of the circuit protection device 200 is shown comprising the electronic memory 201B and the one or more processing device(s) 201A for executing instructions stored in the memory 201B. The electronic memory 201B comprises a non-volatile memory location 201B-1 and a volatile memory location 201B-2. The non-volatile memory location stores instructions executable by the processing device(s) 201A, such as configuration-related instructions 201B-6 for performing one or more functions to configure the circuit protection device, as per the any one of the configuration methods 300, 310, 350, 400, 500, 550, 560, 600, 650 described herein. Optionally, the non-volatile memory 201B-1 may further comprise one or more fault detection and/or circuit protection instructions 201B-7 for performing the fault detection and/or circuit protection function(s) described herein in relation to circuit protection device 200. Alternatively, one or more of such function(s) may be implemented in control circuitry associated with the first current flow interrupting device 207 of the circuit protection device 200 as previously mentioned.

The controller 201 further comprises configuration data stored in the non-volatile memory location 201B-1 which configures the operative function(s) of the device 200 as previously described. The controller 201 may comprise currently affirmed configuration data 201B-5 which is accessible by the controller 201 and the device 200 during a standard mode of operation of the device to perform the one or more operative function(s) based on the configuration data 201B-5. In this specification, unless stated otherwise, a standard mode of operation of device 200 is intended to mean a mode whereby the circuit protection device is delivering primary power to the connected load, circuit or system or is receiving primary power from the connected circuit or system at the load side 212 and delivering the power to the opposing connection 211. Typically speaking the circuit protection device is in this mode when primary power is being supplied to the power input side 211 (or load side 212) of the device 200 and at least the flow interrupting device 207 is in a closed state to electrically connect the power input side 211 with the load side 212. If the device 200 includes a second current flow interrupting device 209 then this is preferably also in a closed state in the standard mode of operation.

When the device 200 is being configured, it transitions into a configuration update mode, whereby primary power is isolated from the load side 212 (or power input side 211) of the device 200, and new configuration data 201B-4 is loaded into the device 200. During a configuration update mode, the device 200 may function based on a configuration process, which may be in accordance with any one of the configuration method embodiments described herein. During the configuration process, new configuration data 201B-4 is stored in the non-volatile memory 201B-1 of the controller 201. Prior to this, the new configuration data may be initially cached in a volatile memory location 201B-2 and then relocated to the non-volatile memory location 201B-4 upon receipt or detection of data or signal(s) indicative of transition of the device 200 into a safe configuration state of operation (described in further detail below). For example, as previously explained, the controller 201 is preferably configured to receive or detect a signal (or data) transmitted through the current flow path or line 116 of panel 100, and perform one or more configuration related functions based on the signal (or data) transmitted through line 116, including saving the temporarily cached configuration data into the non-volatile memory location 201B-4 of the controller 201.

The controller 201 may further comprise a configuration-status indicator 201B-3 storable in the non-volatile memory location 201B-1, for indicating a status of a configuration process and particularly whether the new configuration data 201B-4 is pending a verification or has been verified, as per the user-verification stage of any one of the configuration method embodiments described herein. Accordingly, the configuration-status indicator 201B-3 may also be referred to as a verification-status indicator. The configuration-status indicator 201B-3 may indicate if a user-verification of the new configuration data 201B-4 is pending or complete. When complete, the configuration related instructions 201B-6 may execute to replace the current configuration data in 201B-5 with the new configuration data 201B-4. In this context, the term "replacing" is not intended to always imply overwriting the existing data in same memory location. Instead, it could involve actions like flagging the new configuration data or providing a pointer to indicate the location of the new data. Replacing the data may also occur over time such that parameters related to the configuration data are varied or transformed gradually over time until the new configuration data is written into memory. The updated configuration data becomes effective in operating the device 200, typically when device 200 is powered on again and the standard mode of operation is resumed, with primary power reinstated between the input side (labelled as "211") and the load side (also labelled as "211").

The configuration-status indicator may be a memory register or flag, for instance, within the memory 201B-1. The value of the configuration-status indicator may be controllable by the controller 201 and determines or influences the operative function(s) of the device 200, such as the fault detection and/or circuit interruption function(s). For example, in the case that the configuration-status indicator 201B-3 comprising a flag, the value may be binary (i.e., a high value or a low value), where one value (e.g., the high value) indicates a pending configuration and the low-value indicates a complete/non-pending configuration. It will be appreciated, that the indicator may be a memory register capable of representing more than two statuses of the configuration process relating to device 200, and the present disclosure is not limited to the examples presented herein.

The controller 201 may comprise instructions stored in memory 201B-6 for setting the value of the configuration-status indicator 201B-3 based on a detected event. A detected event may include entering the safe configuration state/suspending the standard mode of operation (described in further detail below), or the storing of recently cached configuration data into the non-volatile memory location 201B-4. Entering the safe configuration stage/suspending the standard mode of operation and storing recently cached configuration data into non-volatile memory may comprise any of the steps described in detail in relation to any one of the configuration method embodiments of the present disclosure 310, 350, 400, 500, 550, 560, 600 and 650.

The controller 201 may further comprise an input-output interface 201C for receiving and outputting data or signals to interact with external components of the device 200 as per the embodiments described herein.

During the configuration update mode, the configuration data associated with the circuit protection device 200 can be updated to suit the load requirements of a connected sub-circuit/load, and/or to adjust the data based on historical characteristics of the load's behaviour for instance. This may be required as the load requirements vary with time, or if the device 200 is installed and connected to a new sub-circuit. Multiple devices 200 of panel 100 may be configurable to meet the requirements of their respective connected sub-circuits or loads. Methods are provided herein for operating or configuring the circuit protection device 200 embodiments described herein. Methods are also provided herein for configuring the power distribution panel 100 embodiments comprising one or multiple installed circuit protection device(s) 200-1-200-n. In this specification, unless stated otherwise, configuring a power distribution panel 100 is intended to mean configuring one or more circuit protection device(s) 200-1-200-n installed in the panel 100. Any one of the methods described below may comprise the steps of the method 300 embodiments previously described to initiate configuration as would be apparent to the skilled person.

The methods 300, 310, 350, 400, 500, 550, 560, 600 and 650 are depicted in the figures using flow diagrams with blocks representing steps or stages of the logic flow. Unless stated otherwise, a grouping of multiple functions within a block, step or stage, does not indicate that all functions in that block, step or stage must be performed together. Instead, it is intended to indicate that the functions are closely associated and therefore may be implemented substantially simultaneously or substantially sequentially (not necessarily in the order they have been depicted).

Figure 6:
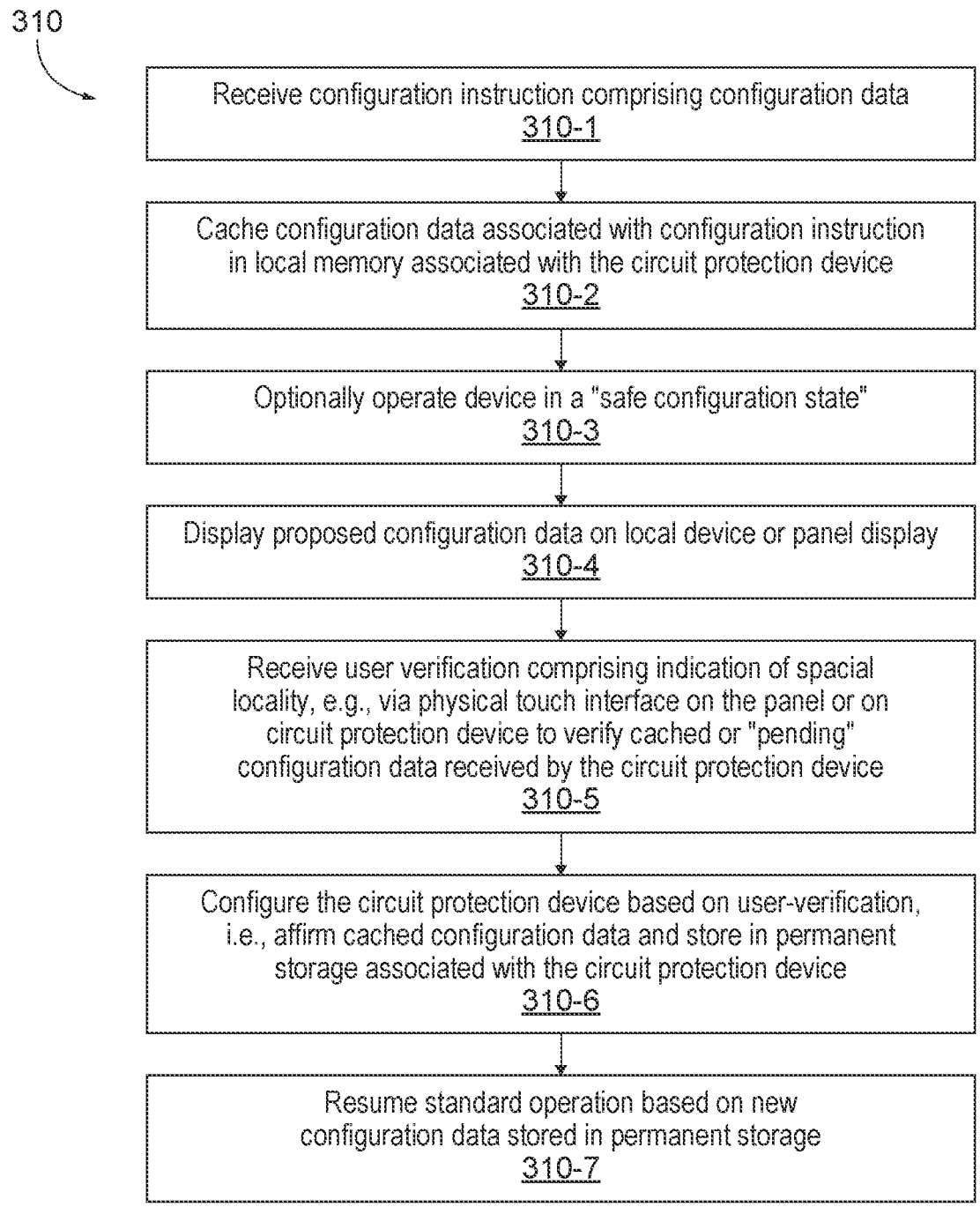
FIG. 6 is a flow diagram depicting a method for operating a circuit protection device to configure the circuit protection device in accordance with an exemplary embodiment of the present disclosure.

Referring to FIG. 6, a preferred embodiment of a computer-implemented method 310 for configuring the circuit protection device 200 of any one of the embodiments described herein is shown. The steps of this method are preferably implemented in one or more computing devices, such as by the control circuitry 201 of the circuit protection device. This includes storing instructions for performing the steps of the method 310 in electronic memory (e.g., 201B-6 of device 200 shown in FIG. 5), and operating one or more the processing devices (e.g., 201A of device 200) to execute the instructions and perform the steps of the configuration method 310.

The method 310 comprises receiving a configuration instruction to configure one or more operational function(s) of the circuit protection device, the configuration instruction having associated therewith configuration data and receiving or detecting an indication of a user-verification of the configuration data to configure the device based on the configuration data.

In the context of this present disclosure, configuring the device based on configuration data refers to the act of committing the configuration data to memory and affirming its status for permanent storage. The configuration data, once committed, is intended to be utilised immediately in a standard mode of operation, for instance. Affirming the status of data for permanent storage does not necessarily mean adjusting an indicator or pointer to affirm the status, as in some cases the act of writing the data into a dedicated memory location (such as overwriting the existing configuration data) may simultaneously commit the data to memory and affirm its status for permanent storage. Accordingly, committing and affirming stands in contrast to steps of a configuration process where data may be stored in memory with a pending flag, indicating that the configuration is not yet applied for standard operation until the pending flag is removed.

At step 310-1, to initiate a configuration update of the circuit protection device 200, a configuration instruction is received, typically from a remote device (such as the systems controller 101 of the panel 100 or remote user device 302 of the system 10). The configuration instruction has associated therewith configuration data for the circuit protection device. Upon a successful configuration, the controller 201 commits the configuration data to permanent storage, preferably in response to a user verifying the data while being spatially located in the presence of circuit protection device 200.

In this specification and claims, a distinction is made between externally received configuration instructions (as indicated in step 310-1 of method 310 and as indicated in other corresponding steps in methods 300, 350, 400, 500, 550, 560, 600 and 650 disclosed herein), and locally stored instructions for performing one or more of the configuration-related steps of the method to configure the circuit protection device 200 (or to configure one or more devices of the panel 100 in other embodiments). Externally received configuration instructions refer to instructions or requests transmitted from a separate or remote device, typically to initiate a configuration process and comprising configuration data that is to be committed to a circuit protection device 200 to update the configuration of the device 200. Use of the phrase "configuration instruction" in this context therefore is not intended to imply that the configuration instruction encompasses data or information executable by a processor to perform all the steps of the configuration method being described or claimed. In contrast, locally stored instructions for configuring the device 200 (or for configuring the panel 100 in some embodiments) pertain to predefined sets of instructions that are pre-stored in electronic memory associated with the device (e.g., 201B-6 of FIG. 5) or the panel in some embodiments (e.g., 101B-2 of FIG. 2). These prestored instructions serve to facilitate the configuration process and are executable by a corresponding processing device (e.g., 101A or 201A) to perform the majority or all of the associated steps of the methods described herein, as mentioned above.

Before committing the configuration data to permanent storage, at step 310-2, the received configuration data is cached/stored in temporary storage. The temporary storage may be a storage location of the electronic memory component (e.g., 201B) of the device 200. This might be a non-volatile memory location 201B-2 of the storage 201B. Accordingly, in response to receipt of the configuration instruction or request, the controller 201 temporarily stores or caches the configuration data associated with the configuration instruction at step 310-2.

In a preferred embodiment, the circuit protection device 200 is placed or operated in a safe configuration state in response or after receiving the configuration instruction (step 310-3). This stage is optional but preferred to allow for the update of the configuration data in permanent storage without adversely affecting the standard operation of the device 200. The step 310-3 may comprise the steps 300-2-300-4 of the method 300 embodiment for example, to operate the device 200 in the safe configuration state.

A safe configuration state in relation to the circuit protection device 200 in this embodiment, and all other embodiments disclosed herein, is intended to mean a state whereby a supply of current to a connected circuit or load 171-1-171-m or other connected device or system 172-174 via the circuit protection device 200 is temporarily terminated and one or more fault detection and/or circuit protection functions performed by the circuit protection device are no longer required, but where a secondary low voltage supply to the circuit protection device 200, sufficient for performing configuration update functions as per the method 310 and/or other methods disclosed herein, is still present at the circuit protection device 200. A safe configuration state may preferably also comprise the deliberate suspension of one or more operational functions of the circuit protection device 200, including, for instance, fault detection and circuit protection functions. Such functions may be suspended, for instance, by opening the current flow interrupting device 207, and optionally the current flow interrupting device 209 of the circuit protection device 200.

The device 200 may be placed or operated in the safe configuration state by disconnecting the load side connection from the higher voltage power supply. This can be achieved via opening of the current flow interrupting device 207, or alternatively, if the device is installed in the panel 100 via opening of the current flow interrupting device 111, for instance. A user may open one of the current flow interrupting devices 207, 111 to operate the device 200 in the safe configuration state at step 310-3, for example in response to viewing a displayed prompt on their remote user device 302.

In some embodiments, it may not be required to place or operate the circuit protection device in the safe configuration state, or to suspend the one or more operational functions of the circuit protection device including fault detection and/or circuit protection functions, to allow for the safe transition from one configuration to another. In such embodiments, multiple controllers may operate simultaneously in relation to the device 200 such that one controller may operate to configure the device as per the steps of this method 310, while another controller maintains the standard operation of the device as per the current configuration. Upon configuring the device with the new configuration data, a change in the controller operating the device may be initiated. This would result in the configuration of the device 200 without placing the device in a safe configuration state or suspending operational function(s) based on a current configuration during the configuration process.

It will be appreciated by those skilled in the art that the aforementioned multiple controllers could be composed as independent sections or sub-controllers of a single controller, arranged such that safe operation can continue on one sub-controller whilst a configuration is performed on another sub-controller.

In another illustrative example of not needing to operate the device 200 in a safe configuration state, the shift from one configuration to another is accomplished by adjusting the configuration data in real-time. Meanwhile, the device 200 can continue to execute its operational functions using the changing configuration data. In this scenario, the assurance of safety lies in the capability of transitory conditions to effectively carry out the necessary protective functions.

Prior to step 310-3, the method may further comprise receiving a signal indicative of a user input via a user input device 112 of the panel 100 as described in relation to step 300-3 of method 300. Alternatively, the method may comprise receiving or detecting a user input via a user input device (e.g., 203) of the circuit protection device 200.

At step 310-4, after either one of steps 310-2, 351-3, the configuration data is displayed on a display that is local to the device 200, such as display 206. The controller 201 may drive the local display device 206 to output data indicative of the cached configuration data. As mentioned, the display device is preferably local to and mounted on the circuit protection device housing (e.g., display device 206), but alternatively it may be local to and mounted on the panel housing (e.g., display device 109). Displaying the configuration data on a local display associated with the circuit protection device 200 is preferred as it confirms a user's spatial locality with regards to the device 200 during configuration. In alternative embodiments, step 310-4 may be omitted, or the data indicative of the cached configuration data may be displayed on a remote user device 302 instead.

Prior to step 310-4, the method 310 may further comprise transferring or copying the configuration data from the volatile memory location (e.g., 201B-2) and storing the configuration data in a non-volatile memory location (e.g., 201B-4 of FIG. 5) associated with or accessible by the controller 201. The storage of this data may be as described in relation to step 300-5 of method 300 (and optionally based on preceding step 300-3, for instance). The configuration data may be considered pending at this stage and accordingly, the configuration-status indicator may be set to a value indicative of a "pending" or non-verified status as previously described in relation to FIG. 5. In this manner, at step 310-4, the display device may be driven based on the configuration data stored in the non-volatile memory location 201B-4.

At step 310-5, an indication of a user-verification is received or detected by the circuit protection device 200, to verify the cached or "pending" configuration data. The indication of user-verification can take the form of data, or a signal indicative of a verification action taken by a user. Accordingly, at step 310-5, the device 200 (and in particular the associated controller 201) monitors for the data or signal indicative of the user's verification of the cached configuration data. The user-verification preferably comprises an indication of a user's spatial locality or presence in the vicinity of the circuit protection device 200. For example, the signal or data is preferably based on a physical touch input provided by the user via an interface mounted on the device 200 (e.g., interfaces 203 or 204), or mounted on the power distribution panel 100 (e.g., interfaces 112 or 114). Such a verification step, requiring a physical touch input from the user on the device or panel simultaneously confirms the configuration data and the user's physical presence and spatial locality with respect to the circuit protection device being configured. This enhances safety and security, reducing the possibility of inadvertent configurations as well as remote cyber-attacks that may occur during the configuration process.

At step 310-6, in response to receiving or detecting the indication of user verification, the pending configuration data is affirmed and committed to permanent storage associated with the device 200. This may involve updating the configuration-status indicator 201B-3 to indicate verified, or a non-pending configuration. Alternatively, a pointer address, or location may be updated to affirm the location of the configuration data to be used by the device 200 after primary power is reinstated. In yet another alternative, the affirmed configuration data may be relocated from 201B-4/ 201B-2 to a more permanent storage location, e.g., replacing the existing configuration data in 201B-5. Other methods for caching and then permanently storing the configuration data may be implemented in step 310-6 as is known in the art.

At this stage, the configuration update is complete and the device 200 may resume standard operational functions including circuit monitoring, fault detection, circuit protection and/or load control functions based on the affirmed and committed configuration data (step 310-7). Step 310-7 may occur substantially simultaneously to step 310-6, when for example, the user-verification also reconnects the electrical current flow path between the load side connection 212 of a device 200 and primary supply of power. For example, in stage 310-5, user-verification may comprise receiving an input from a user to reclose the current flow interrupting device 207. This action may simultaneously verify the configuration data and reconnect the load side connection 212 with the power input side connection 211 of the device 200. Alternatively, at stage 310-5, user verification may comprise the reclosing of the second current flow interrupting device 111 of the panel 100 via the user input device 112. Accordingly, the device 200 may receive or detect data or a signal indicative of the reclosing of the second current flow interrupting device 111, which simultaneously also reconnects the load side connection 211 of the device 200 with the power supply input of the panel 100 (assuming the circuit flow interrupting device 207 remains closed during the configuration process 310). In yet another alternative, user verification may be based on a physical user input via another user input device, such as 204, of the device 200.

Figure 7:
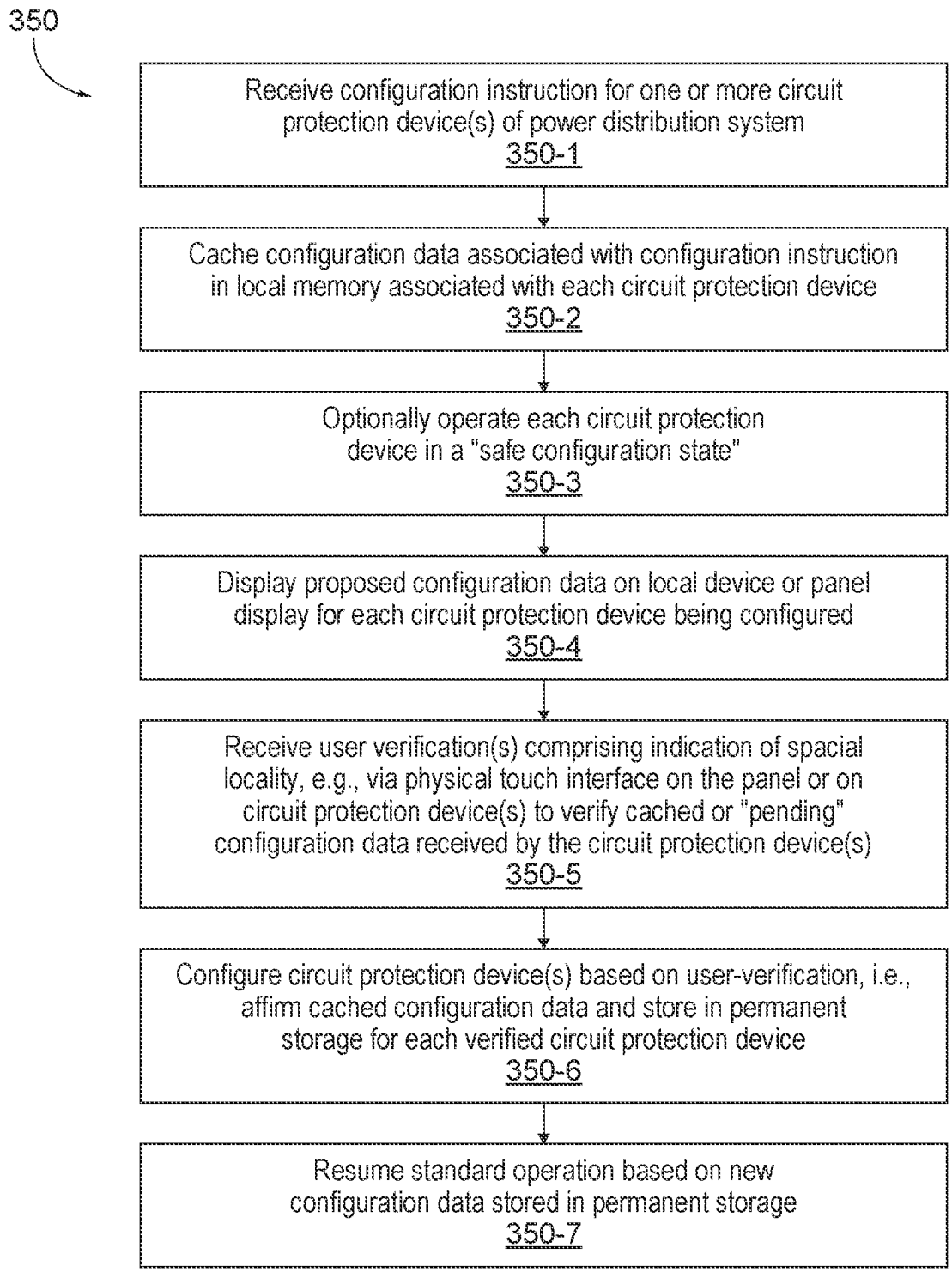
FIG. 7 is a flow diagram depicting a method for operating a power distribution panel comprising one or more circuit protection device(s) to configure the circuit protection device(s) in accordance with an exemplary embodiment of the present disclosure.

Referring to FIG. 7, a preferred embodiment of a computer-implemented method 350 for configuring a power distribution panel comprising one or more installed circuit protection device(s) 200-1-200-*n* of any one of the embodiments described herein is shown. The steps of this method are preferably implemented in one or more computing devices. It may be implemented by a combination of computing devices of panel 100, such as by the controller(s) 201 of each of the respective circuit protection devices 200-1- 200-*n* installed in the panel, preferably (but optionally) in combination with the central controller 101 of the panel 100. Implementing the method in a computing device or combination of computing devices comprises storing instructions for performing the steps of the method 350 in electronic memory (e.g., 201B of each device 200-1-200-*n* and/or 101B), and operating one or more processing devices (e.g., 201A of each device 200-1-200-*n* and/or 101A) to execute the instructions and perform the steps of the configuration method 350.

The method 350 comprises configuring operation of at least one circuit protection device of a power distribution panel (or configuring a power distribution panel) comprising: receiving configuration instruction(s) to configure one or more operational function(s) of each circuit protection device, the configuration instruction(s) having associated therewith configuration data for each circuit protection device; and receiving or detecting an indication of a user-verification of the configuration data for one or more of the circuit protection device(s) to configure the respective circuit protection device(s) based on the corresponding configuration data.

At step 350-1, to initiate a configuration update of one or multiple circuit protection device(s) 200-1-200-*n*, one or more configuration instruction(s) is(are) received, typically from a remote device (such as the remote user device 302 of the system 10) for configuring one or more of the circuit protection device(s) 200-1-200-*n* of power distribution panel 100. The configuration instruction(s) have associated therewith configuration data for each of the circuit protection device(s) 200-1-200-*n* being configured. Central controller may initially receive one or more configuration instruction(s) 101. The controller 101 then communicates the corresponding configuration instruction(s) to the controller 201 of each circuit protection device(s) 200-1-200-*n* being configured. Upon a successful configuration, the configuration data corresponding to a circuit protection device being configured, is committed to permanent storage, preferably in response to a user verifying the data while being spatially located in the presence of panel 100.

Before committing the configuration data to permanent storage, at step 350-2, the configuration data for each circuit protection device 200-1-200-*n* being configured is cached/ stored in temporary storage. The temporary storage may be a storage location of the electronic memory component (e.g., 201B-2) of the device 200-1-200-*n* being configured. This might be a volatile memory location of the storage 201B. The controller 201 of each device 200-1-200-*n* is preferably configured to temporarily store or cache the configuration data associated with the configuration instruction in the volatile memory location accessible by the controller 201 at step 350-2.

In a preferred embodiment, each circuit protection device 200-1-200-*n* being configured is placed in a safe configuration state in response or after receiving the configuration instruction (step 350-3). This stage is optional but preferred to allow for the update of the configuration data in permanent storage without adversely affecting the standard operation of each device 200-1-200-*n*. In some embodiments, it may not be required to place each circuit protection device 200-1-200-*n* into a safe configuration state, or to suspend the one or more operational functions of the circuit protection device including fault detection and/or circuit protection functions, to allow for the safe transition from one configuration to another. In such embodiments, multiple controllers may operate simultaneously in relation to each circuit protection device 200-1-200-*n* as described in relation to step 310-3 of method 310.

Prior to step 350-3, the method may further comprise receiving a signal indicative of a user input via a user input device 112 of the panel 100 as described in relation to step 300-3 of method 300. Alternatively, the method may comprise receiving or detecting a user input via a user input device (e.g., 203) for each circuit protection device 200-1-200-*n*.

At step 350-4, in response to either one of steps 350-2, 350-3, the new configuration data associated with each circuit protection device 200-1-200-*n* being configured is displayed on a display that is local to the device 200-1-200-*n* or to the panel 100. Each device 200-1-200-*n* (and in particular the associated controller 201) may drive a local display device 206 to output data indicative of the configuration data temporarily stored in memory. As mentioned, the display device is preferably local to and mounted on the circuit protection device housing (e.g., display device 206) or alternatively local to mounted on the panel housing (e.g., display device 109)—step 350-4. Displaying the configuration data on a local display associated with the circuit protection device or panel is preferred as it confirms a user's spatial locality with regards to the panel 100 or device(s) 200-1-200-*n* during configuration. In alternative embodiments, step 350-4 may be omitted, or the data indicative of the new configuration data received by the one or more circuit protection device(s) 200-1-200-n may be displayed on a remote user device 302 instead.

Prior to step 350-4, the method 350 may further comprise transferring or copying the configuration data from the volatile memory location (e.g., 201B-2) and storing the configuration data in a non-volatile memory location (e.g., 201B-4 of FIG. 5) associated with or accessible by the controller 201 for each circuit protection device 200-1-200-n. The storage of this data may be as described in relation to step 300-5 of method 300 (and optionally based on preceding step 300-3, for instance). The configuration data may be considered pending at this stage and accordingly, the configuration-status indicator may be set to a value indicative of a "pending" or non-verified status as previously described in relation to FIG. 5. In this manner, at step 350-4, each display device may be driven based on the configuration data stored in the associated non-volatile memory location 201B-4.

At step 350-5, an indication of a user-verification is received or detected for one or more of the device(s) 200-1-200-n being configured, to verify the configuration data received by the device 200-1-200-n. A single indication of user-verification may be received or detected corresponding to verification of all device(s) being configured 200-1-200-n, or a separate indication of user-verification may be received or detected for one or more of the device(s) being configured 200-1-200-n. Each indication of user-verification can take the form of data or a signal that corresponds to a verification action taken by a user. Accordingly, at step 350-5, each device 200-1-200-n (and in particular the associated controller 201) may monitor for data or a signal indicative of the user's verification of the pending configuration data stored in memory. The user-verification preferably comprises an indication of a user's spatial locality or presence in the vicinity of the circuit protection device being configured. For example, the signal or data is preferably received based on a physical touch input provided by a user via a physical touch interface mounted on the device 200-1-200-n (e.g., interfaces 203 or 204), or mounted on the power distribution panel 100 (e.g., interfaces 112 or 114). Such a verification step, requiring a physical touch input from the user on the device or panel simultaneously confirms the configuration data and the user's physical presence and spatial locality with respect to the circuit protection device being configured. This enhances safety and security, reducing the possibility of inadvertent configurations as well as remote cyber-attacks that may occur during the configuration process.

At step 350-6, in response to receiving or detecting the indication of user verification, the pending configuration data for each verified circuit protection device 200-1-200-n, is affirmed and committed to permanent storage associated with the device 200-1-200-n. This may involve updating the configuration-status indicator 201B-3 to indicate verified, or a non-pending configuration. Alternatively, a pointer address, or location may be updated to affirm the location of the configuration data to be used by the device 200-1-200-n after primary power is reinstated. In yet another alternative, the affirmed configuration data may be relocated from 201B-4/201B-2 to a more permanent storage location, e.g., replacing the existing configuration data in 201B-5. Other methods for caching and then permanently storing the configuration data may be implemented in step 350-6 as is known in the art.

At this stage, the configuration update is complete and each updated device 200-1-200-n may resume standard operational functions including circuit monitoring, fault detection and/or circuit protection functions based on the affirmed and committed configuration data (step 350-7). Step 350-7 may occur substantially simultaneously to step 350-6, when for example, the user-verification also reconnects the electrical current flow path between the load side connection 212 of a device 200-1-200-n and primary supply of power. For example, in stage 350-5, a user-verification for a device 200-1-200-n may comprise receiving an input from a user to reclose the current flow interrupting device 207. This action may simultaneously verify the configuration data and reconnect the load side connection 212 with the power input side connection 211 of the device 200. Alternatively, at stage 350-5 a user verification for one or multiple device(s) 200-1-200-n may comprise the reclosing of the second current flow interrupting device 111 of the panel 100 via the user input device 112. Accordingly, each device 200-1-200-n may simultaneously receive or detect data or a signal indicative of the reclosing of the second current flow interrupting device 111, which also reconnects the load side connection 211 of each device 200-1-200-n with the power supply input of the panel 100.

Embodiments of the present disclosure may combine either one of method 310 or 350 with method 300 as would be readily apparent, to perform the first process of initiating configuration as for method 300, followed by the second process of verifying configuration as per method 310 or 350.

As will be described in further detail below in relation to other exemplary embodiments, methods 300, 310 and/or 350 can be implemented as part of an overall logic flow for configuring one or multiple circuit protection device(s) 200-1-200-n within a power distribution system 10 as depicted in FIG. 1. For instance, each circuit protection device 200 is preferably remotely configurable by a user 301 via a remote computing device, such as user device 302. The user device 302 preferably comprises a user interface comprising a graphical user interface and a user input interface, such as a tactile input interface, for allowing a user to view and input data relating to configuration of a circuit protection device 200. The user device 302 may be configured to access and execute a configuration application on the user device 302, such that a user may interact with the application via the user interface. The application may be stored in local memory and/or on a remote server or database, e.g., 304 or 305 that is accessible by the device 302.

Figure 8A:
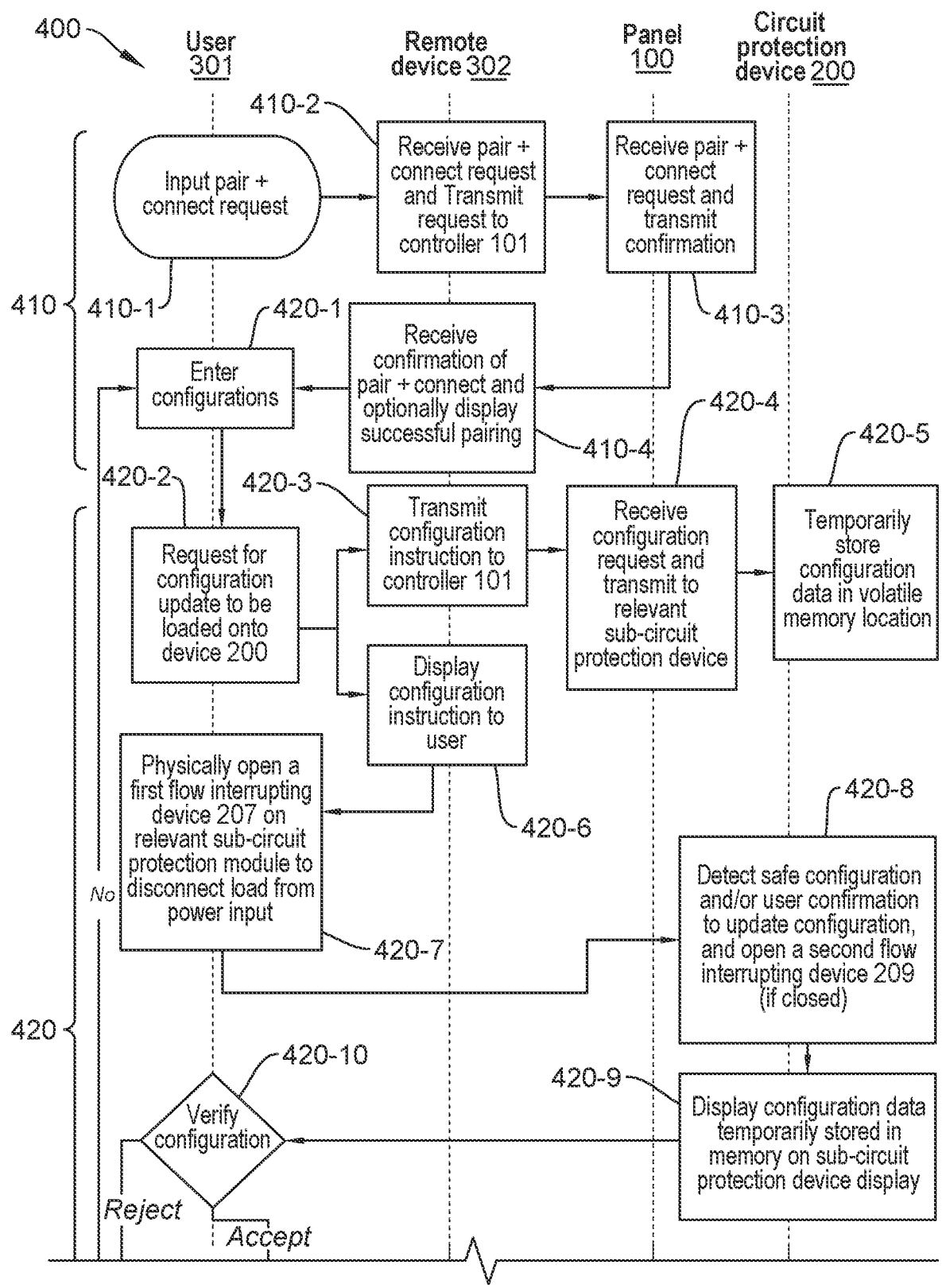
FIGS. 8A and 8B collectively are a flow diagram depicting communication between multiple entities of the power distribution system of FIG. 1 during a configuration update of a circuit protection device of a power distribution panel in accordance with an exemplary embodiment.
Figure 8B:
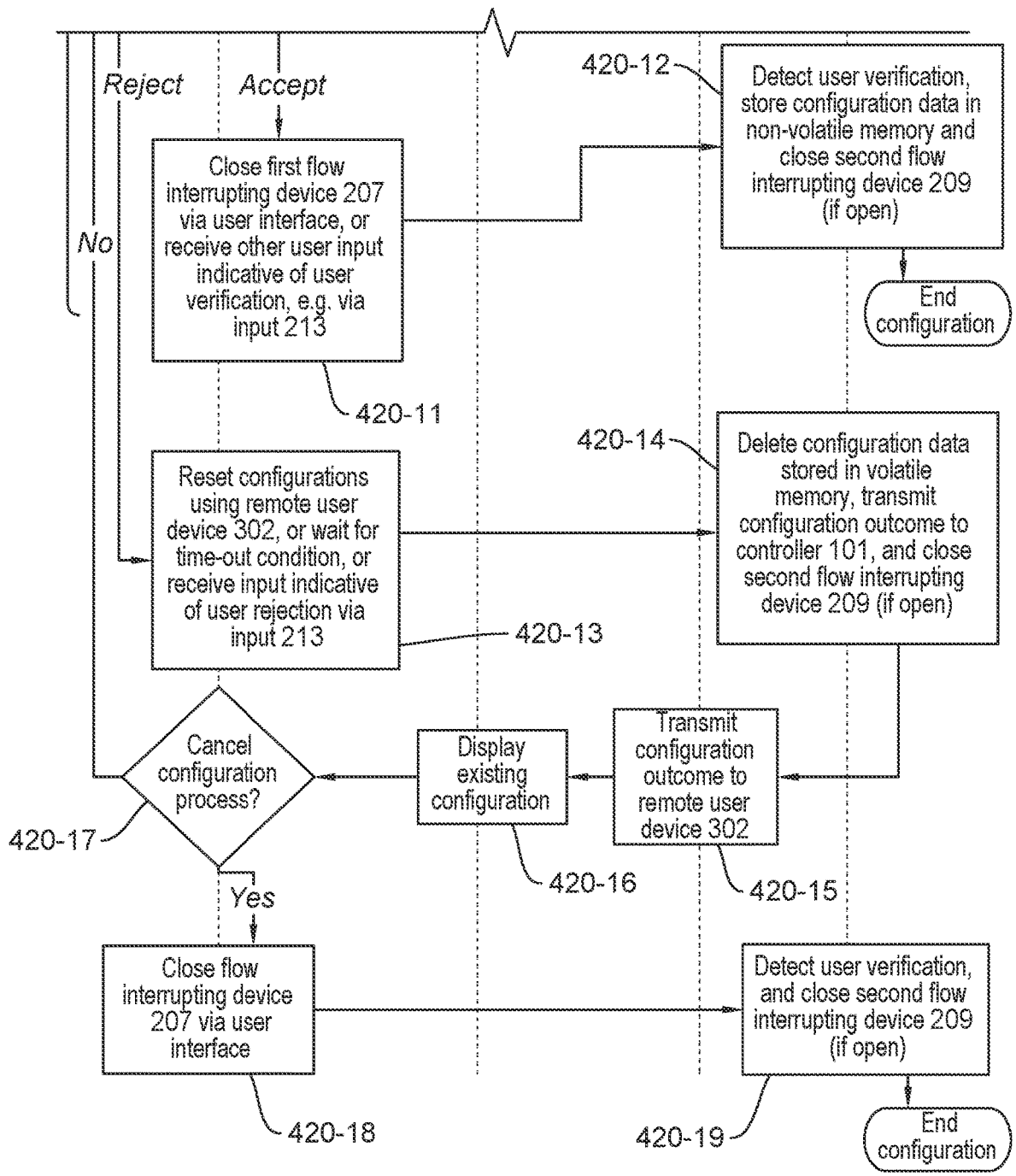

Referring now to FIGS. 8A and 8B (hereinafter, FIG. 8), an exemplary embodiment of a logic flow 400 depicting communication and operations of various entities for performing a configuration update within a system 10, is shown. Logic flow 400 may comprise at least some of the steps of method 300 or 310. The logic flow 400 relates to a configuration update process for a single circuit protection device 200, such as one of the circuit protection device(s) 200-1-200-n configured to be, or that is, installed in the power distribution panel 100. The system 10 comprises a human user or operator 301, a user device 302, and the power distribution panel 100 comprising the circuit protection device 200. The logic flow 400 comprises steps performed by the controller 101, or the controller 201.

The logic flow 400 is a computer implemented process that enables human/operator interaction with one or multiple computing devices to execute a configuration update of the circuit protection device 200. Each step of logic flow 400 is carried by an entity of the system 10, including the human operator 301, the user's device 302, the central controller 101 of the panel 100, or the controller 201 of the circuit protection device 200 as shown in FIG. 8 and described below. In some cases, a task or step of logic flow 400 could be carried out by a different entity of system 10 as described below. Each computing device tasked with carrying out a step or sequence of steps in logic flow 400, including the user's device 302, the central controller 101 and the controller 201 of the circuit protection device, is preferably preconfigured or preprogrammed to perform the step or sequence of steps. Accordingly, in an embodiment of user device 302, the user device 302 comprises at least one processing device and at least one electronic storage medium associated therewith, the electronic storage medium or media having stored therein instructions executable by the processing device(s) to carry out the steps of logic flow 400 described below, for which the user device bears responsibility. In an embodiment of controller 101, the electronic storage medium or media 101B comprises instructions (e.g., instructions 101B-2 shown in FIG. 2) stored therein and executable by the processing device 101A for carrying out the steps of logic flow 400 described below, for which the controller 101 bears responsibility. In an embodiment of controller 201, the electronic storage medium or media 201B comprises instructions stored therein (e.g., instructions 201B-6 shown in FIG. 5) and executable by the processing device 201A for carrying out the steps of logic flow 400 described below, for which the controller 201 bears responsibility.

The user 301 may initiate and control a configuration update for the circuit protection device via the remote computing device 302, by interacting with the circuit protection device 200, and/or with the power distribution panel 100 comprising the device 200. The configuration update process will be described with reference to a circuit protection device 200 installed in a power distribution panel 100. Alternatively, or in addition, the process may be implemented to update the configuration of a circuit protection device 200 when not installed in the power distribution panel 100. Various steps may be modified to achieve this, such as pairing a user device 302 directly with the circuit protection device 200 and sending the configuration instructions directly to the circuit protection device 302, rather than to the controller of the power distribution panel 100. Such modifications are envisaged and encompassed within the scope of the present disclosure.

The configuration update process enables initial configuration of a circuit protection device 200, e.g., during or after initially installing the device 200 in a power distribution panel 100. In this situation, the configuration update process may store new configuration data associated with the update in electronic memory accessible by the controller 201. It may alternatively replace an existing safe factory configuration. Thereafter, the configuration update process can be a reconfiguration process that replaces configuration data stored in electronic memory accessible by the controller 201 with updated configuration data. As previously mentioned, the memory could be memory 201B of controller 201 or it may be a memory external to the device 200, e.g., memory 101B. The configuration data may comprise instructions for performing the operational function and/or parameters associated with the operational function, preferably both, as previously mentioned.

At a first pairing stage 410 of the logic flow 400, a user 301 initiates a request to communicatively couple the remote user device 302 with the central controller 101 of the power distribution panel 100. A user initiates the request by inputting a request via the user interface of the device 302 at step 410-1. The interface may comprise a mobile application for instance, allowing the user to input or select a pairing or configuration update prompt. This prompts device 302 to transmit a pair and connection communication request to the central controller 101 of the power distribution panel 100 at step 410-2. The central controller receives the request 101 via the communications interface 102 of the power distribution panel at step 410-3. If the connection is successful, the central controller 101 will transmit a confirmation signal to the user device 302 at step 410-4. The confirmation signal may include an indication of the current configuration data or settings stored in non-volatile memory (e.g., 201B-1) of the device 200 so the user is able to also view the existing configuration on their user device 302 before requesting a change. It will be appreciated this stage is preferred, but optional.

In this embodiment, pairing enables communication between the user device 302 and the controller 101 of the power distribution panel 100. This pairing is preferably via wireless communication. In other embodiments, pairing may enable communication directly between the user device 302 and the controller 201 of the circuit protection device 200. In such embodiments, at stage 410 a user may initiate a request to communicatively couple the remote user device 302 with the controller 201 of the circuit protection device 200.

After successfully pairing the user device 302 with the controller 101 (or controller 201), a user 301 can initiate the logic flow for a device configuration update stage 420. At step 420-1, a user 301 inputs data indicative of a target update of the configuration data for the circuit protection device 200 of the panel 100. This may be in response to the device 302 displaying configuration options for the device 200. Such options, may include, for instance, indications of fault detection function(s) and/or parameters associated therewith. For instance, an overcurrent fault detection function and/or an overcurrent threshold may be selectable by the user via the interface. After the target configuration update is input by the user 301, the user 301 may request, via the user interface of device 302, for the configuration update to be associated with a target circuit protection device 200 (which may be one of multiple in panel 100), at step 420-2.

In response to the user's input and request for the configuration update, the user device 302 transmits a configuration request or instruction for the device 200 to the controller 101 of the panel 100, at step 420-3. The configuration request or instruction has associated therewith configuration data, and optionally an address or unique identifier associated with the device 200 for which the configuration is intended. The controller 101 then receives the configuration request and transmits a configuration instruction to the controller 201 of the device 200 to be updated, at step 420-4. This implementation is preferred as it reduces the complexity of the hardware and/or firmware associated with the circuit protection device 200. In other implementations, however, where direct communication can be established between the remote device 302 and the controller 201 of the device 200 at stage 410, the configuration instruction may be transmitted from the user device 302 directly to the controller 201 of device 200 at step 420-3 (e.g., bypassing step 420-4). Steps The configuration instruction comprises configuration data to configure one or more operative function(s) of the device 200 as described above. Upon receipt, the controller 201 temporarily stores the configuration data in an associated electronic storage (e.g., 201B), at step 420-5. Preferably the configuration data is stored in a memory location that is distinct from a target memory location. This may be a temporary/volatile memory location (e.g., 201B-2 shown in FIG. 5) of the electronic storage 201B, for instance. The target memory location (e.g., 201B-4 or 201B-5 of FIG. 5)

is a location accessible by the controller 201 to perform the operative function(s) corresponding to the configuration data, and is preferably a non-volatile (more permanent) location (e.g., memory location of device's firmware). In some implementations, at step 420-5, the controller 101 may store the configuration data with an address or unique identifier corresponding to the device 200, in electronic storage 101B associated therewith. This may be a temporary/volatile memory location of the electronic storage 101B.

At step 420-6, upon or after confirmation by the user 301 of the configuration update, the user device 302 displays instructions or information via the user interface of device 302 to inform the user 301 of steps required to activate and progress the configuration. Such instructions or information may include for instance a prompt for the user 301 to trigger a current flow interrupting device (e.g., 207) of the device 200 into an open state via an associated physical touch interface (e.g., 203) if it is in a closed state. At this stage, the user device 302 is configured to send instructions to the display to display a prompt for the user to trigger the first current flow interrupting device 207 into an open state. In doing so, the current flow interrupting device 207 will electrically disconnect load side 212 from the power input side 211, or in other words, open an electrical current flow path required for performing the one or more operational function(s) associated with the configuration. Alternatively, the user device may send instructions to the display to display a prompt to the user to check that the device 200 is in a safe configuration state, being a state where an electrical current flow path between the power input side 211 and load side 212 is disconnected. In response to the displayed prompt, at step 420-7 the user may then provide a physical input via interface 203 to open the flow interrupting device 207 if it is in a closed state. In some cases, such as during initial install of the panel 100, the current flow interrupting device 207 may already be in an open state, and accordingly the user is not required to provide a physical input via the interface 203 to open the current flow interrupting device 207, but may alternatively make a visual check by inspecting the operative position of the mechanical interface mechanism, for instance. Step 420-6 may occur substantially simultaneously to step(s) 420-3-420-5. Alternatively, it may occur in response to a completion of any one of steps 420-3 to 420-5. In this latter implementation, the controller 101 or controller 201 transmits a signal intended for receipt by the user device 302 to indicate completion of the associated step(s) 420-3 to 420-5. Step 420-6 is preferred but also optional and in some embodiments may be mitigated.

Opening the flow interrupting device 207, or visually verifying the device 207 is open, ensures the device 200 is in a safe operating condition for configuration, where protective function(s) that may be currently configured are disabled. Actuation of the user input 203 also indicates the user's intention to configure the circuit protection device based on the configuration data. The controller 201 is configured such that, at step 420-8, the controller 201 determines one or more operative conditions indicative of a safe configuration and/or criteria indicative of a user's confirmation to configure the circuit protection device 200. Such conditions and/or criteria may comprise a disconnection of the load side 212 from the power input side 211, for instance.

The one or more operative conditions indicative of a safe configuration state may, for instance, comprise determination of a substantially stable state of the ELV supply 210. Accordingly, the controller 101, or the controller 201 may be configured to determine if the voltage at the input, or the voltage at the output of the ELV supply 210, or both, is/are substantially stable. The controller 101, or each controller 201 may be configured to determine if the input or the output voltage, or both, is(are) substantially stable for a predetermined minimum duration (e.g., at least 2 seconds). Any suitable technique for determining voltage stability as is known in the art may be employed, such as comparing the voltage fluctuations against predetermined maximum fluctuation threshold(s) and determining if the fluctuations are within the threshold(s) or outside to indicate a stable ELV supply 210.

The controller 201 is configured such that, at step 420-8, the controller 201 determines an indication of disconnection based on an electrical parameter indicative of input power being supplied or available at a power input side/connection 211 of the circuit protection device 200. Accordingly, the controller 201 is configured to receive data or a signal indicative of one or more electrical parameters associated with a power input side/connection 211 of the circuit protection device and determine if the electrical parameter(s) complies/comply with predetermined threshold criterion or criteria associated with the parameter. The threshold criterion or criteria is preferably indicative of a disconnected state between the load side 212 and the power input side 211. For example, the controller 201 may be configured to determine if a voltage at the power input side 211 exceeds a predetermined threshold voltage amplitude indicative of a disconnected mains input supply 110 (e.g., 0V or 12V maximum voltage amplitude). The voltage parameter may be an average voltage, a maximum voltage, or any other voltage related parameter, for instance. It will be appreciated that other electrical parameters and associated threshold criterion/criteria may be utilised, and the present disclosure is not intended to be limited to these examples.

The controller 201 is further operable to perform one or more functions in response to determining the safe configuration state. In some embodiments, the controller 201 may be configured to suspend operation of one or more protective function(s) associated with the configuration based on determination of the safe configuration state. It may be configured to suspend operation of the one or more protective function(s) associated with the configuration instruction. The controller 201 is further configured such that, at step 420-8, the controller 201 triggers the second flow interrupting device 209 into an open state (if in a closed state) to suspend functionality associated with the second flow interrupting device 209, such as load control and management functionality. The controller 201 may transmit a control signal to the second flow interrupting device 209 to trigger the device into the open state. The controller 201 may be configured to detect a state of the second flow interrupting device 209 prior to triggering the device into the open state.

At step 420-9, after disconnecting the power input side from the load side or confirming disconnection/safe configuration state, the controller 201 sends a display signal to the display interface 206 comprising data indicative of the configuration data temporarily stored in electronic storage to display the data to a local user/operator. For example, the display signal may comprise data indicative of an overcurrent fault detection function and/or an overcurrent threshold associated with the function (e.g., "C16", "C32", "RCD" etc.). In other embodiments, the controller 201 may transmit control signals to display this data on a display 109 of the power distribution panel 100 instead (or in addition).

In some embodiments, steps 420-8 and/or 420-9 may be performed by the controller 101, including identifying of the user confirmation event for configuring the circuit protection device 200, sending the control signal to trigger the second flow interrupting device 209 into the open state, and/or sending the display signal to display 206 or 109.

Upon viewing the displayed information, a user 301 makes a choice to verify or reject the proposed configuration of the device 200 at step 420-10. At step 420-11, the user 301 can verify the displayed configuration by altering the operative state of the first current flow interrupting device 207 into the closed state to reinstate the flow of current through the associated electrical current flow path. The user can alter the operative state of the current flow interrupting device 207 via the physical interface device 203. Alternatively, a user may verify the configuration via an alternative input on the device 200, e.g., physical touch interface device 213. This may be preferred when it is not safe to alter the state of the current flow interrupting device 207 into the open state, for instance. Such a condition may exist when a sub-circuit connected to the device 200 has not been properly terminated, during a new build or renovation for instance. In either implementation, at step 420-11 a physical input is required at or on the circuit protection device 200 from a user 301 that is spatially local to the device 200, for verification of the configuration data (that will be subsequently used by the circuit protection device 200 to perform the one or more associated operative function(s)).

The controller 201 is configured to identify one or more conditions or criteria indicative of a user-verification of the configuration data received by the device 200. The one or more conditions or criteria comprise, for instance, an indication of closing of the first current flow interrupting device 207 that occurs after receipt of a configuration instruction at step 420-5, after storage of reconfiguration data in electronic storage 201B (or 101B) at step 420-5, after opening the second flow interrupting device 209 at step 420-8, and/or preferably, after sending a display signal at step 420-9. The indication may be associated with an electrical parameter indicative of input power being supplied or available at a power input side/connection 211 of the circuit protection device 200. Accordingly, the controller 201 at this stage is configured to receive data or a signal indicative of one or more electrical parameter(s) associated with a power input side/connection 211 of the circuit protection device 200 and determine if the electrical parameter(s) complies/comply with predetermined threshold criterion or criteria associated with the parameter. The threshold criterion or criteria may be determined based on a sufficient/expected level or amplitude of the electrical parameter required to supply power to a particular load. For example, the controller 201 may be configured to receive or detect a signal or data indicative of a voltage at the input of the power input side 211. The controller 201 may be further configured to determine if a voltage exceeds a predetermined threshold voltage amplitude indicative of a connected mains input supply 110 (e.g., 240V maximum voltage amplitude to be delivered from the power source connected to the panel 100 to the associated load). The voltage parameter may be an average voltage, a maximum voltage or any other voltage related parameter, for instance. It will be appreciated that other electrical parameters and associated threshold criterion/criteria may be utilised, and the present disclosure is not intended to be limited to these examples.

Alternatively, at step 420-11 the user verification condition comprises receipt of an input indicative of user verification via physical touch interface device 213. The input indicative of user verification may comprise a predetermined activation of the physical touch interface 213, such as a long press exceeding a predetermined period or other activation type or pattern. In such an implementation, the controller 201 is configured to detect a user verification of a configuration via a signal received in association with interface device 213.

In some embodiments, the controller 201 may be further configured to identify or determine one or more operative conditions or criteria (other than the user verification) before executing the configuration update and committing the configuration data to volatile memory. For instance, the controller 201 may be further configured to detect or determine if the configuration data has been successfully stored in electronic storage (e.g., in a non-volatile memory location of storage 201B or 101B).

In some embodiments, prior to executing the configuration update and committing the configuration data to non-volatile memory 201B/101B, the controller 201 is configured to detect or determine if an input or output voltage of the ELV supply 210 is substantially stable. The controller 201 is configured to determine if an input voltage, or an output voltage, of the ELV supply 210, or both, is substantially stable for a predetermined minimum duration (e.g., at least 2 seconds). This may alternatively be performed by the controller 101 and the controller 201 may be configured to receive an indication of a stable input or output voltage of the ELV supply 210, or both, from the controller 101, prior to executing the configuration update. Any suitable technique for determining voltage stability as is known in the art may be employed, such as comparing the voltage fluctuations against predetermined maximum fluctuation threshold(s) and determining if the fluctuations are within the threshold(s) or outside to indicate a stable ELV supply 210.

The controller 201 is preferably configured to perform an algorithmic (e.g., checksum) verification process on the configuration data and to accept the verification update only if the verification process is successful. This may alternatively be performed by the controller 101, or the remote user device 302, and the controller 201 may be configured to receive an indication of a successful algorithmic verification prior to executing the configuration update/committing the configuration data to non-volatile memory 201B/101B.

During the check for conditions/criteria required for configuration (including user-verification conditions/criteria), the controller 201 is configured to transmit one or more control signals to the display 206 and/or other visual interface device(s) 205 of the circuit protection device 200 (or of the power distribution panel 100) to indicate that the controller 201 is in a pending configuration check stage or similar.

The controller 201 is configured to perform one or more configuration functions based on the identification of the one or more user-verification conditions or criteria and/or other conditions/criteria required for configuration as mentioned above. The configuration function(s) comprise, at step 420-12, updating the configuration data stored in a non-volatile memory location of electronic storage 201B (or 101B) with the configuration data stored in the volatile memory location (e.g., at step 420-5). Updating the configuration data comprises replacing old/previous configuration data with the new configuration data. The configuration function(s) may further comprise sending a control signal to the second flow interrupting device 209 to trigger the device in a closed state (if in an open state). Preferably, sending the control signal to close the second flow interrupting device 209 occurs after the configuration data is updated. During this period (e.g., at step 420-12) the controller 201 may be configured to transmit one or more control signals to the display 206 and/or other visual interface device(s) 205 of the circuit protection device 200 (or of the power distribution panel 100) to indicate that the controller 201 is in a pending configuration stage or similar.

Upon or shortly after closing the second flow interrupting device 209, the configuration process terminates and the circuit protection device 200 subsequently resumes full operation of the one or more operational function(s), including the one or more protective functions associated with the configuration, based on the new configuration data. At this point, the display 206 may be driven to display the updated configuration data, and the indicators may be driven to indicate a fully operative mode of operation.

The abovementioned condition(s) or criterion/criteria indicative of user-verification of the proposed configuration may comprise a temporal aspect, such as a threshold period of time within which the user-verification condition/criteria must be received or determined by controller 201 (e.g., closing of the first flow interrupting device 207 or receiving a user-verification via interface device 213), after any one or more of steps 420-5, 420-8 and/or 420-9. The threshold period may be predetermined and stored in electronic storage associated with controller 201. A timer associated with controller 201 may be initiated at or upon termination of one of steps 420-5, 420-8 or, preferably, 420-9 for instance, and the controller 201 may be further configured to determine if the timer reaches the threshold period before user-verification is determined or received. In this manner, at step 420-13, an option for a user 301 to reject the configuration data displayed on the display interface 202 (or interface 109) is to wait for the threshold period to elapse. At which point, the configuration data may be deleted from the volatile memory location by the controller 201 (stage 420-14).

A user may additionally or alternatively take an active step to provide an indication to controller 201 of their intention to reject the configuration update based on the data displayed in stage 420-6. For instance, at step 420-13, a user may send a signal to the controller via the user device 302, or may provide an input via the physical touch interface device 213. This would typically happen in response to the user viewing configuration data displayed on display 206 that is not as intended for the device 200, thereby preventing a potentially unwanted and high-risk outcome.

In an event that a user rejects the configuration data at step 420-13, the current, non-updated configuration data is retrieved from the associated non-volatile memory location by the controller 201 (or systems controller 101) and displayed on display 206 (or 109) for the user 301 to view at step 420-14. The configuration settings may be transmitted back to the user device 302 via the systems controller 101 at step 420-15 and the confirmed configuration reset may be displayed on the user device 302 for the user at step 420-16. At step 420-14 the configuration data stored in temporary memory is preferably also be deleted.

Following this, a control signal is sent to trigger the second flow interrupting device into the closed state (if in an open state). At step 420-17, the user may decide to cancel configuration or enter a new reconfiguration back at step 420-1. A user may trigger the first flow interrupting device 207 back into the closed state at step 420-18. Preferably this step occurs prior to the closing of the second flow interrupting device at step 420-19, and the controller 201 is configured to identify one or more user-verification and/or operative conditions or criteria for reinitiating operation of the device based on the non-updated configuration data. These may be the same or similar to the configuration related user-verification and/or operative conditions, excluding, for instance, determining if configuration data has been stored in volatile memory. Upon or after making these checks, the controller 201 may be operable to close the second flow interrupting device 209 (if in an open state).

In some alternative embodiments, at step 420-7, the user device may instead send a request to trip one or both current flow interrupting device(s) 207, 209 of the circuit protection device 200. In such embodiments, step 420-6 may be mitigated, or other information may be displayed to the user, such as an indication of the next step(s) of the configuration process. However, the method requiring the user to physically interact with the circuit protection device 200 to initiate the configuration request with the circuit protection device is preferred in applications requiring higher security as the user intervention throughout the process can mitigate potential malicious updates initiated by remote hackers.

In some embodiments, at step 420-11, a user may not physically actuate a user input, such as physical interface devices 203 or 213, to verify the configuration update, but the controller 201 or the controller 101 may verify the update and accordingly automatically trigger the closing of the flow interrupting device(s) 207, 209 (if open). However, the method requiring the user to physically interact with the circuit protection device to verify the configuration request with the circuit protection device 200 is preferred in applications requiring higher security as the user intervention throughout the process can mitigate potential malicious updates initiated by remote hackers.

It will be appreciated that in some embodiments, one or more of the steps performed by controller 201 (e.g., any of the steps or sub-steps of 420-5, 420-8, 420-9, 420-12, 420-14 and/or any other steps described herein that are performed by the controller 201) may alternatively or cooperatively be performed by the controller 101 of the power distribution panel 100.

Figure 9A:
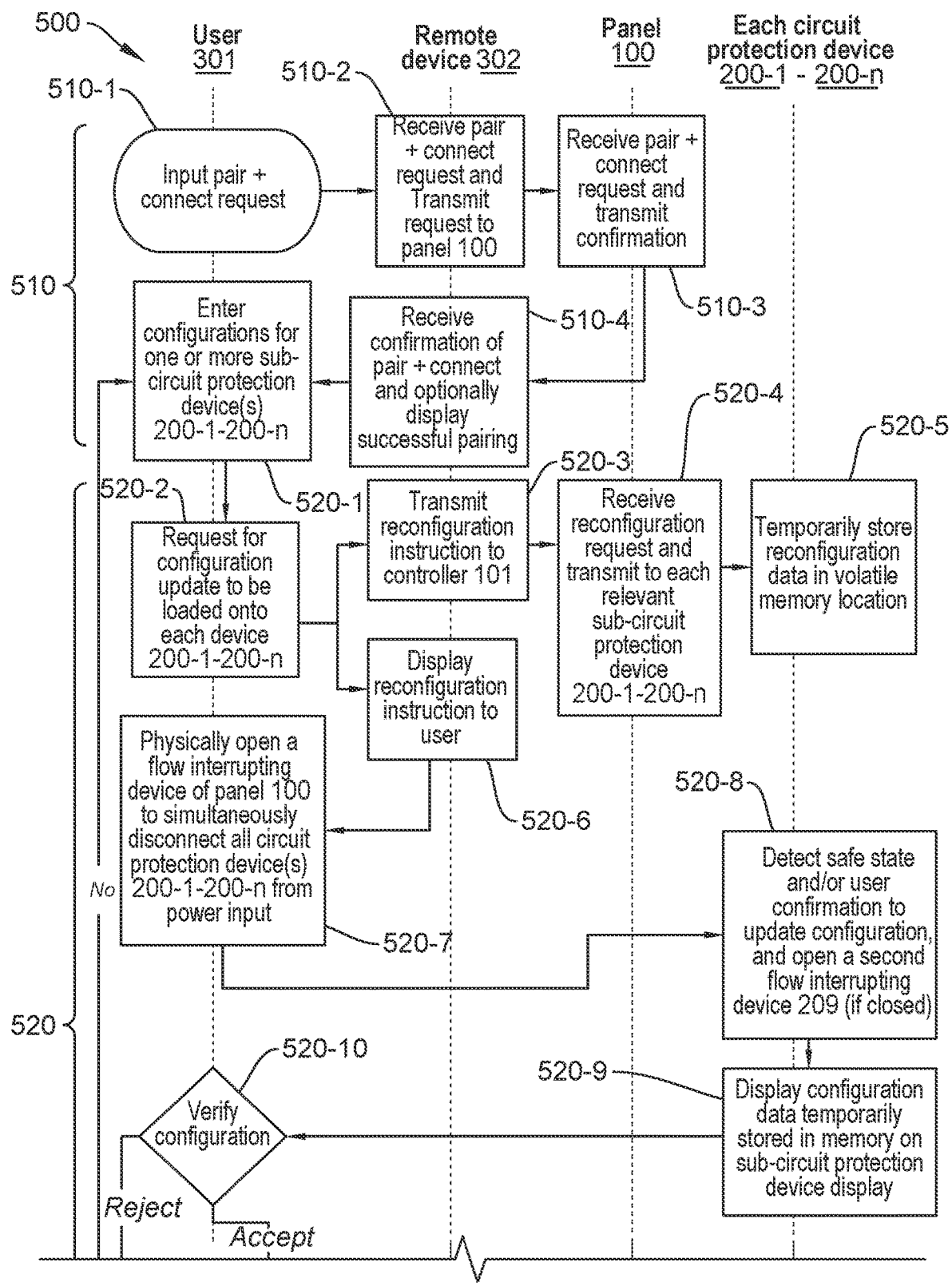
FIGS. 9A and 9B collectively are a flow diagram depicting communication between multiple entities of the power distribution system of FIG. 1 during a configuration update of one or more circuit protection device(s) of a power distribution panel in accordance with an exemplary embodiment.
Figure 9B:
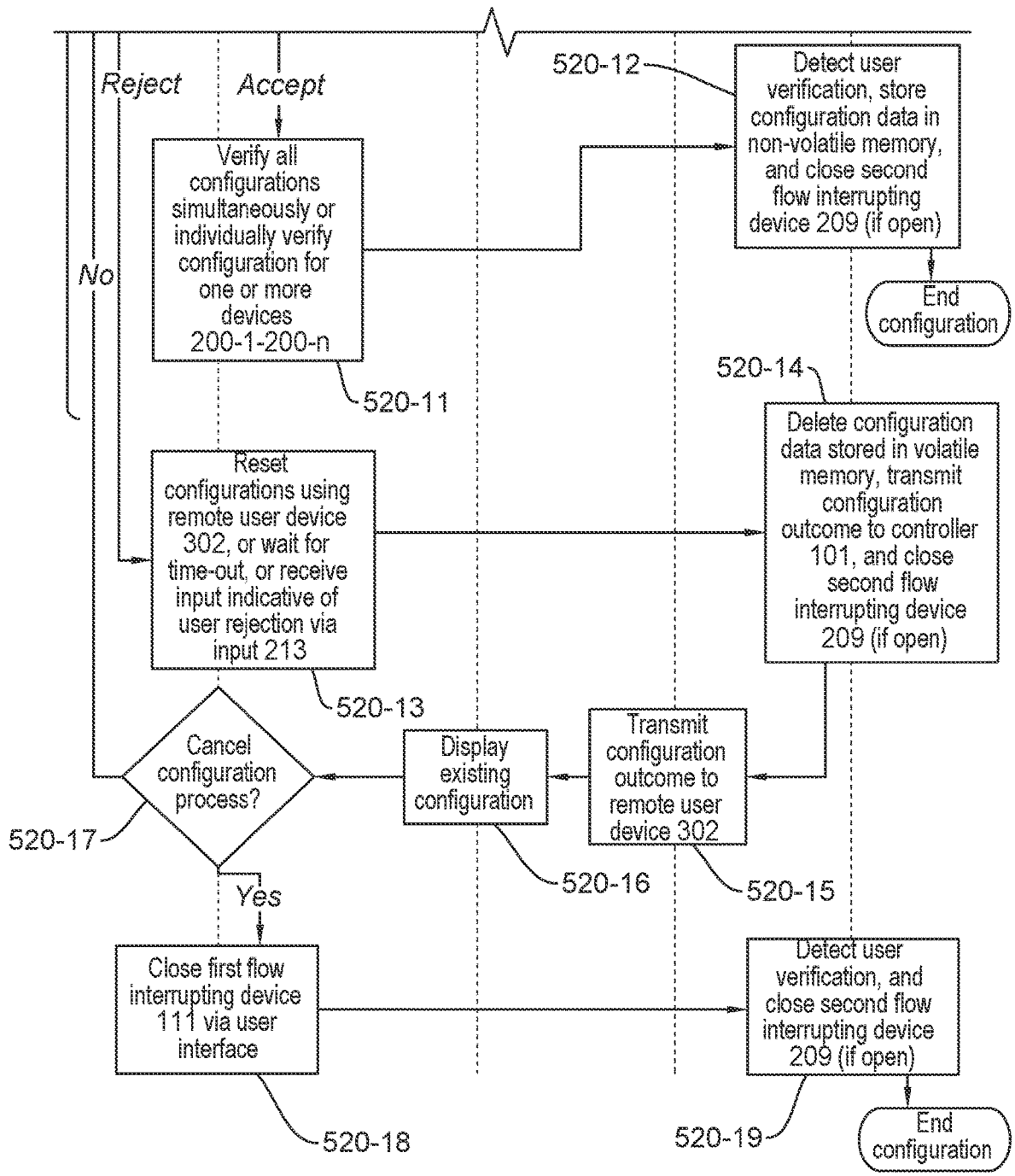

Referring to FIGS. 9A and 9B, another exemplary embodiment of a logic flow 500 exemplifying communication between various entities of system 10, to perform a configuration update is shown. The logic flow 500 may implement at least some of the steps of method 300 and/or method 350. The logic flow 500 enables a user to request an update of the configuration of one or more circuit protection device(s) 200-1-200-n of the panel 100 substantially simultaneously, and in particular two or more circuit protection devices 200-1-200-n for a batch update. Although this process 500 is suited for performing a batch update on multiple devices 200-1-200-n installed in panel 100, it could still be used to perform an update for a single device 200 installed in panel 100.

The logic flow 500 is a computer implemented process that enables human/operator interaction with one or multiple computing devices to execute a configuration update of each circuit protection device 200-1-200-n. Each step of logic flow 500 is carried by an entity of the system 10, including the human operator 301, the user's device 302, the central controller 101 of the panel 100, or the controller 201 of each circuit protection device 200-1-200-n as shown in FIG. 4 and described below. In some cases, a task or step of logic flow 500 could be carried out by a different entity of system 10 as described below. Each computing device tasked with carrying out a step or sequence of steps in logic flow 500, including the user's device 302, the central controller 101 and the controller 201 of each circuit protection device 200-1-200-n, is preferably preconfigured or preprogrammed to perform the step or sequence of steps. Accordingly, in an embodiment of user device 302, the user device 302 comprises at least one processing device and at least one electronic storage medium associated therewith, the electronic storage medium or media having stored therein instructions executable by the processing device(s) to carry out the associated steps of logic flow 500 described below, for which the user device bears responsibility. In an embodiment of controller 101, the electronic storage medium or media 101B comprises instructions stored therein (e.g., instructions 101B-2) and executable by the processing device 101A for carrying out the associated steps of logic flow 500 described below, for which the controller 101 bears responsibility. In an embodiment of controller 201 of a circuit protection device 200-1-200-n, the electronic storage medium or media 201B comprises instructions stored therein (e.g., instructions 201B-6) and executable by the processing device 201A for carrying out the associated steps of logic flow 500 described below, for which the controller 201 bears responsibility.

The configuration update process enables initial configuration of a circuit protection device 200, e.g., during or after initially installing each circuit protection device 200-1-200-n in a power distribution panel 100, or during installation of a power distribution panel 100 in a dwelling. In this situation, the configuration update process would store new configuration data associated with the update in electronic memory accessible by the controller 201 of each device 200-1-200-n. It may alternatively replace an existing safe factory configuration. Thereafter, the configuration update process can be used as a "reconfiguration" process that replaces configuration data stored in electronic memory accessible by the controller 201 of each circuit protection device 200-1-200-n with updated configuration data for that device. As previously mentioned, the memory is preferably memory 201B of controller 201 but it could alternatively be a memory external to the device 200-1-200-n, e.g., memory 101B. The configuration data for each device 200-1-200-n comprise instructions for performing the operational function and/or parameters associated with the operational function as previously mentioned in relation to the circuit protection device 200.

At a first pairing stage 510 of the logic flow 500, a user 301 initiates a request to communicatively couple the remote user device 302 with the central controller 101 of the power distribution panel 100. A user initiates the request by inputting a request via the user interface of the device 302 at step 410-1. This prompts device 302 to transmit a pair and connection communication request to the central controller 101 of the power distribution panel 100 at step 510-2. The central controller receives the request 101 via the communications interface 102 of the power distribution panel at step 510-3. If the connection is successful, the central controller 101 transmits a confirmation signal to the user device 302 at step 510-4. The confirmation signal may comprise an indication of the current configuration settings or data stored in permanent memory for each circuit protection device 200-1-200-n installed in the panel 100.

The pairing enables communication between the user device 302 and the controller 101 of the power distribution panel 100. The pairing is preferably via wireless communication. In other embodiments, the pairing may enable communication between the user device 302, directly to the controller 201 of each circuit protection device 200-1-200-n to be configured. A user may initiate a request to communicatively couple the remote user device 302 with the controller 201 of each circuit protection device 200-1-200-n at the first pairing stage 410 to connect the device 302 directly with controller 201.

After the pairing stage, a user 301 can initiate the logic flow for a device configuration update stage 520 for one or more circuit protection device(s) 200-1-200-n, and optionally a batch update of multiple circuit protection device(s) 200-1-200-n using this process. At step 520-1, a user 301 can input data indicative of a target update of the configuration data for one or more circuit protection device(s) 200-1-200n of the panel 100. This may be in response to the device 302 displaying configuration options for each device 200 the user chooses to update. The user can input configuration data for multiple circuit protection device(s) 200-1-200-n of panel 100 during this stage. This may include an indication of a fault detection function and/or fault detection criteria associated with that function, for each circuit protection device 200-n.

The user device 302 transmits one or more configuration request(s) or instruction(s) corresponding to one or more of the device(s) 200-1-200-n to the controller 101 of the panel 100, at step 520-3. The request may be for multiple device(s) 200-n or multiple requests may be transmitted corresponding to the multiple device(s) 200-1-200-n, as previously mentioned. The controller 101 receives the configuration request(s) and transmits a configuration instruction to the controller 201 of each device 200-1-200-n based on the corresponding received configuration request, at step 520-4. This implementation is preferred as it reduces the complexity of the hardware and/or firmware associated with each circuit protection device 200-n. However, in other implementations, where direct communication can be established between the remote device 302 and the controller 201 of each device 200-1-200-n at stage 510, the relevant configuration instruction may be transmitted from the user device 302 to the controller 201 of each device 200-1-200-n at step 520-3, without the configuration instruction being received by controller 101 of panel 100 (e.g., bypassing step 520-4).

The configuration instruction comprises configuration data indicative of the target update to the operative configuration of the corresponding device 200-1-200-n, i.e., an update to the configuration of one or more operative function(s). Upon receipt, the controller 201 of each device 200-1-200-n stores the configuration data in an associated electronic storage (e.g., 201B), at step 520-5. Preferably the configuration data is initially temporarily pre-stored in a memory location distinct from a target memory location, e.g., a temporary/volatile memory location (201B-2) of the electronic storage 201B. The target memory location is the location accessible by the controller 201 to perform the one or more operative function(s) associated with the configuration data and is preferably a non-volatile memory location (e.g., 201B-4 or 201B-5). Each device 200-1-200-n stores this updated configuration data in local memory. However, in some embodiments, at step 520-5, the controller 101 may initially and temporarily store the configuration data for each update in electronic storage 101B associated therewith. This may be a temporary/volatile memory location of the electronic storage 101B.

At step 520-6, after the user 301 confirms the target configuration update, the user device 302 may display instructions or information via the user interface of device 302 to inform the user of steps required to activate and complete the configuration. Such instructions or information may include for instance a prompt for the user to trigger a current flow interrupting device (e.g., 111) of the panel 100 into an open state via an associated physical touch interface (e.g., 112), if it is in a closed state. In one embodiment, the display prompts the user to trigger the current flow interrupting device 111 into an open state to electrically disconnect a power input side 110 of the power distribution panel 100 from the power input side 211 of each of the circuit protection device(s) 200-1-200-*n*. In other words, the user 301 operates the panel to open an electrical current flow path required for performing the one or more operational function(s) associated with the configuration for each device 200-1-200-*n* that needs to be updated using a single input. The display may alternatively or additionally prompt the user to check that each device 200-1-200-*n* to be configured is in a safe configuration state, being a state where an electrical flow path between the input side 110 of the panel 100 and the input side 211 of each device 200-1-200-*n* is disconnected. In response, the user can actuate the physical touch interface 112 to open the flow interrupting device 111 if it is in the closed state. In some cases, such as during initial install of the panel 100, the device 111 may already be in an open state and the user may not be required to actuate the touch interface 112. Step 520-6 may occur substantially simultaneously to any one or more of step(s) 520-3-520-5. Alternatively, it may occur in response to a completion of any one of steps 520-3 to 520-5. In this latter implementation, the controller 101 or each controller 201 may transmit a signal intended for receipt by the user device 302 to indicate a termination of the associated step(s) 520-3 to 520-5. In some embodiments, the current flow interrupting device 111 may already be in an open state and accordingly step 520-7 may not be required. Furthermore, step 520-6 is preferred but also optional and in some embodiments may be mitigated.

As mentioned, if the flow interrupting device 111 is in a closed state, triggering the device 111 into the open state via physical touch interface 112 may place all devices 200-1-200-*n* into a safe operating condition for configuration. In some implementations, the current flow interrupting device 209 of each device may also be opened before the device 200-1-200-*n* is considered in a safe operating state. This could be, for instance, when the circuit protection device 200-1-200-*n* is connected to a power source at the load connection such as a PV system 173 or battery 174. Actuation of the physical touch interface 112 also inhibits the flow of current through the associated electrical flow path, thereby disconnecting each circuit protection device power input 211 from the panel's source of input power, at 110. Accordingly, the standard functionality of the device is not affected during the configuration procedure as primary power does not flow through the device.

Actuation of the physical touch interface device 112 by the user 301 also provisionally confirms the user's intention to configure the circuit protection device(s) 200-1-200-*n* based on the configuration data. Accordingly, at or prior to step 520-8, the controller 201 of each device 200-1-200-*n* is operable to determine one or more operative conditions or criteria indicative of a safe configuration state of the device 200-1-200-*n* and/or a user's confirmation to configure the circuit protection device 200-1-200-*n*. Such conditions and/or criteria may comprise a disconnection of the power input side 211 of the device 200-1-200-*n* from the primary source of input power associated with the panel 100, e.g., mains connection 110, for instance. The controller 201 of each device 200-1-200-*n* is operable to determine an indication of disconnection of the device from the primary power source, based on a monitored electrical parameter indicative of input power being supplied or available at a power input side/connection 211. The controller 201 is preferably configured to determine, based on data or signal(s) indicative of one or more electrical parameters associated with the power input side/connection 211, if the electrical parameter(s) complies/comply with predetermined threshold criterion or criteria indicative of disconnection. The threshold criterion or criteria may be associated with a disconnected state between the load side and the power input side. For example, the controller 201 may be configured to determine if a voltage at the input of the power input side 211 of the device 200-1-200-*n*, exceeds a predetermined threshold voltage amplitude indicative of a disconnected mains supply input 110 (e.g., 0V or 12V maximum voltage amplitude). The voltage parameter may be an average voltage, a maximum voltage, or any other voltage related parameter, for instance. It will be appreciated that other electrical parameters and associated threshold criterion/criteria may be utilised, and the present disclosure is not intended to be limited to these examples.

The one or more operative conditions indicative of a safe configuration state may further comprise determination of a substantially stable state of the ELV supply 210. Accordingly, the controller 101, or the controller 201 of each device, may be configured to determine if the voltage at the input, or the voltage at the output of the ELV supply 210, or both, is/are substantially stable. The controller 101, or each controller 201 may be configured to determine if the input or the output voltage, or both, is(are) substantially stable for a predetermined minimum duration (e.g., at least 2 seconds). Any suitable technique for determining voltage stability as is known in the art may be employed, such as comparing the voltage fluctuations against predetermined maximum fluctuation threshold(s) and determining if the fluctuations are within the threshold(s) or outside to indicate a stable ELV supply 210.

The one or more operative conditions indicative of a safe configuration state and/or user confirmation of configuration may alternatively or in addition be based on the storage of configuration data in the electronic storage 201B (or storage 101B). For example, the controller 201 of each device 200-1-200-*n* may determine if a volatile memory location of electronic storage 201B (or 101B) has stored therein data indicative of the configuration data associated with the update, and accordingly identify a user confirmation event for configuring the circuit protection device 200-1-200-*n*.

This function of determining operative condition(s) indicative of a safe configuration state and/or a user's confirmation to configure one or more circuit protection devices 200-1-200-*n* may alternatively or cooperatively be performed by the controller 101 for one or more of the circuit protection device(s) 200-1-200-*n* in some variations of this embodiment.

The controller 201 of each subcircuit protection device 200-1-200-*n* is further operable to perform one or more functions in response to identification of a safe configuration state and/or a user confirmation to configure the circuit protection device(s) 200-1-200-*n*. At step 520-8, in response to identifying a safe configuration state, the controller 201 of each circuit protection device 200-1-200-*n* triggers the second flow interrupting device 209 into an open state to suspend functionality associated with the second flow interrupting device 209 if it is in a closed state, such as load control and management functionality. The controller 201 of each device 200-1-200-*n* to be configured may transmit a control signal to the second flow interrupting device 209 to trigger the device into the open state at this step 520-8.

At step 520-9, after disconnecting the power input side from the load side or confirming disconnection/a safe configuration state for each circuit protection device 200-1-200-*n* to be configured, the controller 201 of each device 200-1-200-*n* sends a display signal to the display interface 206 of the respective device 200, comprising data indicative of the configuration data corresponding to the configuration instruction received. This data may be retrieved from the temporary electronic storage location. The display signal may comprise data indicative of an overcurrent fault detection function and/or an overcurrent threshold associated with the function, for instance. In an alternative embodiment, or additionally, the controller 201 of each device 200-1-200-*n* may transmit control signals to display this data on an alternative display of the panel 100, such as display 109 for instance.

In some embodiments, steps 520-8 and/or 520-9 may be alternatively or cooperatively performed by the controller 101, including identifying the safe configuration state and/or user confirmation of configuration for each circuit protection device 200-1-200-*n* to be configured, sending the control signal to trigger the second flow interrupting device 209 into the open state for each device 200-1-200-*n* to be configured (if closed), and/or sending the display signal to display 206 of each device 200-1-200-*n* to be configured, or to display 109 of the panel 100.

A user 301 must be spatially located near panel 100 to view the displayed configuration information relating to each device 200-1-200-*n* to be configured. Upon viewing this information, the user 301 (such as an electrician or other qualified operator) can make a choice on whether to verify or reject the proposed configuration for one or more of the device(s) 200-1-200-*n* to be configured at decision step 520-10. At step 520-11, the user 301 can verify the displayed configuration substantially simultaneously for all circuit protection device(s) 200-1-200-*n* to be configured (i.e., verifying a batch update) by altering the operative state of the first current flow interrupting device 111 into the closed state to reinstate the flow of current through the associated electrical current flow path. This can be done via a physical touch interface 112 to ensure the user is spatially located near the panel 100. In this manner, a physical input is required from the user 301 at or on the power distribution panel 100 to verify the configuration data of the update. Furthermore, this method provides for a single user verification to verify the configuration for multiple circuit protection devices 200-1-200-*n*. A single verification signal can be received or detected by the circuit protection device(s) also, to initiate configuration in the next step.

Alternatively, a user can verify the configurations for one or more circuit protection device(s) 200-1-200-*n* simultaneously by providing a physical input via an alternative user interface (e.g., one of the I/O interfaces 109) mounted on or in the power distribution panel 100. The alternative user interface of panel 100 may comprise a similar physical input mechanism, such as an electric switch, button, or other tactile input. Similarly, a single user verification is provided to verify the configuration of multiple circuit protection devices 200-1-200-*n*, and a signal indicative of this single verification can be received or detected by multiple circuit protection device(s) to initiate simultaneous configuration/reconfiguration in the next step.

At step 520-11 a user could also verify the configuration for some of the device(s) 200-1-200-*n* and reject the configuration for others. To do this a user 301 may individually verify the configuration for one or more circuit protection device(s) 200-1-200-*n* via a user input mounted in or on the device 200-1-200-*n*. For instance, the physical interface device 203 may be actuated by the user 301 to trigger the device 207 into a closed state (if it is in an open state) to verify a configuration update for a single device 200-1-200-*n*. Alternatively, the physical touch interface device 213 may be actuated in a similar manner as described for step 420-11 to verify a configuration update for a single device 200-1-200-*n*. As mentioned, this would be useful when a user does not wish to verify the configuration update for the entire batch of circuit protection device(s) 200-1-200-*n*, but only one or some of the device(s) 200-1-200-*n*. The configuration process may be repeated from step 520-1 for any configurations which the user chooses to reject, and once the user has verified the configuration of all device(s) 200-1-200-*n* to be configured, they may then close the flow interrupting device 111. Accordingly, at step 520-10 and 520-11 a user may verify the configuration(s) for some or all of the device(s) 200-1-200-*n* to be configured.

The controller 201 is further configured to identify one or more conditions or criteria indicative of a user-verification of the configuration data. The one or more conditions or criteria comprise any one of the user input actuations described in relation to step 520-11 that may occur after receipt of a configuration instruction at step 520-5, after storage of configuration data in electronic storage 201B (or 101B) at step 520-5, after opening the second flow interrupting device 209 at step 520-8, and/or after sending a display signal at step 520-9.

One such indication may be associated with an electrical parameter indicative of input power being supplied or available at a power input side/connection 211 of each circuit protection device 200-1-200-*n*. Accordingly, the controller 201 is configured to determine if an electrical parameter(s) at a power input side/connection 211 of each device 200-1-200-*n* to be configured, complies/comply with predetermined threshold criterion or criteria associated with the parameter indicative of user-verification. The threshold criterion or criteria may be determined based on a sufficient/expected level or amplitude of the electrical parameter required to supply power to a particular load associated with the device 200-1-200-*n*. For example, the controller 201 is configured to detect a signal indicative of a voltage at the input of the power input side 211. The controller 201 is further configured to determine if a voltage exceeds a predetermined threshold voltage amplitude indicative of a connected mains supply input (e.g., 240V maximum voltage amplitude to be delivered from the power source connected to the panel 100 to the associated load). The voltage parameter may be an average voltage, a maximum voltage, or any other voltage related parameter, for instance. It will be appreciated that other electrical parameters and associated threshold criterion/criteria may be utilised, and the present disclosure is not intended to be limited to these examples.

Another such indication of user-verification received or detectable by controller 201 of each device 200-1-200*n* is receipt of an input indicative of user verification via user input 213. The input indicative of user verification may comprise a predetermined activation of the touch interface 213, such as a long press exceeding a predetermined period or other activation type or pattern. In such an implementation, the controller 201 is configured to detect a user verification of a configuration via a signal indicative of a physical user input received via touch interface 213.

Yet another such indication of user-verification is the receipt of a physical user input via a user input device mounted on the power distribution panel, such as an input via interface 109.

The controller 201 of each device 200-1-200-*n* is preferably configured to identify or determine one or more operative conditions or criteria (other than the user verification) before executing the configuration update and committing the configuration data to volatile memory.

For instance, the controller 201 may be further configured to detect or determine if the configuration data has been successfully stored in electronic storage (e.g., in a non-volatile memory location of storage 201B or 101B).

The controller 201 is configured to detect or determine if an input or output voltage of the ELV supply 210 is substantially stable. The controller 201 may be configured to determine if an input voltage, or an output voltage, of the ELV supply 210, or both, is substantially stable for a predetermined minimum duration (e.g., at least 2 seconds). This may alternatively be performed by the controller 101 and the controller 201 may be configured to receive an indication of a stable input or output voltage of the ELV supply 210, or both, from the controller 101, prior to executing the configuration update. Any suitable technique for determining voltage stability as is known in the art may be employed, such as comparing the voltage fluctuations against predetermined maximum fluctuation threshold(s) and determining if the fluctuations are within the threshold(s) or outside to indicate a stable ELV supply 210.

The controller 201 is further configured to perform an algorithmic (e.g., checksum) verification process on the configuration data and to accept the verification update only if the verification process is successful. This may alternatively be performed by the controller 101, or the remote user device 302, and the controller 201 may be configured to receive an indication of a successful algorithmic verification prior to executing the configuration update. This computational configuration is distinct from the user verification mentioned above. A computational configuration verifies that the data sent from the remote device 302 and received by the controller 201 is the same. Whereas the user verification verifies that the configuration data that will be committed to the device is accurate.

During the check for conditions/criteria required for configuration (including user-verification conditions/criteria), the controller 201 of each device 200-1-200-n may be configured to transmit one or more control signals to the display 206 and/or other visual interface device(s) 205 of the circuit protection device 200-1-200-n (or of the power distribution panel 100) to indicate that the controller 201 is in a pending configuration check stage or similar.

The controller 201 of each device 200-1-200-n is operable to perform one or more configuration functions based on the identification of the one or more user-verification conditions or criteria and optionally the other conditions/criteria required for configuration as mentioned above. At step 420-12, the configuration function(s) comprise updating the configuration data stored in a non-volatile memory location of electronic storage 201B (or 101B) with the configuration data stored in the volatile memory location (e.g., at step 520-5). Updating the configuration data may comprise replacing old configuration data with the new configuration data associated with the update. In the case of a previously unconfigured device 200, updating the configuration data may comprise storing the configuration data in the volatile memory location at step 520-5 for the first time. Updating the configuration data may also comprise deleting the configuration data temporarily stored in the volatile or other memory location at step 520-5. The configuration function(s) further comprise sending a control signal to the second flow interrupting device 209 to trigger the device in a closed state (if in an open state). Preferably, sending the control signal to close the second flow interrupting device 209 occurs after the configuration data stored in non-volatile memory is updated. During this period (e.g., at step 520-12) the controller 201 of each device 200-1-200-n may be configured to transmit one or more control signals to the display 206 and/or other visual interface device(s) 205 of the circuit protection device 200 (or of the power distribution panel 100) to indicate that the controller 201 is in a pending configuration stage or similar.

Upon or shortly after updating the configuration data in the appropriate memory location and closing the second flow interrupting device 209 for each device 200-1-200-n (if open), the configuration process terminates and each circuit protection device 200-1-200n continues to perform the one or more operational function(s) based on the new configuration data (provided the flow interrupting device 111 is also closed). At this point, the display 206 of each device 200-1-200-n can also be driven to display the updated configuration data, and/or the indicators may be driven to indicate a fully operative mode of operation by controller 201.

The one or more conditions or criteria indicative of user-verification of the configuration data may be associated with a threshold period of time within which the indication of user verification is determined or received (e.g., closing the flow interrupting device 111, closing of the first flow interrupting device 207 of one or more device(s) 200-1-200-n, or receiving a user-verification via touch interface 213 for one or more device(s) 200-1-200-n within a threshold period of time). A timer associated with monitoring this threshold period of time may be initiated after any one or more of steps 520-5, 520-8 and/or 520-9. The threshold period of time may be predetermined and stored in electronic storage associated with controller 201 or controller 101. A timer operable via controller 201 or controller 101 is initiated at or upon termination of one of steps 520-5, 520-8 or 520-9 for instance, and the controller is configured to determine if the timer reaches the time period threshold before the user-verification indication is determined or received. In this manner, at step 520-13, an option for a user 301 to reject the configuration data displayed on the display interface 202 (or interface 109) is to wait for the threshold time period to elapse.

Additionally, or alternatively a user may reject a configuration by sending a signal indicative of user-rejection to the controller 201 (or controller 101). The signal may be transmitted by the user via user device 302, for instance at step 520-13.

In an event that a user rejects the configuration data at step 520-13 for one or more device(s) 200-1-200-n, the current, non-updated configuration data can be obtained from the associated non-volatile memory location by the controller 201 (or systems controller 101) and displayed on display 206 (or 109) for the user 301 to view at step 520-14. The configuration settings may be transmitted back to the user device 302 via the systems controller 101 at step 520-15 and the confirmed configuration reset may be displayed on the user device 302 for the user at step 520-16. At step 520-14 the configuration data stored in temporary memory is also deleted. A control signal is then sent to trigger the second flow interrupting device 209 of each device 200-1-200-n into the closed state (if opened).

At step 520-17, the user may decide to cancel the configuration process or enter a new configuration stage back at step 520-1 for one or more device(s) 200-1-200-n. A user can trigger the flow interrupting device 111 back into the closed state at step 520-18 to confirm that no further configurations are to be performed. Preferably this step occurs prior to the closing of the second flow interrupting device 209 for each device 200-1-200-n, at step 520-19, and the controller 201 is configured to identify one or more user-verification and/or operative conditions or criteria for reinitiating operation of the device based on the non-updated configuration data. These may be the same or similar to the configuration related user-verification and/or operative conditions, excluding, for instance, determining if configuration data has been stored in volatile memory. Upon or after making these checks, the controller 201 closes the second flow interrupting device 209.

In some alternative embodiments, at step 520-7, the user device may instead send a request to trip the current flow interrupting device 111. In such embodiments, step 520-6 may be mitigated, or other information may be displayed to the user, such as an indication of the next step(s) of the configuration process. However, the method requiring the user to physically interact with panel 100 to initiate the configuration request with the circuit protection device is preferred in applications requiring higher security as the user intervention throughout the process can mitigate potential malicious updates initiated by remote hackers.

In some embodiments, at step 520-11, a user may not physically actuate a user input (e.g., flow interrupting device 111, flow interrupting device 207, or physical touch interface device 213 for a device 200-1-200-n) to verify the configuration update, but the controller 101 may verify the update and accordingly automatically trigger closing of flow interrupting device 111 (if all configurations are to be confirmed) or flow interrupting device 207 (if a single device configuration is to be confirmed and the flow interrupting device 207 is open). However, the method requiring the user to physically interact with panel 100 to verify the configuration request may be preferred in applications requiring higher security as the user intervention throughout the process can mitigate potential malicious updates initiated by remote hackers.

It will be appreciated that in some embodiments, one or more of the steps performed by controller 201 of each device 200-1-200-n (e.g., any of the steps or sub-steps of 520-5, 520-8, 520-9, 520-12, 520-14 and/or any other steps describe herein that are performed by the controller 201) may alternatively or cooperatively be performed by the controller 101 of the power distribution panel 100.

Figure 10:
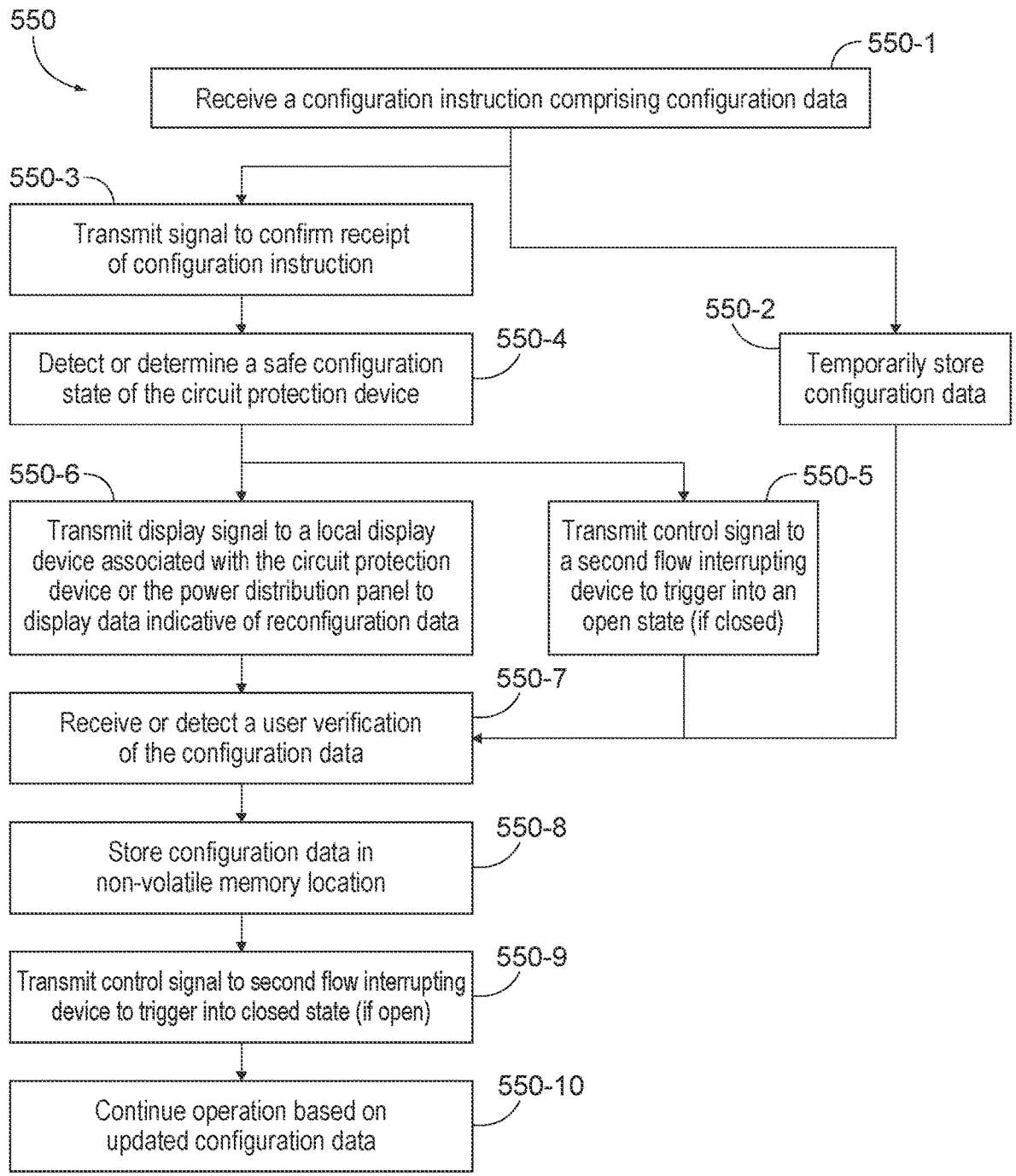
FIG. 10 is a flow diagram depicting a method for updating a configuration of a circuit protection device in accordance with an exemplary embodiment of the present disclosure.

Referring to FIG. 10, an exemplary embodiment of a method 550 implemented on one or more computing device(s) of the circuit protection device 200 and/or of the panel 100, for updating a configuration of a circuit protection device 200, in accordance with the logic flow 400 is shown. All features that have been described in detail with respect to logic flow 400, including for instance, the configuration instructions and the configuration data, will not be described in detail again for this embodiment for the sake of brevity, but they are hereby incorporated by reference. In FIG. 10, stages depicted in parallel and/or that branch out from the same preceding stage may occur simultaneously or concurrently and this depiction is not intended to indicate an OR logic relationship between the stages, unless stated otherwise.

In a first implementation of method 550, The controller 201 of the circuit protection device 200 is configured or is operable to perform steps 550-1 to 550-10 of method 550. In a second implementation of this embodiment, the controller 101 of the power distribution panel 100 comprising the circuit protection device 200 is configured or is operable to perform the steps 550-1 to 550-10 of method 550. In a third implementation of this embodiment, the controllers 201 and 101 of the circuit protection device 200 and the power distribution panel 100, respectively, are configured and cooperatively operable to implement and perform the steps 550-1 to 550-10 of method 550. Accordingly, the following steps of method 500 may be performed by any combination of one or more processing device(s) 201A, 101A and one or more electronic storage medium or media 201B, 101B, associated with the circuit protection device 200 and/or the panel 100.

At step 550-1, to initiate configuration of the circuit protection device 200, a configuration message or instruction is received, as described in relation to step 420-4 of logic flow 400, comprising configuration data for updating the configuration of the circuit protection device 200. At step 550-2, the configuration data is stored in an electronic storage medium or media, and preferably a volatile/temporary electronic storage, such as within memory location 201B of the circuit protection device 200 as described in relation to method step 420-5 of logic flow 400.

Simultaneously (or before or after step 550-2), at step 550-3, a signal or message may be sent to a remote user device (e.g., 302) indicative of receipt of the configuration message or instruction. This step may be omitted in some embodiments. At step 550-4, an indication of a safe configuration state is determined or detected as described in relation to method step 420-8 of logic flow 400. This may be based on electrical disconnection of an electrical current flow path between the power input side 211 and the load side 212, for instance. The electrical disconnection could be in response to the signal or message being sent at step 550-3. The electrical disconnection corresponds to opening of a first current flow interrupting device 207 electrically coupled to the electrical current flow path between the power input side 211 and the load side 212 of the circuit protection device 200 for instance. The electrical disconnection is preferably via a user input, as described with reference to step 420-7 of logic flow 400, more preferably a physical input via an interface, e.g., interface 203, of the circuit protection device 200 operatively coupled to the first current flow interrupting device 207.

At step 550-5, a control signal is sent to a second current flow interrupting device 209 of the circuit protection device to trigger the device 209 into an open state, if it is in the closed state as described in relation to step 420-8 of logic flow 400. This is preferably conducted in response to the detection of the safe configuration state, or in response to receipt or detection of a user input to open the device 207 at step 550-4. Operation of the one or more operative function(s) associated with configuration may be effectively suspended at this stage due to the disconnection of the power input side from the load side of the device 200. Simultaneously (or before or after) step 550-5, a display control signal is sent to a display interface 206 of the device 200 (or display 109 of panel 100) to display data indicative of the configuration data (step 550-6), as per step 420-9 of logic flow 400.

At step 550-7, a user verification of the configuration data is received or detected, as per step 420-12. The user verification is preferably based on a physical user input as described in relation to step 420-13 of logic flow 400, indicating the user's spatial location being at/in the vicinity of the circuit protection device 200. For instance, a user may trigger the flow interrupting device 207 into the closed state via the physical input interface 203. This may be detected at step 550-7 by determining a reconnection/reinstatement of the electrical current flow path between the power input side 211 and the load side 212 of device 200. Alternatively, if it is not safe to reconnect the electrical flow path, a user may provide an input via user input 213 of device 200, and at step 550-7 data or a signal indicative of this input may be received to indicate the user's intention to verify the configuration.

At step 550-8, upon receiving or detecting the user verification, the configuration data is stored in a non-volatile/permanent memory location that is associated with the one or more operative function(s) of the device 200, as described in relation to step 420-14 of logic flow 400. Old configuration data stored in the same memory location may be replaced with the new, updated configuration data in this step. In the case of a previously unconfigured device 200, updating the configuration data may comprise storing the configuration data in the non-volatile memory location for the first time. The configuration data may be moved from the temporary memory location of step 550-2 to the non-volatile/permanent memory location in this stage. The data stored in temporary memory may optionally be deleted at this stage. At this stage, the update of configuration data may conclude.

The configuration process may comprise additional steps 550-9 and 550-10. At step 550-9, a control signal may be transmitted to trigger the second current flow interrupting device 209 into the closed state, if it is in an open state and/or it is safe to do so, as described in relation to step 420-12 of logic flow 400. This may occur for instance if and only when the electrical flow path for performing the one or more operative function(s) is reconnected/closed. Upon or shortly after this step, full operation of the circuit protection device 200 continues (step 550-10), based on the updated configuration data stored in memory.

Figure 11:
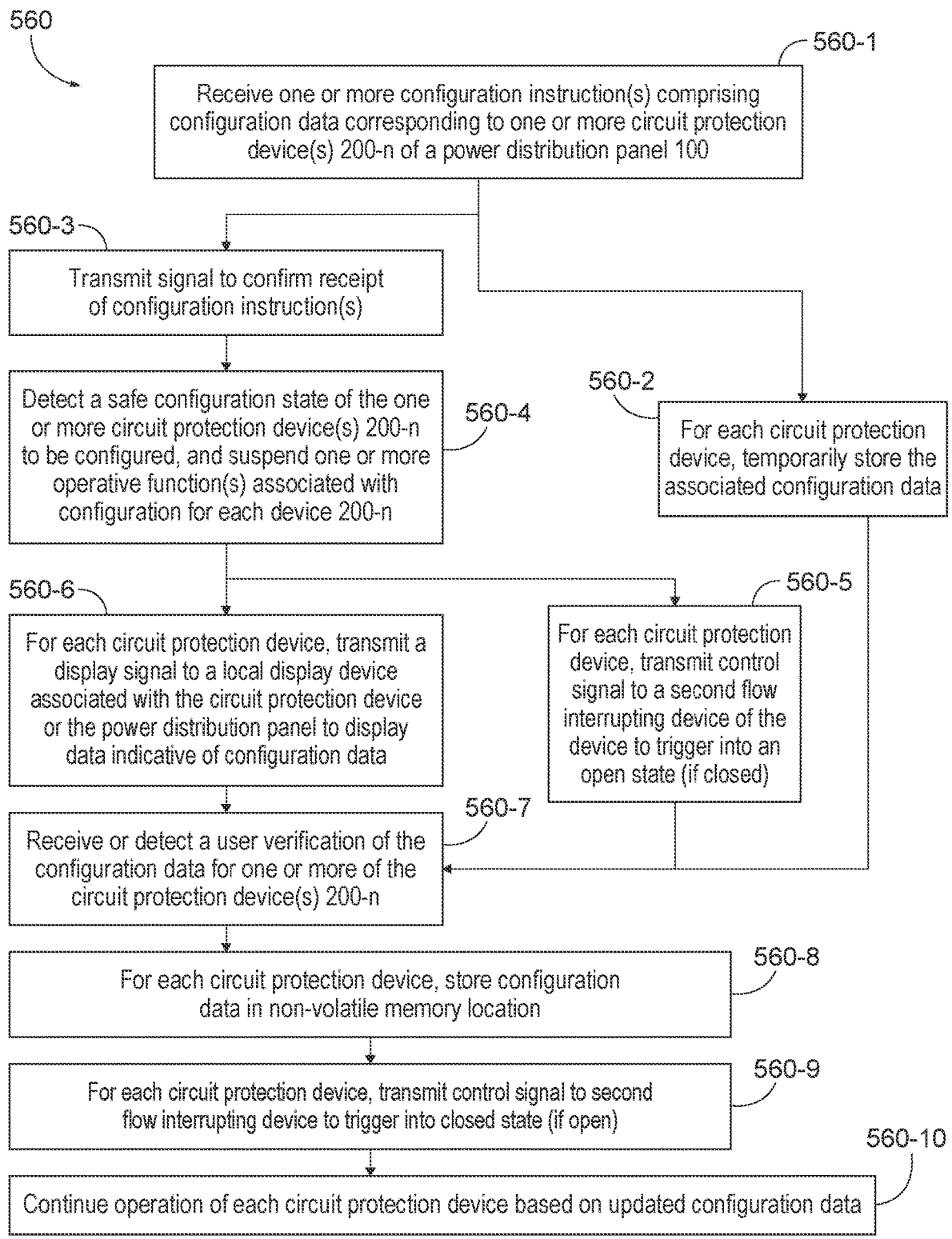
FIG. 11 is a flow diagram depicting a method for simultaneously updating a configuration of one or more circuit protection device(s) in accordance with an exemplary embodiment of the present disclosure.

Referring to FIG. 11, an exemplary embodiment of a computer implemented method 560 for updating a configuration of one or multiple circuit protection device(s) 200-1-200-n of power distribution panel 100, in accordance with logic flow 500 is shown. The method 560 may comprise performing an update on a single device 200, or a batch update of multiple circuit protection devices 200-1-200-n of panel 100 as described in relation to logic flow 500. In FIG. 11, stages depicted in parallel and/or that branch out from the same preceding stage may occur simultaneously or concurrently and this depiction is not intended to indicate an OR logic relationship between the stages, unless stated otherwise.

In a first implementation of method 560, the controller 201 of each circuit protection device 200-1-200-n is configured or is operable to perform steps 560-1 to 560-10 of method 560. In a second implementation, the controller 101 of the power distribution panel 100 comprising the circuit protection device(s) 200-1-200-n is configured or is operable to perform the steps 560-1 to 560-10 of method 560. In a third implementation, the controller 201 of each circuit protection device 200-1-200-n and the controller 101 of the power distribution panel 100 are configured and cooperatively operable to implement and perform the steps 560-1 to 560-10 of method 560. Accordingly, the following steps of method 500 may be performed by any combination of one or more processing device(s) 201A, 101A and one or more electronic storage medium or media 201B, 101B, associated with each circuit protection device 200-1-200-n and/or the panel 100.

At step 560-1, to initiate configuration, one or more configuration request(s) or instruction(s) is(are) received comprising configuration data for updating the configuration of one or more circuit protection device(s) 200-1-200-n, as described with reference to step 520-4 of logic flow 500. In the case where the configuration is for multiple devices 200-1-200-n, a single request comprising configuration instructions and data for multiple device(s) 200-1-200-n could be received at this stage, for example by controller 101 of the panel 100. Alternatively, at step 560-1, the controller may receive multiple configuration requests or multiple configuration instructions corresponding to the multiple circuit protection device(s) 200-1-200-n. In either implementation, the controller 101 processes the configuration request(s) and then sends separate configuration instructions based on the received configuration request(s) to the controller 201 of each of the devices 200-1-200-n to be configured. At step 560-2, the configuration data of each configuration instruction is stored in an electronic storage medium or media (e.g., memory 201B), and preferably a volatile/temporary electronic storage, for each circuit protection device 200-1200-n as per step 520-5 of logic flow 500.

Simultaneously (or before or after step 560-2), at step 560-3, one or more signal(s) or message(s) may be sent to a remote user device (e.g., 302) indicative of receipt of the configuration message(s) or instruction(s). This step may be omitted in some embodiments. At step 560-4, an indication of a safe configuration state is determined or detected for the circuit protection device(s) 200-1-200-n to be configured, as described in relation to step 520-8 of logic flow 500. This may be based on electrical disconnection of an electrical current flow path between the power input side 211 each circuit protection device 200-1-200-n and a power input/source, e.g., 110, of the power distribution panel 100 (required for performing one or more operative function(s) of each circuit protection device 200-1-200-n in relation to a connected load), for instance. The safe configuration state may be in response to opening of a current flow interrupting device 111 electrically coupled to the electrical current flow path between the power input side 211 of each device 200-1-200-n and the power input side 110 of the panel 100, as described in step 520-7 of logic flow 500. This may be in response to a user input, as described with reference to logic flow 500, more preferably a physical input via an interface, e.g., 112, of the power distribution panel 100 that is operatively coupled to the first current flow interrupting device 111. A single input, e.g., via 112 may place all devices 200-1-200-n in a safe configuration state, and detection of the safe configuration state may be based on this user input.

At step 560-5, a control signal is sent to a second current flow interrupting device 209 of each circuit protection device 200-1-200-n to trigger the device 209 into an open state (if closed), and suspend operation of the one or more operative function(s) associated with the configuration, as described with reference to step 520-8 of logic flow 500. This is preferably conducted in response to detecting a safe configuration state at state 560-4. Simultaneously (or before or after step 560-5), at step 560-6 a display signal is sent to a display interface 206 of each device 200-1-200-n (or display 109 of panel 100) to display data indicative of the configuration data associated with the device 200-1-200-n.

At step 560-7, one or more user verification(s) of the configuration data is(are) received or detected in response to displaying the configuration data at step 560-6, as described in relation to step 520-12 of logic flow 500. The user-verification detected or received is preferably based on a physical user input indicating the user's spatial location being at/in the vicinity of the circuit protection devices 200-1-200-n. A single user verification for configuring multiple devices 200-1-200-n simultaneously may be received, and detection of user verification may be based on determining reconnection of the electrical current flow path between the power input side 211 of each circuit protection device 200-1-200-*n* and the power input side 110 of the panel 100, for instance. As described in relation to logic flow 500, this is preferably via a physical user input that triggers the flow interrupting device 111 into the closed state. This method of user verification can achieve a batch configuration update for multiple circuit protection device(s) 200-1-200-*n* using a single user input. Alternatively, at step 560-7 multiple independent verifications may be received for one or more of the circuit protection devices 200-1-200-*n*, for instance based on the techniques described in relation to step 550-7 of method 550. This approach may be taken, for instance, when it is not safe to reconnect the electrical current flow path between the power input side 211 of each circuit protection device 200-1-200-*n* and the power input side 100 of the panel 100, for instance. This could be during an initial install of the panel 100 and/or initial wiring of the connected sub-circuits 171-1-171-*m*.

At step 560-8, in response to detecting user verification for one or more of the circuit protection device(s) 200-1-200-*n*, the existing configuration data stored in non-volatile/permanent memory may be replaced with the configuration data stored in temporary memory, for previously configured devices as described in relation to step 520-12 of logic flow 500. In the case of a previously unconfigured device, the non-volatile/permanent memory location allocated for the configuration data is populated with the configuration data stored in the temporary memory location. The data stored in the temporary memory location may be deleted after this. Following this, at step 560-9, a control signal is transmitted to trigger the second current flow interrupting device 209 into the closed state (if open), for each circuit protection device 200-1-200-*n* as described in relation to step 520-12 of logic flow 500. Upon or shortly after this step, full operation of each circuit protection device 200-1-200-*n* successfully configured continues (step 560-10) for each circuit protection device 200-*n*, based on the updated configuration/reconfiguration data stored in memory for that device 200-1-200-*n*. This may require the reconnection of the electrical current flow path between the power input side 211 of each circuit protection device 200-1-200-*n* and the power input side 110 of the panel 100 if not activated during step 560-7, and when it is deemed safe to do so by an operator.

Figure 12A:
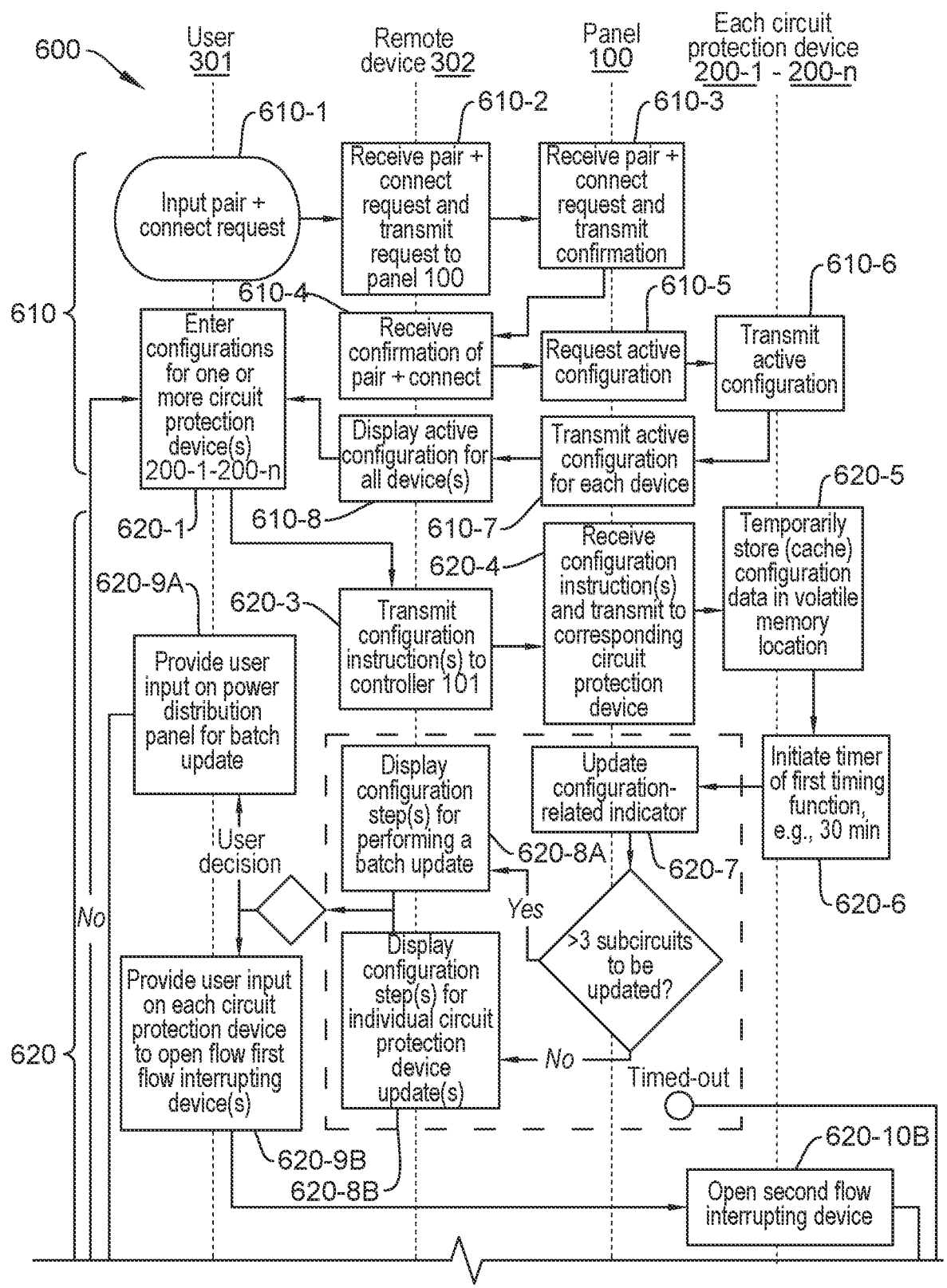
FIGS. 12A and 12B collectively are a flow diagram depicting communication between multiple entities of the power distribution system of FIG. 1 during a configuration update of one or more circuit protection device(s) of a power distribution panel in accordance with an exemplary embodiment.
Figure 12B:
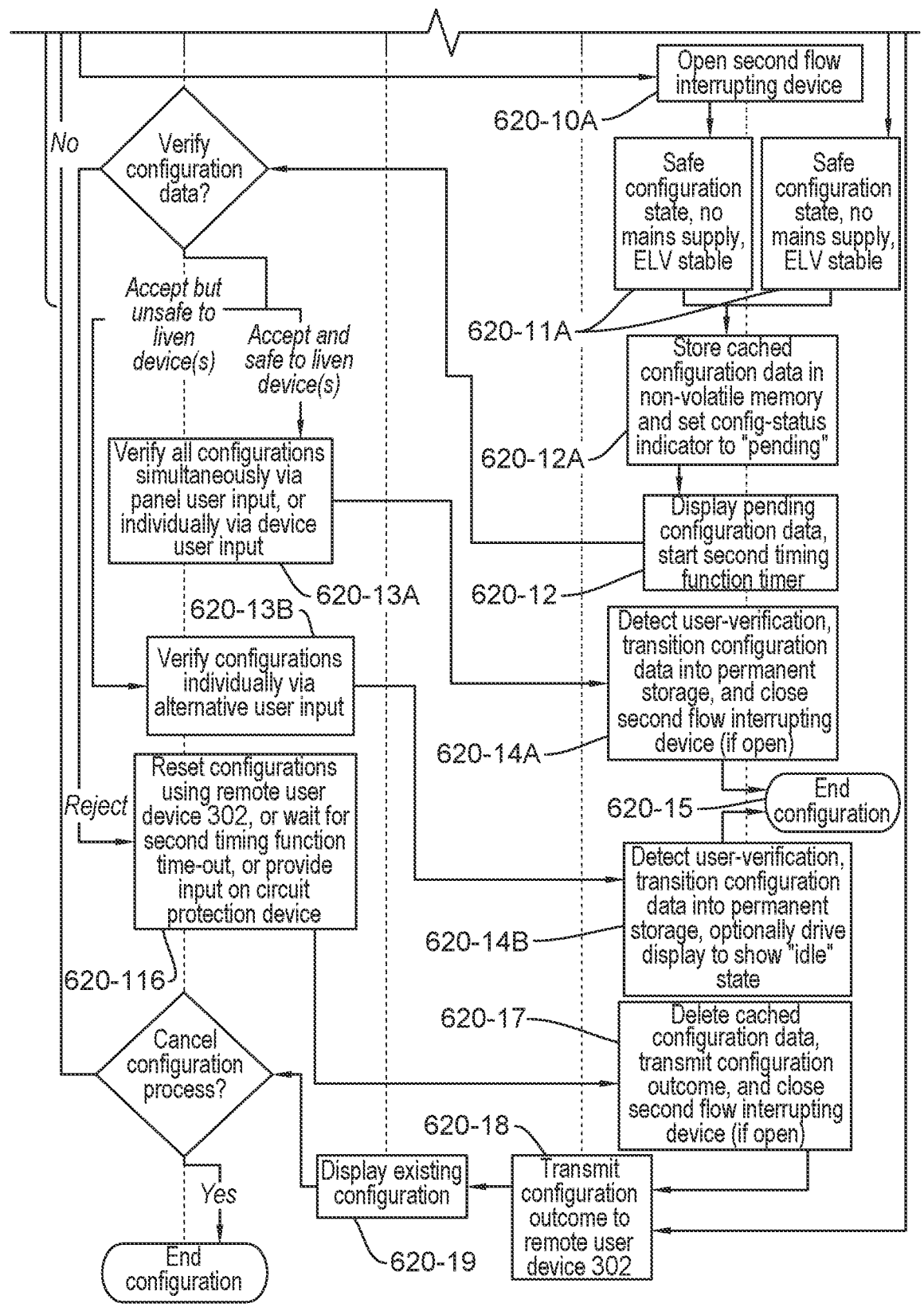

Referring to FIGS. 12A and 12B (hereinafter FIG. 12), a further exemplary embodiment of a logic flow 600 is shown (alternative to logic flows 400 and 500), illustrating a preferred communication sequence between various entities of system 10 for configuring one or multiple circuit protection device(s) 200-1-200-*n* installed in a power distribution panel 100 of the system 10. The logic flow 600 implements at least some of the steps of methods 300 and 350 as will be apparent from the following description.

The logic flow 600 is a computer implemented process that enables human/operator interaction with one or multiple computing devices to execute a configuration update of each circuit protection device 200-1-200-*n*. Each step of logic flow 600 is carried by an entity of the system 10, including the human operator 301, the user's device 302, the central controller 101 of the panel 100, or the controller 201 of each circuit protection device 200-1-200-*n* as shown in FIG. 12 and described below. In some cases, a task or step of logic flow 600 could be carried out by a different entity of system 10 as described below. Each computing device tasked with carrying out a step or sequence of steps in logic flow 600, including the user's device 302, the central controller 101 and the controller 201 of each circuit protection device 200-1-200-*n*, is preferably preconfigured or preprogrammed to perform the step or sequence of steps.

Accordingly, in an embodiment of user device 302, the user device 302 comprises at least one processing device and at least one electronic storage medium associated therewith, the electronic storage medium or media having stored therein instructions executable by the processing device(s) to carry out the associated steps of logic flow 600 described below, for which the user device bears responsibility. Further, the user device 302 comprises a user interface and is configured to receive input data from the user or output data to the user, to facilitate in executing certain tasks or steps of logic flow 600 as per the description below. In an embodiment of controller 101, the electronic storage medium or media 101B comprises instructions stored therein (e.g., instructions 101B-2 of FIG. 2) and executable by the processing device 101A for carrying out the associated steps of logic flow 600 described below, for which the pane 100/controller 101 bears responsibility (as illustrated in FIG. 12). Further, the panel 100 comprises a user input device (e.g., input device 112), including a physical touch interface for receiving input data from the user, and optionally a display device (e.g., display 109) for outputting data to the user, to facilitate controller 101 in executing certain tasks or steps of logic flow 600 as per the description below. In an embodiment of controller 201 of a circuit protection device 200-1-200-*n*, the electronic storage medium or media 201B comprises instructions stored therein (e.g., instructions 201B-6 shown in FIG. 5) and executable by the processing device 201A for carrying out the associated steps of logic flow 600 described below, for which the controller 201 bears responsibility. Further, each circuit protection device 200-1-200-*n* of panel 100 comprises a user input device (e.g., input 203), including a physical touch interface for receiving input data from the user, and optionally a display device (e.g., display 206) for outputting data to the user, to facilitate controller 201 in executing certain tasks or steps of logic flow 600 as per the description below.

A configuration initiation stage of the configuration update process of logic flow 600 is preferably implemented in accordance with the configuration initiation method 300 disclosed herein. Further, a configuration verification stage of the configuration update process of logic flow 600 is preferably implemented in accordance with the configuration process 350. Accordingly, logic flow 600 comprises one or more steps of operation that correspond with those of method 300 and/or method 350, and the description relating to those methods 300, 350 can also apply to this embodiment as is apparent from the description below.

The configuration update process of logic flow 600 can enable the initial configuration of one or multiple circuit protection device(s) 200-1-200-*n*, e.g., during or after initially installing each circuit protection device 200-1-200-*n* in the power distribution panel 100. Installing the circuit protection device 200-1-200-*n* comprises, connecting the power input side 211 to the phase, neutral and earth busbars of the panel 100 and the load side to an associated load 171-1-171-*m* or other circuit or system 172-174. Installation preferably also comprises mounting the housing of the device 200-1-200-*n* within an associated cradle or housing of the panel 100 (not shown). During initial install, the configuration update process shown in logic flow 600 enables the uploading of new configuration data into each circuit protection device 200-1-200-*n*.

Logic flow 600 also enables the reconfiguration of one or multiple circuit protection device(s) 200-1-200-*n* after each device has been activated to operate normally. A "reconfiguration" replaces configuration data stored in electronic memory accessible by the controller 201 of each circuit protection device 200-1-200-*n* with updated configuration data. Normal operation of the device 200-1-200-*n* can then be recommenced based on the new, updated configuration data.

The configuration update process of logic flow 600 can also enable the configuration of a prefabricated power distribution panel 100 with pre-installed circuit protection devices, during or after installation of the panel in a dwelling.

As previously mentioned, the memory storing the configuration data is preferably memory 201B of controller 201, but alternatively it could be a memory external to the device 200-1-200-*n*, e.g., memory 101B associated with controller 101 of the panel 100. As described in relation to logic flow 500 and 400, the configuration data for each device 200-1-200-*n* may comprise instructions executable by the processor 201A of the device 200-1-200-*n* for performing one or more operational functions, such as protective or safety functions, including overcurrent, arc fault and/or residual current safety and protective function(s). Alternatively, or in addition, the configuration data comprises one or more operational parameters associated with such operational function(s), such as a tripping current (e.g., 16A or 32A) for an overcurrent protection function. Examples of such operational functions and parameters are disclosed in other sections of the specification and hereby incorporated by reference for logic flow 600. The scope of the phrase "configuration data" in this embodiment is intended to include all possible implementations described in this specification in relation to this and other embodiments of the present disclosure.

The logic flow 600 comprises communicatively pairing a remote user device 302 with the system controller 101 of the power distribution panel 100 at a stage 610, in a similar manner as previously described for pairing stage 510 of logic flow 500. Pairing steps 610-1-610-4 of logic flow 600 are the same or similar to steps 510-1-510-4. This will not be described again for logic flow 600 for the sake of brevity and conciseness and the description relating to steps 510-1-510-4 is hereby incorporated by reference for corresponding steps 610-1-610-4 of logic flow 600.

After the pairing steps 610-1-610-4, the controller 101 may request an active configuration of each of the circuit protection device(s) 200-1-200-*n*, to display to the user for decision making. At step 610-5 a request is sent to each device to transmit the active configuration of the device 200-1-200-*n*. At step 610-6, each device 200-1-200-*n* receives the request, and in response transmits data or signal(s) indicative of the configuration data associated with the active configuration. This may be configuration data 201B-4 stored in the electronic memory 201B of the controller 201 of each device 200-1-200-*n*, for instance. At step 610-7, the controller 101 receives the data or signal(s) indicative of the active configuration for each device 200-1-200-*n* and transmits data or signal(s) to the remote user device 302 indicative of this information. At step 620-8, the user device 302 receives the data or signal(s) indicative of the active configuration of each device 200-1-200-*n* and accordingly drives a display of the device to output visual information indicative of the active configuration of each device 200-1-200-*n*. The steps 610-5-610-8 allow a user 301 to view the existing configuration information to assist with decision making. However, it will be appreciated that in some embodiments stages 610-5-610-8 may be omitted from logic flow 600.

After the pairing steps 610-1-610-4, and optionally after displaying the active configuration information at step 620-8, a user 301 can initiate the logic flow for a device configuration update stage 620 comprising, entering and sending configuration instructions to the central controller 101 for one or multiple circuit protection device(s) 200-1-200-*n*, placing or ensuring that each circuit protection device to be updated is in a safe configuration state (or alternatively initiating configuration via a physical user input as described in relation to method 300), and allowing the user to verify a pending configuration update by providing a physical touch input on each circuit protection device, or on the power distribution panel for a batch update (as described in relation to method 350). Data indicative of a pending configuration update is preferably also displayed on each circuit protection device 200-1-200-*n*, or alternatively on the power distribution panel 100, during the user-verification stage before a user confirms/verifies the configuration update with physical touch. During a pending stage of a configuration update, configuration data associated with the update is preferably stored in temporary (e.g., volatile) memory associated with the circuit protection device 200-1-200-*n*.

Upon verification of the configuration update by a user, configuration data associated with the update is preferably stored in permanent storage (e.g., in non-volatile memory location 201B-5, or in 201B-4 with a non-pending indicator in 201B-3) associated with the circuit protection device 200-1-200-*n*. The current flow path to the connected load or system 171-1-171-*m*, 172-174 is reinstated. Load control operational functions (including safety and protective functions) continue to operate at this stage, based on the new configuration data stored in permanent storage.

As mentioned, in the implementation shown, logic flow 600 enables a user to selectively and independently operate one or more circuit protection device(s) 200-1-200-*n* into the safe configuration state using a physical touch interface on each device prior to the user verifying the configuration update for that device. This is as per method steps 300-2-300-4 of method 300, for example. Alternatively, logic flow 600 allows a user to collectively operate multiple circuit protection device(s) 200-1-200-*n* into the safe configuration state using a single physical touch input before the user verifies the configuration update for one or more of the device(s) 200-1-200-*n*.

Logic flow 600 further comprises a first timing function that establishes a temporal interval during which a user can operate each device 200-1-200-*n* in the safe configuration state, or provide an input indicating their intention to proceed with configuration, before continuing the configuration update process on the respective device 200-1-200-*n*. For illustrative purposes only, the first timing function may impose a maximum limit of 10 mins, 30 minutes, or 60 minutes. If the user does not complete the abovementioned action(s) within this interval, the cached configuration data is deleted and the next time the device 200-1-200-*n* is operated in a standard mode of operation, operative function(s) resume based on the existing non-updated configuration data stored in volatile memory (e.g., configuration data stored in 201B-5). It will be appreciated that the first timing function is optionally implemented but preferred in this embodiment.

Logic flow 600 further comprises a second timing function, which establishes a temporal interval during which a user can verify a proposed configuration. The second timing function may be initiated after operating a respective device 200-1-200-*n* in the safe configuration state, or alternatively after a user input is received indicating the user's intention to proceed with the configuration. In yet another alternative, the timer of the second timing function may be initiated after the cached configuration is stored in non-volatile memory (e.g. memory location 201B-4) and/or the pending configuration is displayed on the circuit protection device or on the power distribution panel, indicating the pending update to the user. For illustrative purposes only, the second timing function may impose a maximum limit of 10 mins, 30 minutes, or 60 minutes. If the user does not verify the proposed configuration within this interval, the pending configuration data is deleted and the next time the device 200-1-200-n is operated in a standard mode of operation, operative function(s) resume based on the existing non-updated configuration data stored in volatile memory (e.g., configuration data stored in 201B-5). It will be appreciated that the second timing function is optionally implemented but preferred in this embodiment.

Accordingly, logic flow 600 enables a user to reject a configuration update for one or more circuit protection device(s) 200-1-200-n by allowing the interval associated with the second timing function to expire. Alternatively, logic flow 600 enables a user to reject a configuration update by sending corresponding instruction(s) to the circuit protection device controller 201 via an input interface of the user device 302, or by providing a predetermined input indicative of rejection via a physical touch interface (e.g., 213) of the respective circuit protection device 200-1-200-n. A rejected configuration update prompts the controller 201 to maintain the existing configuration and to delete the configuration data associated with the proposed new configuration from the device memory 201B.

As shown in FIG. 12, at step 620-1, a user 301 can input data indicative of configuration request(s) or instruction(s) for one or more circuit protection device(s) 200-1-200n of the panel 100 via their user device 302. This may be in response to the user device 302 displaying configuration options for each device 200-1-200-n. The user can input configuration request(s) for a single, or for multiple, circuit protection device(s) 200-1-200-n of panel 100 during this stage, and the user device 302 is configured to receive data indicative of such request(s). The data may be selected based on predetermined templates displayed on the user device 302. Each configuration instruction may include data indicative of target operative function(s) for an associated device 200-1-200-n, and optionally operational parameters associated with that function (such a current limit in amperes) as described in relation to other embodiments of the circuit protection device 200. At step 620-2 the user 301 confirms the configuration request(s) or instruction(s) and the user device 302 receives an input indicative of this confirmation.

Upon receipt of the confirmation, the user device 302 transmits the one or more configuration instruction(s) corresponding to one or more of the device(s) 200-1-200-n to the controller 101 of the panel 100 at step 620-3. A single configuration instruction may correspond to multiple device(s) 200-1-200-n, or multiple instructions may be transmitted corresponding to the multiple device(s) 200-1-200-n at this stage. The controller 101 receives the configuration instruction(s) and accordingly transmits a configuration instruction to the controller 201 of each device 200-1-200-n, at step 620-4. This implementation is preferred as it reduces the complexity of the hardware and/or firmware associated with each circuit protection device 200-1-200-n. However, in other implementations, where direct communication can be established between the remote device 302 and the controller 201 of each device 200-1-200-n at stage 610, the relevant configuration instruction may be transmitted from the user device 302 directly to the controller 201 of each device 200-1-200-n at step 620-3, bypassing the controller 101 of panel 100.

Each configuration instruction or request received by the circuit protection device 200-1-200-n comprises configuration data indicative of the target operative function(s) to be loaded onto the device. Upon receipt of the configuration instruction or request, the controller 201 of each device 200-1-200-n caches this configuration data in an associated electronic storage (e.g., 201B), at step 620-5. This step is similar to step 300-1 of method 300, or step 350-1, 350-2 of method 350 and the description relating to those steps also applies to this step 620-5. Preferably the configuration data is initially temporarily stored in a memory location distinct from a target memory location, e.g., a temporary/volatile memory location of the electronic storage 201B (such as memory location 201B-2 of the controller 201 as shown in FIG. 5). The target memory location is the location accessible by the controller 201 to perform the one or more operative function(s) associated with the configuration data and is preferably a non-volatile memory location (such as memory location 201B-5, or memory location 201B-4 with a non-pending indicator set in 201B-3). Each device 200-1-200-n stores this updated configuration data in local memory 201B. However, in some embodiments, at step 620-5, the controller 101 may initially and temporarily store the configuration data for each update in electronic storage 101B associated therewith. This may be a temporary/volatile memory location of the electronic storage 101B.

At step 620-6, the controller 201 of each device 200-1-200-n to be updated/configured initiates the first timing function, which is configured to delete the cached configuration data if one or more operational condition(s) are not met within a predetermined time interval or threshold. This function enhances the safety of the configuration process by terminating the process if it remains idle for a predetermined period that may be deemed unsafe or undesirable for the intended function of each device 200-1-200-n. The first timing function is executable by the controller 201 of the respective device and is triggered based on the receipt and caching of configuration data at step 620-5. Alternatively, the first timing function may be executable by the controller 101. The controller 101 could be configured to trigger the timing function based on the receipt of configuration request(s) for one or multiple circuit protection device(s) 200-1-200-n from the user device 302, or otherwise based on receipt of signal(s) indicative of caching of configuration data for one or multiple circuit protection device(s) 200-1-200-n. In the latter case, such signal(s) may be transmitted from the circuit protection device(s) to the controller 101. The first timing function is configured to initiate a timer having a predetermined and prestored time limit, such as 10 mins, 30 mins or 60 mins. A separate timer is preferably initiated for each circuit protection device 200-1-200-n to be updated. However, it will be appreciated that a single timer may be initiated for multiple devices to be updated in alternative implementations. The controller 201 of each circuit protection device 200-1-200-n is configured to delete the cached configuration data at step 620-17, if the timer of the associated first timing function surpasses the predetermined and prestored time limit (e.g., 10, 30 or 60 mins), without one or more operational conditions or user actions being met. The operational condition(s) or actions preferably indicate that a user's intention to proceed with the configuration, and a transition into a verification stage of the process. They condition(s), or action(s) might include operating the respective device 200-1-200-n in a safe configuration state at step 620-11A/620-11B or providing a user input to indicate the intention to proceed with configuration. Such condition(s) or action(s) are described in relation to steps 300-2 and 300-3 of method 300, or 350-3 of method 350, for instance. Accordingly, the first timing function is configured to terminate the timer when one of these conditions is met. The first timing function may be implemented in digital or analogue circuitry, or a combination thereof.

When executing the timer of the first timing function, the controller 101 of the panel 100 transmits signal(s) or data indicative of successful caching of the configuration data for each device 200-1-200-n associated with the original configuration instruction(s), at step 620-7. The signal(s) or data indicative of successful caching may alternatively be sent by each of the circuit protection device(s) 200-1-200-n to be updated, after caching the corresponding configuration data. At this stage 620-7 the controller 101 may also change the function of one or more user input devices, such as for instance physical touch interface device 112, if such a device is configured to have one of multiple functions. For example, the interface device 112 could alternatively function as an input for enabling wireless connectivity to the communications interface 102 of the panel 100. This is described in more detail in relation to method 300 and particularly steps 300-2 and 300-3 which may form part of logic flow 600. It will be appreciated that this is optional, and in some implementations the user interface device 112 may have a single dedicated function or set of functions relating to the configuration process of logic flow 600 only.

The user device 302 is configured to send control signal(s) to an output display interface of the device 302, to display data to the user 301 instructing them on how to proceed with the configuration for each device 200-1-200-n. It will be appreciated that this stage is optional. The control signal(s) could activate the display interface to output one of multiple instructions, depending on the number of devices to be configured. For instance, where there are multiple devices to be configured, or more devices than a certain threshold (e.g., >3) the user device 302 is configured to display instructions for performing a simultaneous batch update of all devices 200-1-200-n (step 620-8A). On the other hand, when there is only one device, or when there are less devices than a certain threshold to be updated (e.g., ≤ 3), the user device 302 displays instructions for performing a selective update on each device 200-1-200-n (step 620-8B). Accordingly, the user device 302 may be configured to determine a number of devices to be configured and send control signals to the display based on the number. In alternative embodiments, the control signals generated and sent to the display are not dependent on the number of devices to be configured, or there may be additional display options based on the number of devices to be configured. The present disclosure is not intended to be limited to the examples provided herein. The display control signal(s) may also comprise warning or other critical messages to be conveyed to the user, such as a warning that the functionality of the circuit protection devices will be suspended if the user proceeds with the configuration.

The displayed instructions preferably prompt the user to operate each device to be configured in a state deemed to be safe for configuration (herein referred to as the "safe configuration state"). As mentioned, the instructions at step 620-8A may relate to the situation where the user is updating multiple devices simultaneously. In this situation, the displayed instructions could prompt the user to provide a predefined input via the physical touch interface of input device 112 of the panel 100 (such as pressing a button or pressing the button for a predefined duration). In response, a user 301 may activate the physical touch interface of user input device 112 in this manner at step 620-9A. Controller 101 may detect this input (for instance via a signal line 116 of the panel 100 as described in relation to FIG. 2). Alternatively, the controller 201 of each device 200-1-200-n may detect or receive data indicative of this input, for instance via signal line 116 shown in FIG. 2 and as described in relation to method 300.

Accordingly, each circuit protection device 200-1-200-n may then be operated in a safe configuration state, or one or more other predefined functions may be performed before the respective device 200-1-200-n can be operated in the safe configuration stage. The predefined functions include, for instance, opening the current flow interrupting device 111 to interrupt the delivery of primary power to the power input side 211 of each circuit protection device 200-1-200-n, as described in relation to 300-2 and 300-3 of method 300. In addition, at step 620-10A, each circuit protection device 200-1-200-n may detect the user input via device 112 (e.g., via signal line 116) and accordingly trigger the opening of the second flow interrupting device 209 of the respective device 200-1-200-n, as described in relation to step 300-4 of method 300.

Alternatively, at step 620-8B, the displayed instructions prompt the user to individually place each device 200-1-200-n to be configured into the safe configuration state, for instance, when configuration has been requested for only one or a few devices in the panel 100. In this situation, the displayed instructions could prompt the user to provide a predefined input via the physical touch interface 203 of each device 200-1-200-n to be configured (such as toggling the switch to an open position). In response, a user 301 may toggle/activate the physical touch interface 203 in this manner at step 620-9B, resulting in the opening of the current flow interrupting device 207 and the breaking of the current flow path from the mains/supply 110 to the power input side 211 of the device 200-1-200-n. At step 620-10B, the controller 201 detects this input and accordingly performs predefined functions for operating the circuit protection device 200-1-200-n in the safe configuration state, including sending a control signal to open the flow interrupting device/load control relay 209 of the device and terminate the standard operational functions of that device with respect to the connected load or other device/system 171-174.

In some cases, such as during an initial install of the panel 100, the device 111 may already be in an open state and the user may not be required to actuate the user input device 112. Alternatively, or in addition the device 207 of each circuit protection device 200-1-200-n being configured may already be in an open state, and the user may not be required to actuate the associated touch interface 203. Accordingly, stages 620-9A and 620-9B may alternatively involve a user 301 checking the operative state of the device 111 of panel 100 and/or of the device 207 of each circuit protection device 200-1-200-n being configured. Similarly, the current flow interrupting device 209 may already be in an open state for one or more circuit protection device(s) 200-1-200-n being configured, and one or both stages 620-10A, 620-10B may comprise the controller 201 of the respective device 200-1-200-n determining the operative state of the associated current flow interrupting device 209, and only changing the state to an open state when the current flow interrupting device 209 is in a closed state.

Stages 620-9A and 620-10A result in operation of each circuit protection device in a safe configuration state as indicated at stage 620-11A. The safe configuration state comprises a disconnection of primary power from the power input side 211 of the device **200-1-200-*n*. The safe configuration state may further comprise a substantially stable secondary (ELV) supply voltage 210**.

In some embodiments, at stage 620-11A, the controller 201 of each device **200-1-200-*n* may monitor for this state by determining if one or more operative conditions or criteria are indicative of the safe configuration state. Such conditions and/or criteria may comprise a disconnection of primary power from the power input side 211 of the device 200-1-200-*n*. The controller 201 of each device 200-1-200-*n* being configured may determine an indication of disconnection of the device from the primary power, based on a monitored electrical parameter indicative of input power being supplied or available at a power input side/connection 211. Accordingly, the controller 201 is preferably configured to determine, based on data or signal(s) indicative of one or more electrical parameters associated with the power input side/connection 211 if the electrical parameter(s) complies/comply with predetermined threshold criterion or criteria indicative of disconnection. The threshold criterion or criteria may be associated with a disconnected state between the power input side and the source of primary power. For example, the controller 201 may be configured to determine if a voltage at the input of the power input side 211 of each device 200-1-200-*n* to be configured, is at or below a predetermined threshold voltage amplitude indicative of disconnection of the primary power source (e.g., 12V maximum voltage amplitude). The amplitude may be indicative of the maximum amplitude of the secondary ELV supply voltage, for instance. The voltage parameter may be an average voltage, a maximum voltage, or any other voltage related parameter, for instance. It will be appreciated that other electrical parameters and associated threshold criterion/criteria may be utilised, and the present disclosure is not intended to be limited to these examples. These parameters or conditions may be monitored periodically after initiation of the timer of the timing function associated with step 620-6**.

Additionally, or alternatively, at stage 620-11A the controller 201 of each device being configured, may be configured to determine if the voltage at the input, or the voltage at the output of the ELV supply 210, or both, is/are substantially stable. The controller 201 may be configured to determine if the input or the output voltage, or both, is(are) substantially stable for a predetermined minimum duration (e.g., at least 2 seconds). Any suitable technique for determining voltage stability as is known in the art may be employed, such as comparing the voltage fluctuations against predetermined maximum fluctuation threshold(s) and determining if the fluctuations are within the threshold(s) or outside to indicate a stable ELV supply 210. These parameters or conditions may be monitored periodically after initiation of the timer of the timing function associated with step 620-6.

In other embodiments, the controller 201 does not monitor for a safe configuration state at step 620-11A.

Stages 620-9B and 620-10B also result in operation of each circuit protection device in a safe configuration state as indicated at stage 620-11B. In this case, the safe configuration state comprises a disconnection of the primary current flow path between the power input side 211 and the load side 212 of the device **200-1-200-*n*. The safe configuration state may further comprise a substantially stable secondary (ELV) supply voltage 210**.

At stage 620-11B, the controller 201 of each device **200-1-200-*n* may monitor for this state by determining if one or more operative conditions or criteria are indicative of the safe configuration state. The controller 201 of each device 200-1-200-*n* being configured may determine an indication of disconnection between the input and load sides, based on a monitored electrical parameter indicative of input power being supplied or available at the load side 212. Accordingly, the controller 201 is preferably configured to determine, based on data or signal(s) indicative of one or more electrical parameters associated with the load side 212 if the electrical parameter(s) complies/comply with predetermined threshold criterion or criteria indicative of disconnection. The threshold criterion or criteria may be associated with a disconnected state between the power input side 211 and the load side 212. For example, the controller 201 may be configured to determine if a voltage at the load side 212 of each device 200-1-200-*n* to be configured, is at or below a predetermined threshold voltage amplitude indicative of disconnection the input side 211 (e.g., 12V maximum voltage amplitude). The voltage parameter may be an average voltage, a maximum voltage, or any other voltage related parameter, for instance. It will be appreciated that other electrical parameters and associated threshold criterion/criteria may be utilised, and the present disclosure is not intended to be limited to these examples. These parameters or conditions may be monitored periodically after initiation of the timer of the timing function associated with step 620-6**.

The functions of determining operative condition(s) indicative of a safe configuration state at stages 620-11A, 620-11B may alternatively or cooperatively be performed by the controller 101 for one or more of the circuit protection device(s) **200-1-200-*n*** being configured.

The functions of opening the load control relay at stages 620-10A, 620-10B may alternatively be performed in response to detection of a safe configuration state at stages 620-11A, 620-11B.

Upon operating each device **200-1-200-*n* in the safe configuration state, or upon detection of an input via user input device 112, the timer of the first timing function relating to step 620-6 is preferably terminated by the respective controller 201, 101** controlling that function.

Following detection of a safe configuration state for each subcircuit protection device **200-1-200-*n* being configured, logic flow 600 follows a same or similar process for enabling a user to verify the configuration in relation to one or multiple circuit protection devices as steps 520-9-520-12 of logic flow 500. Accordingly, the features and implementation of these steps 520-9-520-12 also apply to synonymous steps 620-12-620-14 of the logic flow 600 embodiment and will not be described in detail again for the sake of brevity. Features that differ from steps 520-9-520-12 in steps 620-12-620-14** will also be described herein.

At step 620-12A, when each device **200-1-200-*n* enters the safe configuration state, or when a user input corresponding to stages 620-9A, 620-9B is detected for a respective device 200-1-200-*n*, the cached configuration data is written into a non-volatile memory location (such as memory location 201B-4 shown in FIG. 5). The configuration-status indicator is also set to a value indicating a pending status of the configuration data saved in memory location 201B-4. This is described in more detail with regards to the description relating to FIG. 5, and also in relation to step 300-5 of method 300**.

At step 620-12, the controller 201 of each circuit protection device **200-1-200-*n*** sends a control signal to the display interface 206 of the device 200-1-200-n, which comprises data indicative of the configuration data. The controller may retrieve this data 201 from the non-volatile memory location 201B-4 mentioned in relation to step 620-12A, and a control signal is generated and sent to the display interface based on the data. The control signal may activate the display interface 206 to display data indicative of operational functions and/or their respective parameters associated with the configuration. For example, an overcurrent fault detection function and/or an overcurrent threshold associated with that function may be displayed. In an alternative embodiment, or additionally, other embodiments, the controller 201 of each device 200-1-200-n may transmit control signals to display this data on an alternative display of the panel 100, such as display 109 for instance the power distribution panel 100 instead (or in addition).

In this embodiment, a second timing function is preferably initiated. The second timing function may be implemented to initiate based one or more of: operating each device being configured in the safe configuration state at stage 620-11A, 620-11B, or receiving user input(s) corresponding to stage(s) 620-9A, 620-9B, or writing the configuration data to memory 201B-4 as per stage 620-12A, or generation or transmission of the display control signal or activation of the display based on the control signal at step 620-12.

The controller 201 of each device 200-1-200-n to be updated/configured preferably initiates the second timing function. Upon reaching the predetermined time limit, the second timing function deletes or otherwise discards the configuration data written into the non-volatile memory 201B-4 at step 620-12A to restore or maintain the existing, non-updated configuration of the device, if one or more operational condition(s) are not met. This function enhances the safety of the configuration process by terminating the process if it remains idle for a predetermined period that may be deemed unsafe or undesirable for the intended function of each device 200-1-200-n. The second timing function is executable by the controller 201 of the respective device but may alternatively be executed by the controller 101. The operational condition(s) preferably indicate that a user has reviewed and verified the configuration data stored in memory 201B-4. The user may verify the data for a respective device by viewing it on the display interface 206 of the device 200-1-200-n, after step 620-12. Accordingly, the second timing function is configured to terminate the or each timer based on receipt or detection of a signal or data indicative of user-verification by the controller 201 of the respective device 200-1-200-n being configured (as per steps 620-13A/B, 620-14A/B). An indication of the, or each, running timer may also be displayed on the display interface 206 respective device being configured or on a display interface of the panel 100.

The second timing function is configured to initiate a timer having a predetermined and prestored time limit, such as 10 mins, 30 mins or 60 mins. A separate timer is preferably initiated for each circuit protection device 200-1-200-n to be updated. However, it will be appreciated that a single timer may be initiated for multiple devices being configured, in alternative implementations.

As per logic flow 500, a user 301 must be spatially located near panel 100 to view the displayed configuration information relating to each device 200-1-200-n being configured. Upon viewing this information, the user 301 (such as an electrician or other qualified operator) can make a choice on whether to verify or reject the proposed configuration for one or more of the device(s) 200-1-200-n being configured.

At step 620-13A, if the user 301 chooses to verify the configuration for one or multiple circuit protection devices 200-1-200-n they have the option to perform a batch verification for all devices 200-1-200-n being configured, or individual selective verification for one or more of the devices 200-1-200-n being configured.

For a batch verification, the user 301 operates or activates the physical touch interface of the user input device 112 in a predefined or predetermined manner at step 620-13A to reclose the flow interrupting device 111 of panel 100. For example, the user may press a physical touch interface of a user input device 112 to reclose the flow interrupting device and reinstate the delivery of primary power to the power input side 211 of each circuit protection device 200-1-200-n.

Alternatively, at step 620-13A, a user can selectively and individually verify the configuration of one or more circuit protection devices 200-1-200-n being configured by altering the operative state of the first current flow interrupting device 207 of each device into the closed state to reinstate the flow of current through the associated electrical current flow path. This can be done via a physical touch interface 203 as described in relation to step 620-9B for opening the device 207. In this manner, a user could verify the displayed configuration for some of the device(s) 200-1-200-n being configured and reject the displayed configuration for others.

At step 620-14A, in response to user-verification, the controller 201 configures each device 200-1-200-n by committing the configuration data stored in step 620-12A to the non-volatile memory such that it is used by the one or more operative function(s) of the device 200-1-200-n, when the device resumes the standard mode of operation.

Committing the configuration data to non-volatile memory may comprise updating the value of the configuration-status indicator of 201B-3 to indicate a non-pending or affirmed status, for instance. Alternatively, it may comprise writing over the previous configuration in memory location 201B-5, or changing a pointer address to point to memory location 201B-4. It will be appreciated that any method can be used to effectively commit and permanently store the configuration data of step 620-12A in the non-volatile memory 201B of the device 200-1-200-n. This is further described in relation to step 350-6 of method 350.

In response to user-verification, the second current flow interrupting device 209 of each device 200-1-200-n may be reclosed (if open). Closing the second flow interrupting device 209 preferably occurs after the configuration data is permanently stored/affirmed in memory 201B. The old configuration data stored in memory location 201B-5 is preferably also deleted at stage 620-14A.

The controller 201 of each device 200-1-200-n is preferably operable to identify one or more conditions or criteria indicative of a user-verification of the configuration data and accordingly may perform one of more of the abovementioned steps of stage 620-14A, including configuring the respective device 200-1-200-n accordingly. The one or more conditions or criteria may comprise, for instance, any one of the user input actuations described in relation to step 620-13A.

An indication of user-verification received or detectable by controller 201 of each device 200-1-200n comprises receipt of an input signal or data indicative of user input via the user input device 112 of the panel 100. This may be a signal or data receivable via signal line 116 for instance. In some embodiments, the input indicative of user verification may comprise a predetermined activation of the touch interface input device 112, such as a long press exceeding a predetermined period or other activation type or pattern.

Another indication of user verification detectable by controller 201 may be associated with an electrical parameter indicative of input power being supplied or available at a power input side/connection 211 of the circuit protection device 200-1-200-n. Accordingly, the controller 201 may be configured to determine if an electrical parameter(s) at a power input side/connection 211 of the device 200-1-200-n complies/comply with predetermined threshold criterion or criteria associated with the parameter indicative of user-verification at step 620-14A. The threshold criterion or criteria may be determined based on a sufficient/expected level or amplitude of the electrical parameter required to supply power to a particular load associated with the device 200-1-200-n. For example, the controller 201 is configured to detect a signal indicative of a voltage at the input of the power input side 211. The controller 201 is further configured to determine if a voltage is at or exceeds a predetermined threshold voltage amplitude indicative of a connected mains supply input (e.g., 240V maximum voltage amplitude to be delivered from the power source connected to the panel 100 to the associated load). The voltage parameter may be an average voltage, a maximum voltage, or any other voltage related parameter, for instance. It will be appreciated that other electrical parameters and associated threshold criterion/criteria may be utilised, and the present disclosure is not intended to be limited to these examples.

Any combination of one or more of the above user-verification conditions may be combined by controller 201 to detect a user-verification.

The controller 201 of each device 200-1-200-n being configured may identify or determine one or more other operative conditions or criteria (other than the user verification) before configuring the respective device and committing the configuration data to permanent storage.

For instance, the controller 201 may be further configured to perform an algorithmic (e.g., checksum) verification process on the configuration data and to accept the verification update only if the algorithmic verification process is successful. This may alternatively be performed by the controller 101, or the remote user device 302, and the controller 201 may be configured to receive an indication of a successful algorithmic verification prior to executing the configuration update. This algorithmic verification is distinct from the user verification mentioned above. An algorithmic verification verifies that the data sent from the remote device 302 and received by the controller 201 is the same, whereas the user-verification verifies that the configuration data that will be committed to the device has been reviewed and verified by a human user. The latter adding a level of security to the process that further limits the potential for hacking and other types of cyber-attacks.

During the check for conditions/criteria required for configuration (including user-verification and/or algorithmic verification conditions/criteria), the controller 201 of each device 200-1-200-n may be configured to transmit one or more control signals to the display 206 and/or other visual interface device(s) 205 of the circuit protection device 200-1-200-n (or of the power distribution panel 100) to indicate that the controller 201 is in a pending configuration check stage or similar.

During this period (e.g., at stage 620-14A) the controller 201 of each device 200-1-200-n may be configured to transmit one or more control signals to the display 206 and/or other visual interface device(s) 205 of the circuit protection device 200 (or of the power distribution panel 100) to indicate that the controller 201 is in a pending configuration stage or similar.

Upon or shortly after updating the configuration data in the appropriate memory location and closing the second flow interrupting device 209 for each device 200-1-200-n (if open), the configuration process may terminates and each circuit protection device 200-1-200n can resume full operation of the one or more operational function(s) based on the new configuration data (provided when the flow interrupting device 111 is also closed). In response, the display 206 of each device 200-1-200-n can also be driven by the controller to display a complete configuration signal, and/or the indicators may be driven to indicate a fully operative mode of operation by controller 201 as indicated for step 620-14A.

In the case where a load side connection 212 of a circuit protection device 200-1-200-n of the panel has not been properly terminated, such as during initial installation, it may not be desirable to reinstate power at the power input side of the sub-circuit. In this case, another physical touch user interface mounted on the circuit protection device 200-1-200-n, such as input 213 may be actuated by the user at step 620-13B to verify the configuration for a respective circuit protection device 200-1-200-n. In response, the controller 201 detects the input by the user via interface 213 and accordingly configures the device by storing the configuration data in permanent storage/affirming the data in memory 201B as described in step 620-14A. In response, the display 206 may also be driven (and/or the indicators may be driven) to display or indicate an "idle" state of the device 200-1-200-n. In this situation, since it is not safe to liven the circuit, the flow interrupting device 209 of the circuit protection device 200-1-200-n is not automatically reclosed in response to the user-verification.

After committing the new configuration data to non-volatile memory, the configuration process may terminate and in response, at stage 620-15, controller 101 may change the function associated with touch interface 112 by updating a value of the configuration-related indicator in memory 101B-1 (such as reverting back to a wireless communication activation function) as described in relation to method 300 and FIG. 2.

In response to the display of configuration data at stage 620-12, a user 301 may alternatively choose to reject the configuration for one or more circuit protection device(s) 200-1-200-n being configured. At step 620-16 a user can reject the configuration for one or multiple device(s) 200-1-200-n by waiting for the timer of the second timing function to reach the predefined time-limit. Accordingly, the one or more conditions or criteria indicative of user-verification of the configuration data may also be associated with the time period threshold of the timer of the second timing function. In other words, the controller 201 applies the configuration if a user verification via physical touch (as explained in relation to steps 620-13A, 620-13B) is determined within the threshold time period of the second timing function. The time-period threshold period of time may be predetermined and stored in electronic storage associated with controller 201 or controller 101.

Alternatively, at step 620-16 a user may actively reject the configuration using a device interface, such as an interface of the user device 302, an interface of the circuit protection device 200-1-200-n, or an interface of the panel 100. Accordingly at step 620-16 the user device 302 may present the user with an option to reject a configuration update for one or more circuit protection devices. Upon selecting the option for one or more devices 200-1-200-n, one or more signals are transmitted from the user device 302 to the controller 101 which relays the request to the controller 201 of each of the device(s) 200-1-200-n associated with the cancellation request. Alternatively, the user device 302 may send signal(s) indicative of the cancellation request(s) directly to the controller 201 of each device 200-1-200-*n* associated with the cancellation request(s). Alternatively, the user device 302 may be configured to display instructions for rejecting a configuration via an interface of the circuit protection device 200-1-200-*n*. For example, a user may activate a user input 213 at this stage 620-16, and the circuit protection device 200-1-200-*n* may be configured to detect the input, and accordingly cancel the requested configuration update.

Upon receiving a signal indicative of a cancellation request from the user, or upon expiration of the timer of the second timing function without user-verification, the controller 201 of each respective device 200-1-200-*n* deletes the configuration data from memory 201B-4 at step 620-17. The controller 201 also sends a control signal to trigger the second flow interrupting device 209 into the closed state (if opened). The display interface 206 may also be driven to display the current, non-updated configuration data (which can be obtained by the controller 201 from the associated non-volatile memory location 201B-5). The current configuration settings may be transmitted back to the user device 302 via the systems controller 101 at step 620-18 and the confirmed configuration reset may be displayed on the user device 302 for the user at step 520-19.

The user may then decide to terminate the configuration process or enter a new configuration stage for one or more of the circuit protection device(s) 200-1-200-*n* back at step 620-1.

It will be appreciated that in some embodiments, one or more of the steps performed by controller 201 of each device 200-1-200-*n* may alternatively or cooperatively be performed by the controller 101 of the power distribution panel 100.

Figure 13:
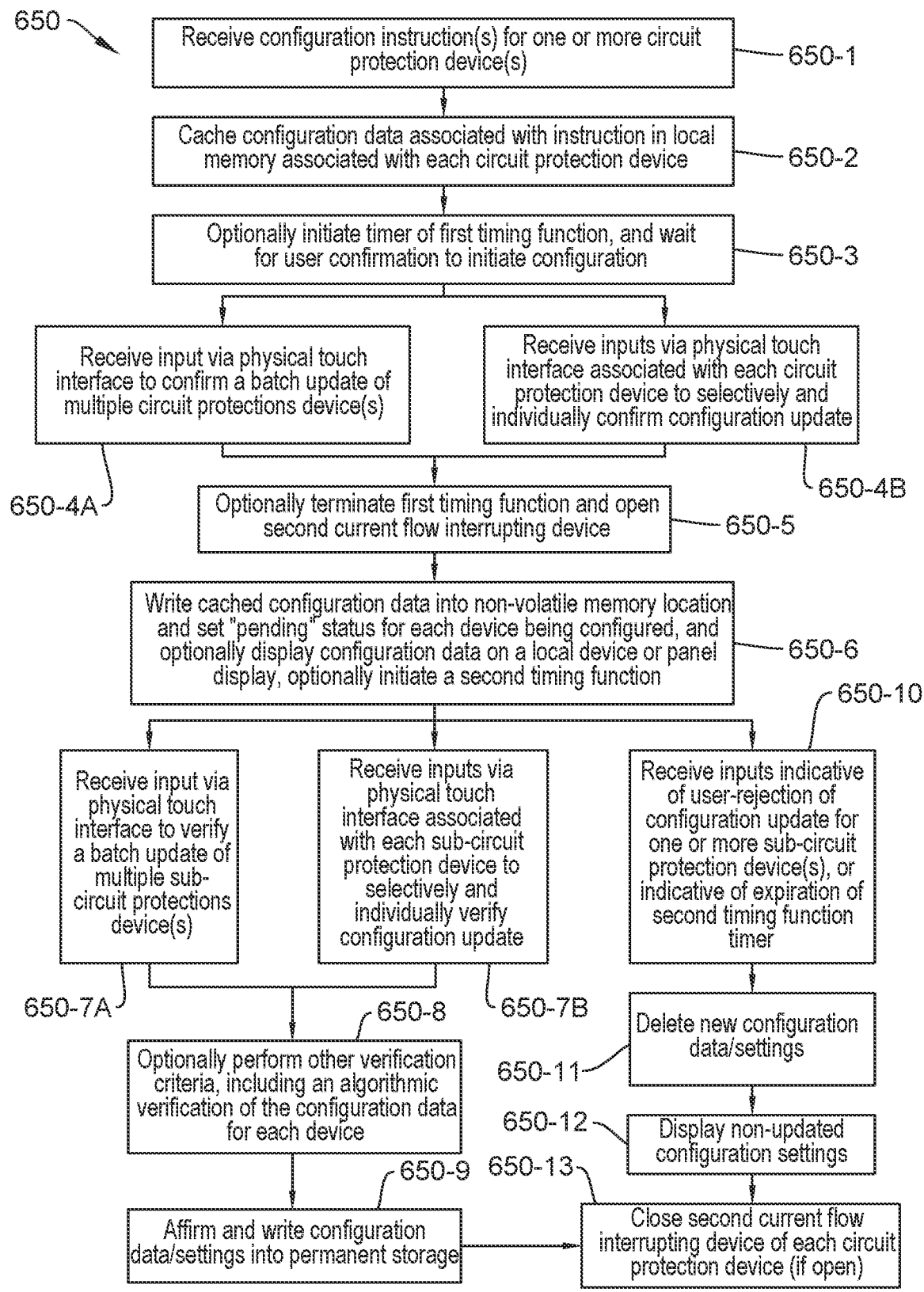
FIG. 13 is a flow diagram depicting a method for updating a configuration of one or more circuit protection device(s) in accordance with an exemplary embodiment of the present disclosure.

Referring now to FIG. 13, an exemplary embodiment of a computer implemented method 650 for configuring the operation of one or multiple circuit protection device(s) 200-1-200-*n* in accordance with at least some of the stages of logic flow 600 is shown. The method 650 may optionally be used to perform an update on a single device 200, or a batch update of multiple circuit protection devices 200-1-200-*n* of a power distribution panel 100.

In a first implementation of method 650, the controller 201 of each circuit protection device 200-1-200-*n* being configured, is operable to perform steps 650-1 to 650-13 of method 650. In a second implementation, the controller 101 of the power distribution panel 100 comprising the circuit protection device(s) 200-1-200-*n* installed therein, may be configured or is operable to perform the steps 650-1 to 650-13 of method 650. In a third implementation, the controller 201 of each circuit protection device 200-1-200-*n* and the controller 101 of the power distribution panel 100 are configured and cooperatively operable to implement and perform the steps 650-1 to 650-13 of method 650. Accordingly, the following steps of method 650 may be performed by any combination of one or more processing device(s) 201A, 101A and one or more electronic storage medium or media 201B, 101B, associated with each circuit protection device 200-1-200-*n* and/or the panel 100. A system comprising the circuit protection device(s) 200-1-200-*n* also may be operable to perform steps 650-1-650-13 of method 650.

At step 650-1, to initiate configuration, one or more configuration request(s) or instruction(s) is(are) received comprising configuration data for updating the configuration of one or more circuit protection device(s) 200-1-200-*n*, as described with reference to step 620-4 of logic flow 600. In the case where the configuration is for multiple devices 200-1-200-*n*, a single instruction comprising configuration data for multiple device(s) 200-1-200-*n* could be received at this stage, for example by controller 101 of the panel 100. Alternatively, at step 650-1, the controller may receive multiple configuration instructions corresponding to the multiple circuit protection device(s) 200-1-200-*n*. In either implementation, the controller 101 processes the configuration instruction(s) and then sends separate instructions to the controller 201 of each of the devices 200-1-200-*n* being configured. At step 650-2, the configuration data of each configuration request or instruction is cached/temporarily stored in an electronic storage medium or media (e.g., memory 201B-2), and preferably a volatile/temporary electronic storage location, e.g., volatile memory in 201B-2, for each circuit protection device 200-1 200-*n* as per step 520-5 of logic flow 500.

In response to caching the configuration data, a first timing function may be initiated as described in relation to the first timing function of logic flow 600. At this stage 650-3, the controller 201 of each device 200-1-200-*n* awaits a user input confirming initiation of configuration, as described in relation to method 300. The configuration initiation process may comprise operating each device 200-1-200-*n* being configured in a safe configuration state as described in relation to logic flow 600. However, in some implementations, each device 200-1-200-*n* need not be operated in a safe configuration state, but a user input to initiate configuration is still required as described in relation to method 300.

A function of the user input device 112 may be updated by controller 101 as described in relation to step 300-2 of method 300. A signal indicative of confirmation of the caching of configuration data may also be transmitted from each circuit protection device being configured to the controller 101, at step 650-3. Received confirmation(s) may also be relayed by the controller 101 to the remote user device (e.g., 302). Alternatively, one or more circuit protection device(s) being configured transmit the signal indicative of confirmation directly to the user device 302.

At step 650-4A, an input signal may be received or detected indicative of a user's activation of a physical touch interface mounted on panel 100, for example via user input device 112 as described in relation to method 300 to confirm the user's intention to configure one or more device(s) 200-1-200-*n*. In response to receipt or detection of this signal (e.g., the signal in line 116), the current flow interrupting device(s) 111 of panel 100 is driven into an open state to isolate the power input side 211 of each circuit protection device being configured from the supply primary power, responsible for delivering current to the circuit(s)/loads connected to protection device(s) 200-1-200-*n*. Alternatively, at step 650-4B, an input may be received for each circuit protection device via a physical touch interface of the input device 203, to trigger the current flow interrupting device 207 of the device 200-1-200-*n* into an open state and terminate the electrical connection between the power input side 211 and the load side 212 of the circuit protection device 200-1-200-*n*.

In response to either one of steps 650-4A or 650-4B, one or more control signals is(are) transmitted to open the current flow interrupting device 209 of each of the circuit protection device(s) being configured (step 650-5). A safe configuration state may be determined or detected at this stage 650-4 as explained in relation to steps 620-11A or 620-11B of logic flow 600. The first timing function, which may have been initiated at stage 650-3 is preferably terminated in response to detection of a user's intention to configure the device(s) 200-1-200-n.

At step 650-6, in response to detection or receipt of the user's intention to configure the device(s) 200-1-200-n, and/or in response to operating each device in the safe configuration state, the cached configuration data is written into a non-volatile memory location (e.g., 201B-4) of the device 200 and a value of a configuration-status indicator associated with the new configuration data is set to indicate a "pending status". One or more display signals may be transmitted to a display interface mounted on each circuit protection device 200-1-200-n (or alternatively mounted on the panel 100) based on the new configuration data in the non-volatile memory location, to display data indicative of this configuration data for each device being configured that is in the safe configuration state. A second timing function as explained in relation to logic flow 600 may also be initiated at this stage 650-6. In some implementations, the cached data may remain in volatile memory at this stage and is not written into the non-volatile memory location 201B-4. Subsequent steps or stages, such as displaying the data in stage 650-6 or writing the data to permanent storage in 650-9 may retrieve the new configuration data from the volatile memory location 201B-2 instead in such an implementation.

At this point, a user 301 has the option to verify and execute a batch configuration update for multiple circuit protection device(s), selectively verify and execute a configuration update for one circuit protection device, or reject the configuration update for one or more circuit protection device(s) (as described in relation to stages 620-13A, 620-13B and 620-16 of logic flow 600 and/or as described in relation to steps 350-5-350-7 of method 350). Accordingly, at step 650-7A or 650-7B one or more user verification(s) of the configuration data is(are) received or detected as described in relation to step 620-14A/620-14B of logic flow 600. The user-verification detected or received is preferably based on a physical user input indicating the user's spatial location being proximal to the circuit protection devices 200-1-200-n being configured.

At stage 650-7A, an input signal may be received corresponding to a user input via the physical touch interface of user input device 112, that is indicative of a user's verification for all circuit protection device(s) being configured. Alternatively, at stage 650-7B, an input via the physical touch interface of user input device 203 is received or detected and closes the current flow interrupting device 207 for one or more circuit protection device(s) to indicate a selective user-verification. In yet another alternative, at stage 650-7B an input signal may be received corresponding to a user input via the physical touch interface of user input device 213, that is indicative of a user's verification of the associated circuit protection devices 200-1-200-n being configured.

At step 650-8, one or more other verification criteria may be performed, such as performing an algorithmic verification check as described in relation to method 600.

At step 650-9, in response to detecting user verification for one or more of the circuit protection device(s) 200-1-200-n, the pending configuration data (at 201B-4) may be affirmed and permanently stored in the non-volatile memory. As mentioned in relation to other embodiments, this preferably comprises updating the "pending" status of the configuration status indicator to indicate a non-pending or affirmed/verified status. Alternatively, or in addition writing the new configuration data to permanent storage may mean overwriting the existing configuration data stored in non-volatile/permanent memory (201B-5). In response a signal may be sent to the display 206 of the respective device to indicate that the new configuration data has been affirmed/verified. After storing the new configuration data, at step 650-13, a control signal is sent to the current flow interrupting device 209 to reclose the device. This is described in further detail in relation to step 620-14A. The configuration process is terminated thereafter for the affirmed device(s) 200-1-200-n.

A user may reject the configuration for one or more circuit protection device(s) 200-1-200-n at step 650-10. At this step, one or more inputs indicative of a user's rejection may be received, including for instance, a signal transmitted from the user's device 302 or an predetermined input received via the interface 213 of the circuit protection device 200-1-200-n. Alternatively, the user may wait for the second timing function to reach a predetermined limit, after which all device(s), the configuration process is terminated for all circuit protection device(s) 200-1-200-n. The method 600, at step 650-11, comprises deleting the configuration data stored in non-volatile memory 201B-3 for a circuit protection device 200-1-200-n in response to receipt or detection of a user's rejection of the configuration. Further, the display 206 is driven to display data indicative of the non-updated configuration at step 650-12. At step 650-13, a control signal is sent to close the current flow interrupting device 209 and the configuration process is terminated thereafter for the rejected device(s) 200-1-200-n.

Referring to FIG. 14, an embodiment of a storage medium 700 is shown, comprising an article of manufacture. In some examples, the storage medium 700 may include any non-transitory computer readable medium or machine readable medium, such as an optical, magnetic or semiconductor storage. Examples of a computer readable or machine-readable storage medium may include any tangible media capable of storing electronic data, including volatile memory or non-volatile memory, removable or non-removable memory, erasable or non-erasable memory, writeable, or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

The storage medium 700 may store various types of processor executable instructions 710 and can be coupled to processor(s) described herein (e.g., processor(s) 101A and 201A.) while such processor(s) can be arranged to execute the instructions 710. Thus, the storage medium may store various types of computer executable instructions to implement at least one of the methods 300, 310, 350, 550, 560, 650 and/or at least one of the corresponding logic flows 400, 500, 600.

Although the methods 300, 310, 350, 400, 500, 550, 560, 600 650 have been described with reference to configuring the operation of a circuit protection device or one or more circuit protection device(s) of a panel, it will be appreciated that the methods can also be implemented to configure the operative functions of the power distribution panel 100, such as any operative function(s) to be performed by the controller 101 or associated circuitry. Accordingly, the methods described herein are not intended to be limited to implementation for updating the configuration of operative functions of circuit protection device(s) but also to power distribution panels and systems. Modifications to suit such an application would be apparent to the skilled person and are intended to be included within the scope of the present disclosure as defined by the accompanying claims.

Advantages

Embodiments described herein enable in-field configuration of a power distribution panel, and of one or multiple circuit protection device(s) 200-1-200-n. This mitigates the need to physically replace hardware in a power distribution panel to change the load monitoring and control functionality associated with a connected circuit for instance, which can be costly and time consuming. In addition, as is apparent from the description, some of the embodiments presented herein enable the batch configuration of multiple circuit protection device(s) substantially simultaneously. This further reduces the complexity and cost associated with changing load monitoring and control functionality in relation to multiple circuits connected to a power distribution panel, for instance.

The embodiments described herein require a user's physical presence at the power distribution panel 100 during at least one of two stages of the configuration process, but preferably both, to configure one or more multiple device(s). The first is during a "configuration initiation" stage where a user confirms their intention to configure the device, and the second is during a "user-verification" stage where a user confirms the new configuration data being uploaded or written to each device. This requirement of physical user presence is preferably achieved by providing at least one user input having a physical touch interface mounted on/in each circuit protection device and/or mounted on/in the power distribution panel, such that a user is required to be spatially located in the presence of the power distribution panel to carry out the in-field configuration process. This enhances safety and security as it necessitates a physical confirmation of initiation and/or a physical verification of configuration data by the user when they are near the device(s) and panel, mitigating or alleviating the potential technical risks of remote hacking and malicious reconfiguration. The configuration methods described herein also embed the function of the user triggering the process also the communication-enabled device(s) and maliciously reconfiguring them in an undesirable or hazardous manner. The "configuration-initiation" and/or "user-verification" stage(s) is(are) also embedded within the configuration process. Thich helps mitigate the potential requirement for remote disconnection and reconnection of the device-thus reducing the risk of remote hacking. The approach enhances safety, simplifies the technical implementation, and lowers security risks. which requires disconnection and reconnection of the circuit protection device for safety, both requiring a user presence to mitigate the need for remote disconnection and reconnection of the device which may be another source of remote hacking. This improves safety, simplifies the technical implementation, and reduces security risks.

Embodiments described herein may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

In the foregoing, a storage medium may represent one or more devices for storing data, including read-only memory (ROM), random access memory (RAM), magnetic disk storage mediums, optical storage mediums, flash memory devices and/or other machine-readable mediums for storing information. The terms "machine readable medium" and "computer readable medium" include but are not limited to portable or fixed storage devices, optical storage devices, and/or various other mediums capable of storing, containing, or carrying instruction(s) and/or data.

The various illustrative logical blocks, modules, circuits, elements, and/or components described in connection with the examples disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general-purpose processor may be a microprocessor, but in the alternative, the processor may be any conventional processor, controller, microcontroller, circuit, and/or state machine. A processor may also be implemented as a combination of computing components, e.g., a combination of a DSP and a microprocessor, a number of microprocessors, one or more microprocessors in conjunction with a DSP core, or any other such configuration.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

One or more of the components and functions illustrated in the figures may be rearranged and/or combined into a single component or embodied in several components without departing from the present disclosure. Additional elements or components may also be added without departing from the present disclosure. Additionally, the features described herein may be implemented in software, hardware, and/or combination thereof.

In its various aspects, the present disclosure can be embodied in a computer-implemented process, a machine (such as an electronic device, or a general-purpose computer or other device that provides a platform on which computer programs can be executed), processes performed by these machines, or an article of manufacture. Such articles can include a computer program product or digital information product in which a computer readable storage medium containing computer program instructions or computer readable data stored thereon, and processes and machines that create and use these articles of manufacture.

While circuit protection devices, power distribution panels and systems, and a method for configuring or operating the same have been described with reference to certain embodiments, it will be understood by those skilled in the art that various changes may be made, and equivalents may be substituted without departing from the spirit and scope of the claims of the application. Other modifications may be made to adapt a particular situation or material to the teachings disclosed above without departing from the scope of the claims. Therefore, the claims should not be construed as being limited to any one of the particular embodiments disclosed, but to any embodiments that fall within the scope of the claims.

Furthermore, exemplary aspects of the present disclosure and embodiments are also provided in the Summary of Present disclosure section of the specification to more fully describe the embodiments of the present disclosure.

Illustrative, non-exclusive examples of inventive subject matter according to the present disclosure are provided in the following paragraphs:

In a first general aspect, the present disclosure may broadly be said to consist of a method for configuring operation of a circuit protection device, the method comprising:
  receiving a configuration instruction to configure one or more operational function(s) of the circuit protection device, the configuration instruction having associated therewith configuration data;
  receiving or detecting an indication of a user-verification of the configuration data to configure the device based on the configuration data.

Implementations of the above method may include one or more of the following steps or features.

The method may further comprise writing the configuration data into electronic memory and affirming a status of configuration data as permanent based on the received or detected user-verification.

Affirming the status of the configuration data as permanent may comprise overwriting existing configuration data with the new configuration data.

Affirming the status of the configuration data as permanent may comprise changing a status indicator associated with the configuration data.

The indication of user-verification may comprise an indication of a user's spatial presence adjacent or proximal to the circuit protection device.

The step of receiving or detecting the indication of user-verification may occur when a current flow to a load side connection of the circuit protection device is reinstated.

The step of receiving or detecting the indication of user-verification may occur when a secondary supply voltage to a controller of the circuit protection device is uninterrupted.

Receiving or detecting the user-verification comprises receiving or detecting a user input or an indication of the user input, such as data or signals indicative of the user input.

Receiving or detecting the indication of the user input may comprise detecting a closed state of a current flow interrupting device.

The user input may correspond to an input via a physical touch interface spatially located at or proximal to the circuit protection device.

Receiving or detecting the user-verification may comprise receiving or detecting one or multiple user inputs or an indication of one or multiple user inputs, such as data or signals indicative of one of the multiple user inputs. The multiple user inputs may correspond to multiple physical touch interface of the circuit protection device and/or of the panel. At least one of the multiple user inputs may disconnect a load side connection from a power input side connection of the circuit protection device.

The circuit protection device may comprise the physical touch interface.

The circuit protection device may be installed in a power distribution panel comprising the physical touch interface.

The user-input may reconnect a load side connection of the circuit protection device to a power input side connection, and the step of receiving or detecting the indication of the user-verification may comprise detecting the reconnection.

Receiving or detecting the user-verification may comprise detecting alteration of an electrical current flow path of the circuit protection device from an open-circuit state, where electrical current through the flow path is interrupted, to a closed-circuit state, where electrical current through the electrical current flow path is permitted.

The electrical current flow path may be configured to deliver electrical power to the load connection of the circuit protection device that is configured to electrically connect the circuit protection device to a load, in situ.

The indication of user-verification may be based on closing a current flow interrupting device associated with an electrical current flow path required to perform the one or more operational function(s), wherein closing the first current flow path corresponds to a closed-circuit state of the electrical current flow path.

The circuit protection device comprises the current flow interrupting device.

The method may further comprise temporarily storing the configuration data in volatile memory of an electronic storage medium or media of the circuit protection device after receiving the configuration instruction(s).

The method may further comprise after receiving the configuration instructions, receiving or detecting an indication of a user input. The user input may be via a physical touch interface.

Receiving or detecting the indication of the user input may comprise receiving or detecting data or signal(s) indicative of the user input. The data or signal(s) may only be received or detected when a separate input data or signal indicative of a configuration related status is received or detected.

The method may further comprise opening a current flow interrupting device of the circuit protection device in response to the user input. The current flow interrupting device may only be opened based on the user input when a separate input data or signal indicative of a configuration related status is received or detected.

Receiving or detecting the indication of the user input may comprise receiving or detecting an indication of the open state of the current flow interrupting device in response to the user input.

The method may further comprise generating the separate input data or signal indicative of the configuration related status after receiving the configuration instruction(s).

The method may further comprise writing the configuration data to non-volatile memory of an electronic storage medium or media of the circuit protection device based on the indication of the user input.

The method may further comprise associating a pending status to the written configuration data in the electronic storage medium. Configuring the circuit protection device based on the configuration data may comprise disassociating the pending status with the written configuration data.

The method may further comprise transmitting a control signal to open a second current flow interrupting device of the circuit protection device based on the indication of the user input.

The method may further comprise, prior to receiving the configuration instruction(s), transmitting data or signal(s) indicative of existing configuration data stored in non-volatile memory of an electronic storage medium of the circuit protection device.

The received configuration instruction may be transmitted from a device remote to the circuit protection device.

The method may further comprise, prior to configuring the circuit protection devices based on the configuration data, operating the circuit protection device in a safe configuration state.

The method may further comprise prior to receiving or detecting the user-verification, operating the circuit protection device in the safe configuration state.

The method may further comprise receiving or detecting an indication of the safe configuration state of the circuit protection device.

The safe configuration state may comprise a disconnection of a load connection of the circuit protection device from a power supply input or source.

The safe configuration state may comprise a stable supply of low-voltage power to the circuit protection device.

The method may further comprise transmitting a control signal to alter a state of the second current flow interrupting device of the circuit protection device from a closed state into the open state.

The control signal may be transmitted upon or after receiving the configuration instruction.

The control signal may be transmitted based on receipt or detection of an indication of disconnection of a load connection of the circuit protection device from a power supply input or source.

The control signal may be transmitted based on receipt of the configuration instruction.

The second current flow interrupting device may be electrically coupled to a phase line of the electrical current flow path.

The method further comprising, transmitting a control signal to alter the state of the second flow interrupting device into a closed state upon or after receiving or detecting the indication of user-verification of the configuration data.

The step of transmitting the control signal to alter the state of the second flow interrupting device into the closed state may be based on indication of user-verification of the configuration data.

The step of transmitting the control signal to alter the state of the second flow interrupting device into the closed state may occur upon or after affirming the status of the configuration data as permanent.

The step of transmitting the control signal to alter the state of the second flow interrupting device into the closed state may occur in response to configuring the circuit protection device based on the configuration data.

The method may further comprise transmitting a display signal to an electronic display for driving the electronic display to output a visual indication of the configuration instruction prior to receiving or detecting the indication of user-verification.

The display signal may be transmitted after receiving the configuration instruction.

The display signal may be transmitted based on receipt of the configuration instruction.

The display signal may be transmitted based on receipt or detection of an open-circuit state of an electrical current flow path required to perform the one or more operational function(s).

The display signal may be transmitted based on receipt or detection of an indication of a user input.

The display signal may be transmitted based on receipt or detection of disconnection of a load connection of the circuit protection device from a power supply input or source.

The display signal may be transmitted based on the configuration data stored in the non-volatile memory of the electronic storage medium or media.

The visual indication of the configuration instruction may comprise an indication of the configuration data.

The display signal may be transmitted prior to receiving or detecting the indication of user-verification of the configuration data.

The circuit protection device may comprise the electronic display.

The circuit protection device may be installed in a power distribution panel comprising the electronic display.

The electronic display may comprise an interface configured to display alphanumeric characters and/or symbols.

The electronic display may comprise a bistable display.

The electronic display may comprise an electronic ink display.

The configuration instruction may comprise an instruction signal comprising the configuration data.

The configuration instruction may comprise an instruction signal received via a communications interface of the circuit protection device or of a power distribution panel comprising the circuit protection device.

The communications interface may comprise a wireless communications interface for wirelessly communicating with a remote device.

The indication of user-verification may be associated with one or more user-verification criteria.

The one or more user-verification criteria may comprise if the indication of user verification is received or detected within a predetermined verification time period.

The time period may be initiated after receiving the configuration instruction.

The time period may be initiated upon or after operating the circuit protection device in a safe configuration state, or upon detecting the safe configuration state.

The verification time period may be initiated after transmitting a display signal to an electronic display indicative of the configuration data.

The one or more verification criteria may comprise if the receipt or detection of the indication of user-verification occurs prior to receipt of a signal indicative of rejection of the configuration instruction.

The signal indicative of rejection may comprise another configuration related instruction.

The method may further comprise operating the circuit protection device to perform the one or more operational function(s) based on a non-updated configuration data if indication of user-verification is not received or detected in accordance with the one or more verification criteria.

The method may further comprise transmitting a display signal to an electronic display for causing the electronic display to output a visual indication of the non-updated configuration data if indication of user-verification is not received or detected in accordance with the one or more verification criteria.

The method may further comprise transmitting data indicative of the non-updated configuration if the indication of user-verification is not received or detected in accordance with the one or more verification criteria.

The method may further comprise performing one or more successful algorithmic verifications on the configuration data before configuring the circuit protection device based on the configuration data.

The configuration data may comprise parameters or settings associated with one or more fault detection and/or fault interruption function(s) associated with the circuit protection device.

The configuration data may be associated with an overcurrent protection function in which the circuit protection device is configured to interrupt a flow of current to a load electrically coupled to the circuit protection device when an overcurrent condition in the load is exhibited, in situ.

The configuration data may comprise an indication of an enabled overcurrent protection function, an indication of overcurrent parameter threshold(s) and/or instructions for detecting the overcurrent condition.

The configuration data may be associated with a residual current protection function in which the circuit protection device is configured to detect a leakage current between phase and ground of a load electrically coupled to the circuit protection device and interrupt a flow of current to the load upon detection of the leakage current, in situ.

The configuration data may comprise an indication of an enabled residual current protection function, an indication of a leakage current parameter threshold(s) and/or instructions for detecting the leakage current condition.

The configuration data may be associated with an arc fault protection function in which the circuit protection device is configured to detect an arc fault in a load electrically coupled to the circuit protection device and interrupt a flow of current to the load upon detection of the arc fault condition, in situ.

The configuration data may comprise an indication of an enabled arc fault protection function, an indication of an arc fault parameter threshold(s) and/or instructions for detecting the arc fault condition.

The electrical current flow path may be configured to enable flow of electrical current to a load associated with the circuit protection device, in situ.

The circuit protection device may be installed in a power distribution panel.

In a second general aspect, the present disclosure may broadly be said to consist of configuring operation of at least one circuit protection device of a power distribution panel, the method comprising:
receiving configuration instruction(s) to configure one or more operational function(s) of each circuit protection device, the configuration instruction(s) having associated therewith configuration data for each circuit protection device; and
receiving or detecting an indication of a user-verification of the configuration data for one or more of the circuit protection device(s) to configure the respective circuit protection device(s) based on the corresponding configuration data.

The method may comprise one or more features of the first mentioned general aspect of a method for configuring a circuit protection device and any of its possible implementations. Implementations of the method of the second general aspect may alternatively or additionally include one or more of the following features.

Configuring the respective circuit protection device(s) based on the corresponding configuration data may comprise writing the configuration data into electronic memory and affirming a status of configuration data as permanent based on the received or detected user-verification.

Affirming the status of the configuration data as permanent may comprise writing the data to a memory location comprising existing configuration data.

Affirming the status of the configuration data as permanent may comprise changing a pending status indicator associated with the configuration data.

The indication of user-verification may comprise an indication of a user's spatial presence adjacent or proximal to the power distribution panel.

Each circuit protection device may be configured based on the configuration data of the associated received configuration instruction(s).

The method may further comprise operating each circuit protection device to perform one or more operational function(s) based on the configuration data after configuring the circuit protection device.

Receiving or detecting the user-verification comprises receiving or detecting a user input or an indication of the user input, such as data or signals indicative of the user input.

Receiving or detecting the indication of the user input may comprise detecting a closed state of a current flow interrupting device.

The user input may correspond to an input via a physical touch interface spatially located at or proximal to the circuit protection device or the power distribution panel.

The power distribution panel may comprise the physical touch interface. Alternatively, a respective circuit protection device may comprise the physical touch interface.

A single indication of a user-verification may be received or detected for multiple circuit protection device(s) to simultaneously configure the circuit protection device(s) based on the user verification. Receiving or detecting the user-verification may comprise receiving or detecting a single user input or an indication of the single user input, such as data or signals indicative of the single user input. Receiving or detecting the indication of the single user input may comprise detecting a closed state of a current flow interrupting device of the power distribution panel. The single user-input may reconnect a power input side connection of the circuit protection device to a source of primary power, and the step of receiving or detecting the indication of the user-verification may comprise detecting the reconnection. The single user input may correspond to an input via a physical touch interface of the power distribution panel.

Receiving or detecting the single indication of a user-verification may comprise detecting alteration of an electrical current flow path of the power distribution panel from an open-circuit state, where electrical current through the flow path is interrupted, to a closed-circuit state, where electrical current through the electrical current flow path is permitted.

The electrical current flow path may be configured to deliver electrical power to the power input side connection of each circuit protection device that is configured to electrically connect the circuit protection device to a power source of power, in situ.

The single indication of user-verification may be based on closing a current flow interrupting device of the power distribution panel associated with an electrical current flow path required for the circuit protection device(s) to perform the one or more operational function(s), wherein closing the first current flow path corresponds to a closed-circuit state of the electrical current flow path.

An indication of a user-verification may be received or detected for each circuit protection device(s) to individually configure the circuit protection device(s) based on the user verification. Receiving or detecting the user-verification may comprise receiving or detecting a user input or an indication of the user input, such as data or signals indicative of the single user input, for each respective circuit protection device. Receiving or detecting the indication of the user input may comprise detecting a closed state of a current flow interrupting device of the respective circuit protection device. The user-input may reconnect a load side connection of the circuit protection device to a power input side connection, and the step of receiving or detecting the indication of the user-verification may comprise detecting the reconnection. The user input may correspond to an input via a physical touch interface of the respective circuit protection device.

Receiving or detecting the indication of a user-verification for each circuit protection device may comprise detecting alteration of an electrical current flow path of the circuit protection device from an open-circuit state, where electrical current through the flow path is interrupted, to a closed-circuit state, where electrical current through the electrical current flow path is permitted.

The electrical current flow path may be configured to deliver electrical power to the load side connection of the respective circuit protection device that is configured to electrically connect the load side connection to a power input side connection of the circuit protection device.

The indication of user-verification for each circuit protection device may be based on closing a current flow interrupting device of the circuit protection device associated with an electrical current flow path required for the circuit protection device to perform the one or more operational function(s), wherein closing the first current flow path corresponds to a closed-circuit state of the electrical current flow path.

The method may further comprise temporarily storing the configuration data in volatile memory of an electronic storage medium or media for each circuit protection device after receiving the configuration instruction(s).

The method may further comprise after receiving the configuration instructions, receiving or detecting an indication of a user input. The user input may be via a physical touch interface. Receiving or detecting the indication of the user input may comprise receiving or detecting data or signal(s) indicative of the user input. The data or signal(s) may only be received or detected when a separate input data or signal indicative of a configuration related status is received or detected.

The method may further comprise opening a current flow interrupting device of the power distribution panel in response to the user input. The current flow interrupting device of the power distribution panel may only be opened based on the user input when a separate input data or signal indicative of a configuration related status is received or detected. Receiving or detecting the indication of the user input may comprise receiving or detecting an indication of the open state of the current flow interrupting device in response to the user input. The method may further comprise generating the separate input data or signal indicative of the configuration related status after receiving the configuration instruction(s). The current flow interrupting device may be electrically coupled between a first power input of each circuit protection device and source of primary power of the power distribution panel.

The method may comprise receiving or detecting an indication of a user input for each circuit protection device. The method may further comprise opening a current flow interrupting device of each circuit protection device in response to the user input. Receiving or detecting the indication of the user input for the respective circuit protection device may comprise receiving or detecting an indication of the open state of the current flow interrupting device in response to the user input. The current flow interrupting device of each respective device may be electrically coupled between a first power input of the circuit protection device and a load connection configured to electrically couple the circuit protection device to a load, in situ.

The method may further comprise writing the configuration data to non-volatile memory of an electronic storage medium or media of each circuit protection device based on an associated indication of the user input.

The method may further comprise associating a pending status to the written configuration data in the electronic storage medium. Configuring the circuit protection device based on the configuration data may comprise disassociating the pending status with the written configuration data.

The method may further comprise transmitting a control signal to open a second current flow interrupting device of the circuit protection device based on an associated indication of the user input.

The method may further comprise, prior to receiving the configuration instruction(s), transmitting data or signal(s) indicative of existing configuration data stored in non-volatile memory of an electronic storage medium of each circuit protection device.

The received configuration instruction may be transmitted from a device remote to the power distribution panel.

The method may further comprise, prior to configuring each circuit protection device based on the configuration data, operating the circuit protection device in a safe configuration state.

The method may further comprise prior to receiving or detecting the user-verification, operating each circuit protection device in the safe configuration state.

The method may further comprise receiving or detecting an indication of the safe configuration state for each circuit protection device.

The safe configuration state may comprise a disconnection of a power input connection of the circuit protection device from a primary source of power of the power distribution panel.

The safe configuration state may comprise a stable supply of secondary low-voltage power to the circuit protection device.

The method may further comprise transmitting a control signal to alter a state of the second current flow interrupting device of each circuit protection device from a closed state into the open state.

The control signal may be transmitted upon or after receiving the configuration instruction.

The control signal may be transmitted based on receipt or detection of an indication of disconnection of a load connection of each circuit protection device from a power supply input or source.

The control signal may be transmitted based on receipt of the configuration instruction.

The second current flow interrupting device may be electrically coupled to a phase line of the electrical current flow path.

The method further comprising, transmitting a control signal to alter the state of the second flow interrupting device of each circuit protection device into a closed state upon or after receiving or detecting the indication of user-verification of the configuration data.

The step of transmitting the control signal to alter the state of the second flow interrupting device into the closed state may be based on indication of user-verification of the configuration data.

The step of transmitting the control signal to alter the state of the second flow interrupting device into the closed state may occur upon or after affirming the status of the configuration data as permanent.

The step of transmitting the control signal to alter the state of the second flow interrupting device into the closed state may occur in response to configuring the respective circuit protection device based on the configuration data.

The method may further comprise transmitting a display signal to an electronic display for driving the electronic display to output a visual indication of the configuration instruction prior to receiving or detecting the indication of user-verification for each circuit protection device.

The display signal may be transmitted after receiving the configuration instruction.

The display signal may be transmitted based on receipt of the configuration instruction.

The display signal may be transmitted based on receipt or detection of an open-circuit state of an electrical current flow path required to perform the one or more operational function(s).

The display signal may be transmitted based on receipt or detection of an indication of a user input.

The display signal may be transmitted based on receipt or detection of disconnection of a load connection of the circuit protection device from a power supply input or source.

The display signal may be transmitted based on the configuration data stored in the non-volatile memory of the electronic storage medium or media.

The visual indication of the configuration instruction may comprise an indication of the configuration data.

The display signal may be transmitted prior to receiving or detecting the indication of user-verification of the configuration data.

Each circuit protection device may comprise a respective electronic display.

The power distribution panel may comprise the electronic display.

The electronic display may comprise an interface configured to display alphanumeric characters and/or symbols.

The electronic display may comprise a bistable display.

The electronic display may comprise an electronic ink display.

The configuration instruction may comprise an instruction signal comprising the configuration data.

The configuration instruction may comprise an instruction signal received via a communications interface of the power distribution panel.

The communications interface may comprise a wireless communications interface for wirelessly communicating with a remote device.

The indication of user-verification may be associated with one or more user-verification criteria.

The one or more user-verification criteria may comprise if the indication of user verification is received or detected within a predetermined verification time period.

The time period may be initiated after receiving the configuration instruction.

The time period may be initiated upon or after operating each circuit protection device in a safe configuration state, or upon detecting the safe configuration state.

The verification time period may be initiated after transmitting a display signal to an electronic display indicative of the configuration data.

The one or more verification criteria may comprise if the receipt or detection of the indication of user-verification occurs prior to receipt of a signal indicative of rejection of the configuration instruction.

The signal indicative of rejection may comprise another configuration related instruction.

The method may further comprise operating each circuit protection device to perform the one or more operational function(s) based on a non-updated configuration data if indication of user-verification is not received or detected in accordance with the one or more verification criteria.

The method may further comprise transmitting a display signal to an electronic display associated with a circuit protection device for causing the electronic display to output a visual indication of the non-updated configuration data if indication of user-verification is not received or detected in accordance with the one or more verification criteria for the respective circuit protection device.

The method may further comprise transmitting data indicative of the non-updated configuration if the indication of user-verification is not received or detected in accordance with the one or more verification criteria.

The method may further comprise performing one or more successful algorithmic verifications on the configuration data before configuring the respective circuit protection device based on the configuration data.

The configuration data may comprise parameters or settings associated with one or more fault detection and/or fault interruption function(s) executable by each circuit protection device.

The configuration data may be associated with an overcurrent protection function in which the respective circuit protection device is configured to interrupt a flow of current to a load electrically coupled to the circuit protection device when an overcurrent condition in the load is exhibited, in situ.

The configuration data may comprise an indication of an enabled overcurrent protection function, an indication of overcurrent parameter threshold(s) and/or instructions for detecting the overcurrent condition.

The configuration data may be associated with a residual current protection function in which the respective circuit protection device is configured to detect a leakage current between phase and ground of a load electrically coupled to the circuit protection device and interrupt a flow of current to the load upon detection of the leakage current, in situ.

The configuration data may comprise an indication of an enabled residual current protection function, an indication of a leakage current parameter threshold(s) and/or instructions for detecting the leakage current condition.

The configuration data may be associated with an arc fault protection function in which the respective circuit protection device is configured to detect an arc fault in a load electrically coupled to the circuit protection device and interrupt a flow of current to the load upon detection of the arc fault condition, in situ.

The configuration data may comprise an indication of an enabled arc fault protection function, an indication of an arc fault parameter threshold(s) and/or instructions for detecting the arc fault condition.

The method may comprise receiving configuration instruction(s) for multiple circuit protection devices, each circuit protection device having configuration data associated therewith. Receiving or detecting the indication of user-verification may be based on a single user-verification action for the multiple circuit protection devices, or a selective user-verification for one or more of the circuit protection devices.

In a third general aspect, the present disclosure may broadly be said to consist of a method for configuring operation of a power distribution panel, the method comprising:
receiving configuration instruction(s) to configure one or more operational function(s) of the power distribution panel, the configuration instruction(s) having associated therewith configuration data for the power distribution panel; and
receiving or detecting an indication of a user-verification of the configuration data for the power distribution panel, to configure the power distribution panel based on the corresponding configuration data.

The method may comprise one or more features of either one of the preceding general aspects and any of their possible implementations.

In a fourth general aspect, the present disclosure may broadly be said to consist of a method for configuring operation of a circuit protection device, the method comprising:
receiving a configuration instruction to configure one or more operational function(s) of the circuit protection device, the configuration instruction having associated therewith configuration data; and
operating the circuit protection device to perform one or more operational function(s) based on the configuration data, upon or after a state of an electrical current flow path required to perform the one or more operational function(s) is altered.

The method may comprise one or more features of either one of the preceding general aspects and any of their possible implementations.

In a fifth general aspect, the present disclosure may broadly be said to consist of a method for configuring operation of a circuit protection device, the method comprising:
receiving a configuration instruction to configure one or more operational function(s) of the circuit protection device, the configuration instruction having associated therewith configuration data; and
configuring the circuit protection device based on the configuration data upon or after a state of an electrical current flow path required to perform the one or more operative function(s) is altered.

The method may comprise one or more features of either one of the preceding general aspects and any of their possible implementations.

In a sixth general aspect, the present disclosure may broadly be said to consist of a method for configuring operation of a circuit protection device, the method comprising:
receiving a configuration instruction to configure one or more operational function(s) of the circuit protection device, the configuration instruction having associated therewith configuration data; and
detecting an indication of a user-verification of the configuration data and accordingly operating the circuit protection device to perform the one or more operative function(s) based on the configuration data.

The method may comprise one or more features of either one of the preceding general aspects and any of their possible implementations.

In a seventh general aspect, the present disclosure may broadly be said to consist of a method for configuring operation of at least one circuit protection device of a power distribution panel, the method comprising:
receiving configuration instruction(s) to configure one or more operational function(s) of each circuit protection device, the configuration instruction(s) having associated therewith configuration data for each circuit protection device; and
operating each circuit protection device to perform one or more operational function(s) based on the associated configuration data, upon or after a state of an electrical current flow path configured to deliver electrical power to a power input of each circuit protection device is altered. The method may comprise one or more features of either one of the preceding general aspects and any of their possible implementations.

In an eighth general aspect, the present disclosure may broadly be said to consist of a method for configuring operation of at least one circuit protection device of a power distribution panel, the method comprising:
receiving configuration instruction(s) to configure one or more operational function(s) of each circuit protection device, the configuration instruction(s) having associated therewith configuration data for each circuit protection device; and
configuring each circuit protection device based on the configuration data upon or after a state of an electrical current flow path to deliver electrical power to a power input of each circuit protection device is altered.

The method may comprise one or more features of either one of the preceding general aspects and any of their possible implementations.

In a ninth general aspect, the present disclosure may broadly be said to consist of a method for configuring operation of at least one circuit protection device of a power distribution panel, the method comprising:
receiving configuration instruction(s) to configure one or more operational function(s) of each circuit protection device, the configuration instruction(s) having associated therewith configuration data for each circuit protection device; and
detecting an indication of a user-verification of the configuration data for each circuit protection device and accordingly operating each circuit protection device to perform the one or more operative function(s) based on the configuration data.

The method may comprise one or more features of either one of the preceding general aspects and any of their possible implementations.

In a tenth general aspect, the present disclosure may broadly be said to consist of a method for operating a power distribution panel comprising one or more circuit protection device(s) and a user input device, the method comprising:
receiving configuration instruction(s) to configure one or more operational function(s) of one or more circuit protection device(s), the configuration instruction(s) having associated therewith configuration data for each device;
receiving or detecting input data or signal(s) indicative of a user input via the user input device; and
writing the configuration data into memory for each respective circuit protection based on the input data or signal(s).

The method may comprise one or more features of either one of the preceding general aspects and any of their possible implementations.

In an eleventh general aspect, the present disclosure may broadly be said to consist of a method for configuring operation of a circuit protection device, the method comprising:

receiving a configuration instruction to configure one or more operational function(s) of the circuit protection device, the configuration instruction having associated therewith configuration data;

operating the circuit protection device to perform the one or more operational function(s) based on the configuration data, only when an indication of user-verification is received or detected.

The method may comprise one or more features of either one of the preceding general aspects and any of their possible implementations.

In a twelfth general aspect, the present disclosure may broadly be said to consist of a method for operating a power distribution panel comprising one or more circuit protection device(s) and a user input device, the method comprising:

receiving configuration instruction(s) to configure one or more operational function(s) of one or more circuit protection device(s), the configuration instruction(s) having associated therewith configuration data for each device;

receiving or detecting input data or signal(s) indicative of a user input via the user input device; and configuring each respective circuit protection based on the input data or signal(s).

The method may comprise one or more features of either one of the preceding general aspects and any of their possible implementations.

In a thirteenth general aspect, the present disclosure may broadly be said to consist of a method for operating a power distribution panel comprising one or more circuit protection device(s), a user input device, and a current flow interrupting device, the method comprising:

receiving a configuration instruction to configure one or more operational function(s) of one or more circuit protection device(s);

receiving or detecting a configuration-related indicator indicative of receipt of the configuration instruction(s);

receiving or detecting input data or signal(s) indicative of a user input via the user input device; and opening the current flow interrupting device based on the input data or signal(s) and the configuration-related indicator.

The method may comprise one or more features of either one of the preceding general aspects and any of their possible implementations.

In a fourteenth general aspect, the present disclosure may broadly be said to consist of a method for operating a power distribution panel comprising one or more circuit protection device(s) and a user input device, the method comprising:

receiving configuration instruction(s) to configure one or more operational function(s) of one or more circuit protection device(s), the configuration instruction(s) having associated therewith configuration data for each device;

receiving or detecting a configuration-related indicator indicative of receipt of the configuration instructions;

receiving or detecting input data or signal(s) indicative of a user input via the user input device; and writing the configuration data into memory for each respective circuit protection based on the input data or signal(s) and the configuration-related indicator.

The method may comprise one or more features of either one of the preceding general aspects and any of their possible implementations.

Any one of the abovementioned general aspects and their possible implementations may be implemented as a computer implemented method.

In a fifteenth aspect, the present disclosure may broadly be said to consist of a circuit protection device controller comprising:

a first electronic storage medium or media ("first electronic storage") having stored therein instructions for performing the method of any one of the first to fourteenth general aspects, and optionally any of their possible implementations, and one or more processor(s) for executing the instructions stored in the first electronic storage.

In a sixteenth aspect, the present disclosure may broadly be said to consist of a device comprising:

an input power side connection;

a load side connection;

an electrical current flow path between the input power side connection and the load side connection;

a current flow interrupting device electrically coupled to the electrical current flow path and operative to interrupt a flow of current between the input power side connection and the load side connection;

a controller comprising:
 a first electronic storage medium or media ("first electronic storage") for storing instructions to configure the circuit protection device; and
 one or more processor(s) configured to execute the instructions to:
  receive a configuration instruction to configure one or more operational function(s) of the circuit protection device, the configuration instruction having associated therewith configuration data;
  receive or detect an indication of a user-verification of the configuration data to configure the device based on the configuration data.

The instructions stored in electronic storage may comprise any one or more features of the first general aspect and any of its possible implementations.

Implementations of the device of this aspect may include one or more of the following features.

The device may further comprise a physical touch interface for enabling receipt or detection of a user-verification of a configuration instruction by the controller.

The physical touch interface may be configured to alter an operative state of the current flow interrupting device.

The first current flow interruption device may be operatively coupled to a phase line of the electrical current flow path.

The first current flow interruption device may be operatively coupled to a phase line and a neutral line of the electrical current flow path.

The device may further comprise a second current flow interruption device operatively coupled to the electrical current flow path.

The second current flow interruption device may be connected in series with the first current flow interruption device downstream of the input power side connection.

The device may further comprise one or more sensors for sensing one or more electrical parameters associated with the electrical current flow path.

The device may further comprise an electronic display for displaying data indicative of the configuration data stored in the first electronic storage.

The electronic display may comprise an interface configured to display alphanumeric characters and/or symbols.

The electronic display may comprise a bistable display.

The electronic display may comprise an electronic ink display.

The device may further comprise a communications interface for communicatively coupling one or more device(s) to receive reconfiguration instructions therefrom.

The communications interface may comprise a wireless communications interface for wirelessly communicating with a remote device.

The one or more operative function(s) may comprise one or more fault detection and/or fault interruption function(s).

The first current flow interruption device may be operable to open based on the one or more fault detection and/or fault interruption function(s).

The fault detection and/or fault interruption function(s) may comprise any one or more of:
  overcurrent detection and protection;
  residual current detection and protection; and/or
  arc fault detection and protection.

In a seventeenth aspect, the present disclosure may broadly be said to consist of a device comprising:
  an input power side connection;
  a load side connection;
  an electrical current flow path between the input power side connection and the load side connection;
  a first current flow interrupting device electrically coupled to the electrical current flow path and operative to interrupt a flow of current between the input power side connection and the load side connection;
  a controller comprising:
    a first electronic storage medium or media ("first electronic storage") having stored therein instructions for performing the method of any one of the first to fourteenth general aspects, and optionally any of their possible implementations; and
    one or more processor(s) configured to execute the instructions stored in the first electronic storage.

Implementations of the device may include any one or more of the features of the device of the sixteenth aspect, and any one or more of its possible implementations.

In an eighteenth aspect, the present disclosure may broadly be said to consist of a power distribution system comprising:
  one or more circuit protection devices, each circuit protection device comprising:
    an input power side connection;
    a load side connection; and
    a first current flow interrupting device electrically coupled between the input voltage
    side connection and the load side connection and being operative to interrupt a flow
    of current between the input voltage side connection and the load side connection;
  a power input connection for receiving power from an external power source;
  a second current flow interrupting device operatively coupled between the power input connection and the input power side connection of each circuit protection device and being operative to interrupt the flow of current from the power input connection to the input power side connection; and
  at least one controller operable to configure one or more of the circuit protection device(s) upon receipt of one or more configuration instruction(s).

The controller may be operable to perform the steps of any one of the methods of the first to thirteenth aspects, and any of their possible implementations.

Each circuit protection device may further comprise any one or more of the features of the device of the sixteenth aspect and any of its possible implementations.

Implementations of the device of this aspect may additionally or alternatively comprise any one or more of the following features.

The system may further comprise a physical touch interface operatively coupled to the second current flow interrupting device operatively coupled between the power input connection and the input voltage side connection, for enabling physical user input to alter an operative state of the second current flow interrupting device.

The system may further comprise a communications interface for communicatively coupling one or more device(s) to receive reconfiguration instructions for one or more circuit protection device(s) therefrom.

The communications interface may comprise a wireless communications interface for wirelessly communicating with a remote device.

In a nineteenth aspect, the present disclosure may broadly be said to consist of a power distribution panel comprising:
  a primary power supply input;
  one or more circuit protection devices electrically connected to the power supply input;
  a current flow interrupting device electrically connected within an electrical current flow path between the one or more circuit protection devices and the power supply input;
  a controller configured to read an adjustable configuration-related indicator stored in an associated electronic storage medium or media;
  a user input device comprising a physical touch interface; and
  control circuitry operatively coupled to the controller, the user input device and the current flow interrupting device and configured to open the current flow interrupting device when a user input is received via the user input device and the controller outputs data or a signal indicating a configuration-related status of the indicator.

Implementations of the power distribution panel of this aspect may comprise any one or more of the features of the system of the eighteenth aspect or any of its possible implementations.

In a twentieth aspect the present disclosure may broadly be said to consist of a power distribution panel comprising:
  one or more circuit protection devices electrically connected to the power supply input;
  a controller configured to read an adjustable configuration-related indicator stored in an associated electronic storage medium or media;
  a user input device comprising a physical touch interface; and
  control circuitry operatively coupled to the controller and the user input device and operable to generate an electrical signal receivable or detectable by each of the circuit protection device(s) when a user input is received via the user input device and the controller outputs data or a signal indicating a configuration-related status of the indicator.

Implementations of the power distribution panel of this aspect may comprise any one or more of the features of the system of the eighteenth aspect or any of its possible implementations.

The invention claimed is:

1. A method for configuring operation of at least one circuit protection device of a power distribution panel, the method comprising:
   receiving configuration instructions having associated therewith configuration data for each circuit protection device;
   based on the receiving the configuration instructions, configuring one or more operational functions of each circuit protection device;
   receiving or detecting an indication of a user-verification of the configuration data for one or more of the at least one circuit protection device; and
   based on the receiving or detecting the indication, configuring the respective circuit protection devices based on the corresponding configuration data.

2. The method of claim 1, wherein the configuring the respective circuit protection devices based on the corresponding configuration data comprises writing the configuration data into electronic memory and affirming a status of configuration data as permanent based on the received or detected user-verification.

3. The method of claim 2, wherein the affirming the status of the configuration data as permanent comprises writing the data to a memory location comprising existing configuration data.

4. The method of claim 2, wherein the affirming the status of the configuration data as permanent comprises changing a pending status indicator associated with the configuration data.

5. The method of claim 1, wherein the indication of the user-verification comprises an indication of a user's spatial presence adjacent or proximal to the power distribution panel.

6. The method of claim 1, wherein each circuit protection device is configured based on the configuration data of the associated received configuration instructions.

7. The method of claim 1, wherein the receiving or detecting the user-verification comprises receiving or detecting a user input or an indication of the user input.

8. The method of claim 7, wherein the receiving or detecting the indication of the user input comprises detecting a closed state of a current flow interrupting device.

9. The method of claim 7, wherein the user input corresponds to an input via a physical touch interface spatially located at or proximal to the circuit protection device or the power distribution panel.

10. The method of claim 9, wherein the power distribution panel comprises the physical touch interface.

11. The method of claim 9, wherein the at least one circuit protection device comprises the physical touch interface.

12. The method of claim 1,
   wherein the receiving or detecting an indication of the user-verification comprises receiving or detecting a single indication of the user-verification for multiple circuit protection devices; and
   wherein the method further comprises based on the receiving or detecting the single indication of the user-verification, simultaneously configuring the circuit protection devices based on the user-verification.

13. The method of claim 12, wherein the receiving or detecting the single indication of the user-verification comprises detecting a closed state of a current flow interrupting device of the power distribution panel.

14. The method of claim 13, further comprising closing the current flow interrupting device and reconnecting a power input side connection of each circuit protection device to a connection of the power distribution panel for a primary power source;
   wherein the receiving or detecting the indication of the user-verification comprises detecting the reconnecting.

15. The method of claim 1, wherein an indication of a user-verification is received or detected for each circuit protection devices to individually configure the at least one circuit protection devices based on the user-verification.

16. The method of claim 15, wherein the receiving or detecting the user-verification comprises detecting a closed state of a current flow interrupting device of the respective circuit protection device.

17. The method of claim 16, further comprising closing the current flow interrupting device and reconnecting a load side connection of the circuit protection device to a power input side connection;
   wherein the receiving or detecting the indication of the user-verification comprises detecting the reconnecting.

18. The method of claim 1, further comprising temporarily storing the configuration data in volatile memory of an electronic storage medium or media for each circuit protection device after receiving the configuration instructions.

19. The method of claim 1, further comprising, after the receiving the configuration instructions, receiving or detecting an indication of a user input via a physical touch interface.

20. The method of claim 19, wherein the receiving or detecting the indication of the user input comprises receiving or detecting data or a signal indicative of the user input.

21. The method of claim 20, wherein the data or the signal is received or detected when a separate input data or signal indicative of a configuration related status is received or detected.

22. The method of claim 20, further comprising opening a current flow interrupting device of the power distribution panel in response to the data or the signal indicative of the user input.

23. The method of claim 1, further comprising receiving or detecting an indication of a user input via a physical touch interface for each circuit protection device.

24. The method of claim 23, further comprising opening a current flow interrupting device of the respective circuit protection device in response to the user input.

25. The method of claim 1, further comprising writing the configuration data to non-volatile memory of an electronic storage medium or media of each circuit protection device based on a user input.

26. The method of claim 25, further comprising associating a pending status to the written configuration data in the electronic storage medium, and wherein configuring each circuit protection device based on the configuration data comprises disassociating the pending status with the written configuration data.

27. The method of claim 1, further comprising transmitting a display signal to an electronic display of the power distribution panel or of each circuit protection device, for driving the electronic display to output a visual indication of the configuration data prior to receiving or detecting the indication of user-verification for each circuit protection device.

28. The method of claim 1, wherein the indication of user-verification is associated with one or more user-verification criteria, and the one or more user-verification criteria comprises whether the indication of user-verification is received or detected within a predetermined verification time period.

29. The method of claim 1, wherein the configuration data for each circuit protection device comprises parameters or settings associated with one or more fault detection and/or fault interruption functions executable by the respective circuit protection device.

30. The method of claim 1, further comprising receiving configuration instructions for multiple circuit protection devices, each circuit protection device having configuration data associated therewith, and receiving or detecting the indication of user-verification is based on a single user-verification action for the multiple circuit protection devices, or a selective user-verification for one or more of the circuit protection devices.

* * * * *